United States Patent
Wardle et al.

(10) Patent No.: US 11,860,652 B1
(45) Date of Patent: Jan. 2, 2024

(54) IRRIGATION CONTROLLER AND ASSOCIATED METHODS

(71) Applicant: Husqvarna AB, Huskvarna (SE)

(72) Inventors: Brad J. Wardle, Kaysville, UT (US); Stuart J. Eyring, Bountiful, UT (US); Jason R. Sims, New Braunfels, TX (US)

(73) Assignee: HUSQVARNA AB

( * ) Notice: Subject to any disclaimer, the term of this patent is extended or adjusted under 35 U.S.C. 154(b) by 0 days.

(21) Appl. No.: 18/109,092

(22) Filed: Feb. 13, 2023

Related U.S. Application Data

(63) Continuation of application No. 17/222,898, filed on Apr. 5, 2021, now Pat. No. 11,579,634, which is a continuation of application No. 16/813,476, filed on Mar. 9, 2020, now Pat. No. 10,969,798, which is a continuation of application No. 15/640,244, filed on Jun. 30, 2017, now Pat. No. 10,602,682.

(51) Int. Cl.
| | |
|---|---|
| *G05D 7/06* | (2006.01) |
| *A01G 25/16* | (2006.01) |
| *G05B 19/042* | (2006.01) |
| *A01G 25/02* | (2006.01) |

(52) U.S. Cl.
CPC ........... *G05D 7/0623* (2013.01); *A01G 25/02* (2013.01); *A01G 25/165* (2013.01); *G05B 19/042* (2013.01); *G05D 7/0629* (2013.01); *G05B 2219/25419* (2013.01); *G05B 2219/2625* (2013.01)

(58) Field of Classification Search
CPC .... G05D 7/0623; G05D 7/0629; A01G 25/02; A01G 25/165; G05B 19/042
USPC ....................................................... 700/284
See application file for complete search history.

(56) References Cited

U.S. PATENT DOCUMENTS

| | | | |
|---|---|---|---|
| 5,097,861 | A | 3/1992 | Hopkins |
| 5,696,671 | A | 12/1997 | Oliver |
| 5,870,302 | A | 2/1999 | Oliver |
| 6,314,340 | B1 | 11/2001 | Mecham |
| 6,452,499 | B1 | 9/2002 | Runge |
| 6,782,310 | B2 | 8/2004 | Bailey |
| 6,823,239 | B2 | 11/2004 | Sieminski |
| 6,921,029 | B2 | 7/2005 | Lockwood |
| 7,010,394 | B1 | 3/2006 | Runge |
| 7,010,396 | B2 | 3/2006 | Ware |
| 7,229,026 | B2 | 6/2007 | Evelyn-Veere |
| 7,359,769 | B2 | 4/2008 | Bailey |
| 7,400,944 | B2 | 7/2008 | Bailey |

(Continued)

FOREIGN PATENT DOCUMENTS

KR 101416296 7/2014

OTHER PUBLICATIONS

Orbit Irrigation Products inc., Sprinkler Catch Cups Instructions Manual (2010)—originally submitted in the IFW for parent U.S. Appl. No. 15/640,244 (Year: 2010).*

(Continued)

*Primary Examiner* — Mohammad Ali
*Assistant Examiner* — Joshua T Sanders
(74) *Attorney, Agent, or Firm* — Austin Rapp

(57) ABSTRACT

An irrigation controller is disclosed together with associated methods and computer program products. The watering schedule may be formulated based on catch cup data for one or more watering zones of a property to be watered.

20 Claims, 30 Drawing Sheets

(56) References Cited

U.S. PATENT DOCUMENTS

| | | |
|---|---|---|
| 7,412,303 B1 | 8/2008 | Porter |
| 7,444,207 B2 | 10/2008 | Nickerson |
| 7,532,954 B2 | 5/2009 | Evelyn-Veere |
| 7,558,650 B2 | 7/2009 | Thornton |
| 7,584,023 B1 | 9/2009 | Palmer |
| 7,640,079 B2 | 12/2009 | Nickerson |
| 7,805,221 B2 | 9/2010 | Nickerson |
| 7,836,910 B2 | 11/2010 | Dresselhaus |
| 7,853,363 B1 | 12/2010 | Porter |
| 7,877,168 B1 | 1/2011 | Porter |
| 7,883,027 B2 | 2/2011 | Fekete |
| 7,949,433 B2 | 5/2011 | Hern |
| 7,962,244 B2 | 6/2011 | Alexanian |
| 8,010,238 B2 | 8/2011 | Ensworth |
| 8,104,498 B2 | 1/2012 | Dresselhaus |
| 8,170,721 B2 | 5/2012 | Nickerson |
| 8,185,248 B2 | 5/2012 | Ensworth |
| 8,200,368 B2 | 6/2012 | Nickerson |
| 8,244,404 B2 | 8/2012 | Nickerson |
| 8,301,309 B1 | 10/2012 | Woytoxitz |
| 8,326,440 B2 | 12/2012 | Christfort |
| 8,371,325 B1 | 2/2013 | Grizzle |
| 8,504,210 B2 | 8/2013 | Ensworth |
| 8,548,632 B1 | 10/2013 | Porter |
| 8,600,569 B2 | 12/2013 | Woytowitz |
| 8,606,415 B1 | 12/2013 | Woytowitz |
| 8,620,480 B2 | 12/2013 | Alexanian |
| 8,630,743 B2 | 1/2014 | Marsters |
| 8,649,907 B2 | 2/2014 | Ersavas |
| 8,649,910 B2 | 2/2014 | Nickerson |
| 8,659,183 B2 | 2/2014 | Crist |
| 8,660,705 B2 | 2/2014 | Woytowitz |
| 8,700,222 B1 | 4/2014 | Woytowitz |
| 8,706,307 B2 | 4/2014 | Weiler |
| 8,744,773 B2 | 6/2014 | Woytowitz |
| 8,793,024 B1 | 7/2014 | Woytowitz |
| 8,849,461 B2 | 9/2014 | Ersavas |
| 8,868,246 B2 | 10/2014 | Thornton |
| 8,924,032 B2 | 12/2014 | Woytowitz |
| 8,989,908 B2 | 3/2015 | Marsters |
| 9,043,964 B2 | 6/2015 | Nickerson |
| 9,144,204 B2 | 9/2015 | Redmond |
| 9,161,499 B2 | 10/2015 | Bailey |
| 9,228,670 B2 | 1/2016 | Grizzle |
| 9,241,451 B2 | 1/2016 | Ersavas |
| 9,244,449 B2 | 1/2016 | Tennyson |
| 9,258,952 B2 | 2/2016 | Walker |
| 9,301,461 B2 | 4/2016 | Woytowitz |
| 9,320,205 B2 | 4/2016 | Ensworth |
| 9,348,338 B2 | 5/2016 | Nickerson |
| 9,445,556 B2 | 9/2016 | Marsters |
| 10,602,682 B1 | 3/2020 | Wardle |
| 10,969,798 B2 | 4/2021 | Wardle |
| 11,061,375 B2 | 7/2021 | Masters |
| 11,579,634 B1 | 2/2023 | Wardle |
| 2005/0107924 A1 | 5/2005 | Bailey |
| 2007/0162188 A1 | 7/2007 | Bailey |
| 2008/0288116 A1 | 11/2008 | Nickerson |
| 2009/0281672 A1 | 11/2009 | Pourzia |
| 2010/0145530 A1 | 6/2010 | Nickerson |
| 2010/0179701 A1 | 7/2010 | Gilbert |
| 2010/0312404 A1 | 12/2010 | Nickerson |
| 2011/0015793 A1 | 1/2011 | Crist |
| 2011/0077785 A1 | 3/2011 | Nickerson |
| 2011/0270448 A1* | 11/2011 | Kantor ............... A01G 25/16 700/284 |
| 2012/0091222 A1 | 4/2012 | Dresselhaus |
| 2012/0191261 A1 | 7/2012 | Nickerson |
| 2012/0215366 A1 | 8/2012 | Redmond |
| 2012/0239211 A1 | 9/2012 | Walker |
| 2012/0259473 A1 | 10/2012 | Nickerson |
| 2012/0303168 A1 | 11/2012 | Halahan |
| 2013/0060389 A1 | 3/2013 | Marsters |
| 2013/0110293 A1 | 5/2013 | Illig |
| 2013/0131874 A1 | 5/2013 | Shupe |
| 2013/0207771 A1 | 8/2013 | Ersavas |
| 2013/0226357 A1 | 8/2013 | Ersavas |
| 2013/0297082 A1 | 11/2013 | Ensworth |
| 2014/0031996 A1 | 1/2014 | Nickerson |
| 2014/0039697 A1 | 2/2014 | Weiler |
| 2014/0081471 A1 | 3/2014 | Woytowitz |
| 2014/0088771 A1 | 3/2014 | Woytowitz |
| 2014/0094977 A1 | 4/2014 | Marsters |
| 2014/0129039 A1 | 5/2014 | Olive-Chahinian |
| 2014/0224008 A1 | 8/2014 | Hern |
| 2014/0371928 A1 | 12/2014 | Ersavas |
| 2015/0005961 A1 | 1/2015 | Endrizzi |
| 2015/0005962 A1 | 1/2015 | Endrizzi |
| 2015/0005965 A1 | 1/2015 | Ensworth |
| 2015/0073607 A1 | 3/2015 | Endrizzi |
| 2015/0081111 A1 | 3/2015 | Endrizzi |
| 2015/0081112 A1 | 3/2015 | Endrizzi |
| 2015/0081115 A1 | 3/2015 | Endrizzi |
| 2015/0081116 A1 | 3/2015 | Endrizzi |
| 2015/0081118 A1 | 3/2015 | Endrizzi |
| 2015/0112494 A1 | 4/2015 | Woytowitz |
| 2015/0150201 A1 | 6/2015 | Marsters |
| 2015/0230417 A1 | 8/2015 | Nickerson |
| 2016/0014983 A1 | 1/2016 | Micu |
| 2016/0044877 A1 | 2/2016 | Weiler |
| 2016/0113219 A1 | 4/2016 | Tennyson |
| 2016/0135389 A1 | 5/2016 | Ersavas |
| 2016/0192602 A9* | 7/2016 | Alexanian .......... G05B 19/0426 700/284 |
| 2016/0198646 A1 | 7/2016 | Ensworth |
| 2016/0219804 A1 | 8/2016 | Romney |
| 2016/0335875 A1 | 11/2016 | Alcorn |
| 2016/0353678 A1 | 12/2016 | Marsters |
| 2017/0020089 A1* | 1/2017 | Endrizzi ............. A01G 25/165 |
| 2017/0038749 A1 | 2/2017 | Mewes |
| 2017/0241973 A1* | 8/2017 | Chan .................. H04Q 9/00 |
| 2018/0325050 A1 | 11/2018 | Bye |

OTHER PUBLICATIONS

The Irrigation Association, Landscape Irrigation Auditor 3rd Edition, auditing manual, see e.g., Reference pp. 46, 49, 60, 69-74, 78, 83, 85, 97, 99, 189, 237, 228, 232, apparently published at least by Feb. 2013 (shown in attachment 1) (Reference Page Numbers, not in the original, added the footer of document for ease of reference).

Ecology, Environment & Conservation, OnPoint Ecosystems; OnPoint EcoSystems Announces Powerful yet Easy to use WiFi Irrigation Controller, Dow Jones Factiva article, published on Aug. 16, 2013 (shown in attachment 2).

Orbit Irrigation Products, Inc., Sprinkler Catch Cups Instructions Manual, instructions manual, apparently published at least by Jan. 1, 2010 (shown in attachment 3).

Orbit Irrigation Products, Inc., B-Hyve Help, Advanced Settings, web page [online] [retrieved on Feb. 6, 2018] apparently published at least by Apr. 21, 2017, Retrieved from the internet: <URL: https://www.web.archive.org/web/20170421035027/http://http://help.orbitbhyve.com/> (shown in attachment 4).

Irrigation Association, EPA WaterSense, WaterSense Specification for Weather-Based Irrigation Controllers, product manual, Published on Nov. 3, 2011 (shown in attachment 5).

Colorado State University, FAQs—Crop water use, web page [online] [retrieved on Feb. 6, 2018] apparently published at least by Jun. 10, 2010, Retrieved from the internet: <URL: https://web.archive.org/web/20100610034252/http://www.agwaterconservation.colostate.edu/FAQs_CROPWATERUSE.aspx> (shown in attachment 6).

Irrigation Association, Irrigation Glossary, glossary [online] [retrieved on Jun. 15, 2018] apparently published at least by Jun. 15, 2017, Retrieved from the internet: <URL: https://web.archive.org/web/20170615220853/http://www.irrigation.org/IA/Resources/Tools-Calculators/Irrigation-Glossary/A-C/IA/Resources/A-C.aspx> (shown in attachment 7).

Tim P. Wilson and David F. Zoldoske, Evaluating Sprinkler irrigation [sic] Uniformity, article [online] [retrieved on Oct. 9, 2017] apparently published at least by Jul. 1997, Retrieved from the internet: <URL: http://cwi.csufresno.edu/wateright/evalsprink.asp> (shown in attachment 8).

(56) References Cited

OTHER PUBLICATIONS

The Irrigation Association, Certified Landscape Irrigation Auditor Training Manual, training manual, pp. 28-29, 32-33, 35, 41-49, 62-63, 68, 78-79, 81, 140-141, 153, 158-159, 173, 207, 217, 227, 237, 261, and 267, apparently published at least by Sep. 2004 (shown in attachment 9).
Hydro-Rain, Inc., Irrigation Audit Application Methodology, audit methodology manual [online] [retrieved on Jun. 4, 2018] apparently published at least by Jun. 29, 2016, Retrieved from the internet: < URL: http://irrigationaudit.hydrorain.com/methodology> (shown in attachment 10).
Hydro-Rain, Inc., Irrigation Audit App, web page [online] [retrieved on Jun. 4, 2018] apparently published at least by Jun. 29, 2016, Retrieved from the internet: <URL: http://irrigationaudit.hydrorain.com/> (shown in attachment 11).
Orbit Irrigation Products, Inc., Save Water and Maintain Green Grass!, web page [online] [retrieved on Jun. 4, 2018] apparently published at least by Jun. 29, 2016, Retrieved from the internet: <http://wateringschedule.com/> (shown in attachment 12).
Rachio, Inc., Installation Guide, installation manual, apparently published at least by Jan. 1, 2016, (40 pages) (shown in attachment 13).
Rachio, Inc., Quick State Guide (Generation 2), installation manual, [online] [retrieved on Mar. 27, 2017] apparently published at least by Mar. 26, 2017, Retrieved from the internet: <http://support.rachio.com/article/474-installation-guide-gen-2> (shown in attachment 14).
Rachio, Inc., Easy Install Guide, installation manual, apparently published at least by Jun. 29, 2016 (shown in attachment 15).
Office Action, U.S. Appl. No. 15/640,244, dated Feb. 21, 2019 (shown in attachment 16).
Office Action Response, U.S. Appl. No. 15/640,244, dated Jul. 22, 2019 (shown in attachment 17).
Supplemental Office Action Response, U.S. Appl. No. 15/640,244, dated Sep. 18, 2019 (shown in attachment 18).
Notice of Allowance and Fee(s) Due (including a Notice of Allowability section, a Drawings section, an Examiner's Amendment section, and an Allowable Subject Matter section), U.S. Appl. No. 15/640,244, dated Nov. 8, 2019 (shown in attachment 19).
Amendment After Allowance, United States U.S. Appl. No. 15/640,244, dated Feb. 7, 2020 (shown in attachment 20).
Applicant-Initiated Interview Summary, U.S. Appl. No. 15/640,244, dated Jul. 25, 2019 (shown in attachment 21).
Notice of Allowance and Fee(s) Due (including a Notice of Allowability section, and an Allowable Subject Matter section), U.S. Appl. No. 16/813,476, dated Dec. 2, 2020 (shown in attachment 22).
Preliminary Amendment, U.S. Appl. No. 17/222,898, dated Aug. 17, 2021 (shown in attachment 23).
Examiner-Initiated Interview Summary, U.S. Appl. No. 17/222,898, dated Sep. 20, 2022 (shown in attachment 24).
Notice of Allowance and Fee(s) Due (including a Notice of Allowability section, a Detailed Action section, an Examiner's Amendment section, and an Allowable Subject Matter section), U.S. Appl. No. 17/222,898, dated Sep. 20, 2022 (shown in attachment 25).
Corrected Notice of Allowance and Fee(s) Due (including a Notice of Allowability section, a Detailed Action section, a Corrected Notice of Allowance section, an Examiner's Amendment section, and an Allowable Subject Matter section), U.S. Appl. No. 17/222,898, dated Sep. 28, 2022 (shown in attachment 26).
Hydro-Rain, Inc., Irrigation Audit App, online application, the sample data disclosed was input at the time of the screen capture, Mar. 7, 2023, however, the application was accessible on or before Jun. 29,. 2016 <URL: http://irrigationaudit.hydrorain.com/methodology> (shown in attachment 27).

* cited by examiner

IRRIGATION CONTROLLER AND ASSOCIATED METHODS

RELATED APPLICATIONS

This application claims priority to and is a continuation application of U.S. application Ser. No. 17/222,898, which was filed on 5 Apr. 2021 and which is entitled IRRIGATION CONTROLLER AND ASSOCIATED METHODS, which claims priority to and is a continuation application of U.S. application Ser. No. 16/813,476, which was filed on 9 Mar. 2020 and which is entitled IRRIGATION CONTROLLER AND ASSOCIATED METHODS (issued as U.S. Pat. No. 10,969,798), which claims priority to and is a continuation application of U.S. application Ser. No. 15/640,244 (issued as U.S. Pat. No. 10,602,682), which was filed on 30 Jun. 2017 and which is entitled IRRIGATION CONTROLLER AND ASSOCIATED METHODS. The foregoing application(s) are incorporated herein in their entirety.

TECHNICAL FIELD

The present invention relates generally to water conservation. More specifically, the present invention relates to an irrigation controller and associated methods.

BACKGROUND

The growing populations in many parts of the world have led to increasing strain on water supply systems. In many areas, the cost of water has increased along with the need to conserve water generally. Accordingly, it would be advantageous to provide improved irrigation controllers and associated methods.

SUMMARY

Embodiments of the disclosed subject matter are provided below for illustrative purposes and are in no way limiting of the claimed subject matter.

A set of embodiments of an irrigation controller may comprise: a valve communications component, wherein the valve communications component may be configured to generate electrical signals to control one or more irrigation valves, each of the one or more irrigation valves controlling a flow of irrigation water to a watering zone of one or more watering zones of a property; a catch cup component for receiving measurement values, each of the measurement values representing a quantity of water captured by one of a plurality of catch cups positioned within the watering zone during a test watering period; an average component for calculating an average of the measurement values; a lowest quartile component for identifying one or more of the measurement values falling within a lowest quartile of the measurement values; a lowest quartile average component for calculating a lowest quartile average, the lowest quartile average may comprise an average of the measurement values within the lowest quartile of the measurement values; an estimated irrigation rate component for calculating an estimated irrigation rate based on the lowest quartile average; an in-soil water level component for calculating a first estimated in-soil water level for the watering zone at a first point in time; a forecast evapotranspiration component for calculating or receiving forecast evapotranspiration data for the watering zone for an intermediate period of time extending between the first point in time and a subsequent, second point in time; a forecast weather component for receiving forecast precipitation data for the watering zone for the intermediate period of time, wherein the in-soil water level component may be further configured to calculate a second estimated in-soil water level at the second point in time based on the first estimated in-soil water level, the forecast precipitation data and the forecast evapotranspiration data; a total scheduled watering time component for calculating a scheduled watering time for the watering zone based at least in part on a ratio between the lowest quartile average and the average of the measurement values using at least one of a group of one or more processors disposed within or in electronic communication with the irrigation controller; and a watering schedule component for formulating a watering schedule for the watering zone based at least in part on the calculated scheduled watering time using at least one of the group of one or more processors.

The set of embodiments of the irrigation controller further may comprise a watering time compression component configured to proportionally reduce an actual watering time for each of the one or more watering zones of the property if a total desired watering time for all of the one or more watering zones exceeds a total permissible watering time within a future temporal period.

The set of embodiments of the irrigation controller may further may comprise a water level difference component for identifying a difference between a calculated in-soil water capacity for the watering zone and an estimated in-soil water level for a point in time at a beginning of an impermissible watering period for the watering zone, wherein the watering schedule component may be configured to formulate the watering schedule such that the estimated in-soil water level may be elevated to the calculated in-soil water capacity based on the estimated irrigation rate during a permissible watering period immediately preceding the impermissible watering period.

In the set of embodiments of the irrigation controller, the in-soil water level component may be configured to adjust an estimated in-soil water level in response to determining that historical weather data may be inconsistent with forecast weather data.

In the set of embodiments of the irrigation controller, the in-soil water level component may be configured to alter an estimated in-soil water level for a point in time based at least in part on forecast evapotranspiration data for a period of time preceding the point in time to an altered estimated in-soil water level for the point in time based at least in part on differences between the forecast evapotranspiration data for the period of time preceding the point in time and historical evapotranspiration data for the period of time preceding the point in time.

Within the set of embodiments of the irrigation controller, a start watering time adjustment component may be configured for moving a start time backward in time relative to a requested start time to increase a total watering time in response to determining that a total permissible watering time may be less than a total desired watering time.

In the set of embodiments of the irrigation controller, an in-soil water capacity component may be configured to calculate an estimated in-soil water capacity for the watering zone, based at least in part on user input specifying a soil type for the watering zone.

A set of embodiments of a method irrigating one or more watering zones of a property may comprise: receiving measurement values, each of the measurement values representing a quantity of water captured by one of a plurality of catch cups positioned within a watering zone of one or more watering zones of a property during a test watering period using at least one of a group of one or more processors disposed within or in electronic communication with an irrigation controller for irrigating the watering zone; using at least one of the group of one or more processors, calculating an average of the measurement values; using at least one of the group of one or more processors, identifying one or more of the measurement values falling within a lowest quartile of the measurement values; using at least one of the group of one or more processors, calculating a lowest quartile average, the lowest quartile average comprising an average of the measurement values within the lowest quartile of the measurement values; using at least one of the group of one or more processors, calculating an estimated irrigation rate based on the lowest quartile average; using at least one of the group of one or more processors, calculating a first estimated in-soil water level for the watering zone at a first point in time; using at least one of the group of one or more processors, calculating or receiving forecast evapotranspiration data for the watering zone for an intermediate period of time extending between the first point in time and a subsequent, second point in time; using at least one of the group of one or more processors, receiving forecast precipitation data for the watering zone for the intermediate period of time; using at least one of the group of one or more processors, calculating a second estimated in-soil water level at the second point in time based on the first estimated in-soil water level, the forecast precipitation data and the forecast evapotranspiration data; using at least one of the group of one or more processors, calculating a scheduled watering time for the watering zone based at least in part on a ratio between the lowest quartile average and the average of the measurement values; and using at least one of the group of one or more processors, formulating a watering schedule for the watering zone based at least in part on the calculated scheduled watering time.

The set of embodiments of the method may further comprise. Using at least one of the group of one or more processors, operating a sprinkling system for the property in accordance with the watering schedule.

The set of embodiments of the method may further comprise, using at least one of the group of one or more processors, proportionally reducing an actual watering time for each of the one or more watering zones of the property if a total desired watering time for all of the one or more watering zones exceeds a total permissible watering time within a future temporal period.

The set of embodiments of the method may further comprise, using at least one of the group of one or more processors, identifying a difference between a calculated in-soil water capacity for the watering zone and an estimated in-soil water level for a point in time at a beginning of an impermissible watering period for the watering zone, wherein the watering schedule may be formulated such that the estimated in-soil water level may be elevated to the calculated in-soil water capacity based on the estimated irrigation rate during a permissible watering period immediately preceding the impermissible watering period.

The set of embodiments of the method may further comprise, using at least one of the group of one or more processors, adjusting an estimated in-soil water level in response to determining that historical weather data may be inconsistent with forecast weather data.

The set of embodiments of the method may further comprise, using at least one of the group of one or more processors, altering an estimated in-soil water level for a point in time based at least in part on forecast evapotranspiration data for a period of time preceding the point in time to an altered estimated in-soil water level for the point in time based at least in part on differences between the forecast evapotranspiration data for the period of time preceding the point in time and historical evapotranspiration data for the period of time preceding the point in time.

The set of embodiments of the method may further comprise, moving a start time backward in time relative to a requested start time to increase a total watering time in response to determining that a total permissible watering time may be less than a total desired watering time.

A set of embodiments of a computer program product for irrigating one or more watering zones of a property may comprise: a non-transitory computer readable medium; and computer program code, encoded on the non-transitory computer readable medium, configured to cause at least one of a group of one or more processors to perform the steps of: receiving measurement values, each of the measurement values representing a quantity of water captured by one of a plurality of catch cups positioned within a watering zone of the one or more watering zones of the property during a test watering period; calculating an average of the measurement values; identifying one or more of the measurement values falling within a lowest quartile of the measurement values; calculating a lowest quartile average, the lowest quartile average comprising an average of the measurement values within the lowest quartile of the measurement values; calculating an estimated irrigation rate based on the lowest quartile average; calculating a first estimated in-soil water level for the watering zone at a first point in time; calculating or receiving forecast evapotranspiration data for the watering zone for an intermediate period of time extending between the first point in time and a subsequent, second point in time; receiving forecast precipitation data for the watering zone for the intermediate period of time; calculating a second estimated in-soil water level at the second point in time based on the first estimated in-soil water level, the forecast precipitation data and the forecast evapotranspiration data; calculating a scheduled watering time for the watering zone based at least in part on a ratio between the lowest quartile average and the average of the measurement values; and formulating a watering schedule for the watering zone based at least in part on the calculated scheduled watering time.

The set of embodiments of the computer program product may further comprise a step of, using at least one of the group of one or more processors, operating a sprinkling system for the property in accordance with the watering schedule.

The set of embodiments of the computer program product may further comprise a step of, using at least one of the group of one or more processors, proportionally reducing an actual watering time for each of the one or more watering zones of the property if a total desired watering time for all of the one or more watering zones exceeds a total permissible watering time within a future temporal period.

The set of embodiments of the computer program product may further comprise a step of, using at least one of the group of one or more processors, identifying a difference between a calculated in-soil water capacity for the watering zone and an estimated in-soil water level for a point in time at a beginning of an impermissible watering period for the watering zone, wherein the watering schedule may be formulated such that the estimated in-soil water level may be elevated to the calculated in-soil water capacity based on the estimated irrigation rate during a permissible watering period immediately preceding the impermissible watering period.

The set of embodiments of the computer program product may further comprise a step of, using at least one of the group of one or more processors, adjusting an estimated in-soil water level in response to determining that historical weather data may be inconsistent with forecast weather data.

The set of embodiments of the computer program product may further comprise a step of, using at least one of the group of one or more processors, altering an estimated in-soil water level for a point in time based at least in part on forecast evapotranspiration data for a period of time preceding the point in time to an altered estimated in-soil water level for the point in time based at least in part on differences between the forecast evapotranspiration data for the period of time preceding the point in time and historical evapotranspiration data for the period of time preceding the point in time.

The foregoing systems, methods, and computer program products may be performed by various devices, including network communication devices, processors, sprinkler controllers, servers, mobile phones, and/or other computing devices.

It should again be noted that the above summary provides only examples of the subject matter within the scope of this disclosure.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

Figure 1:
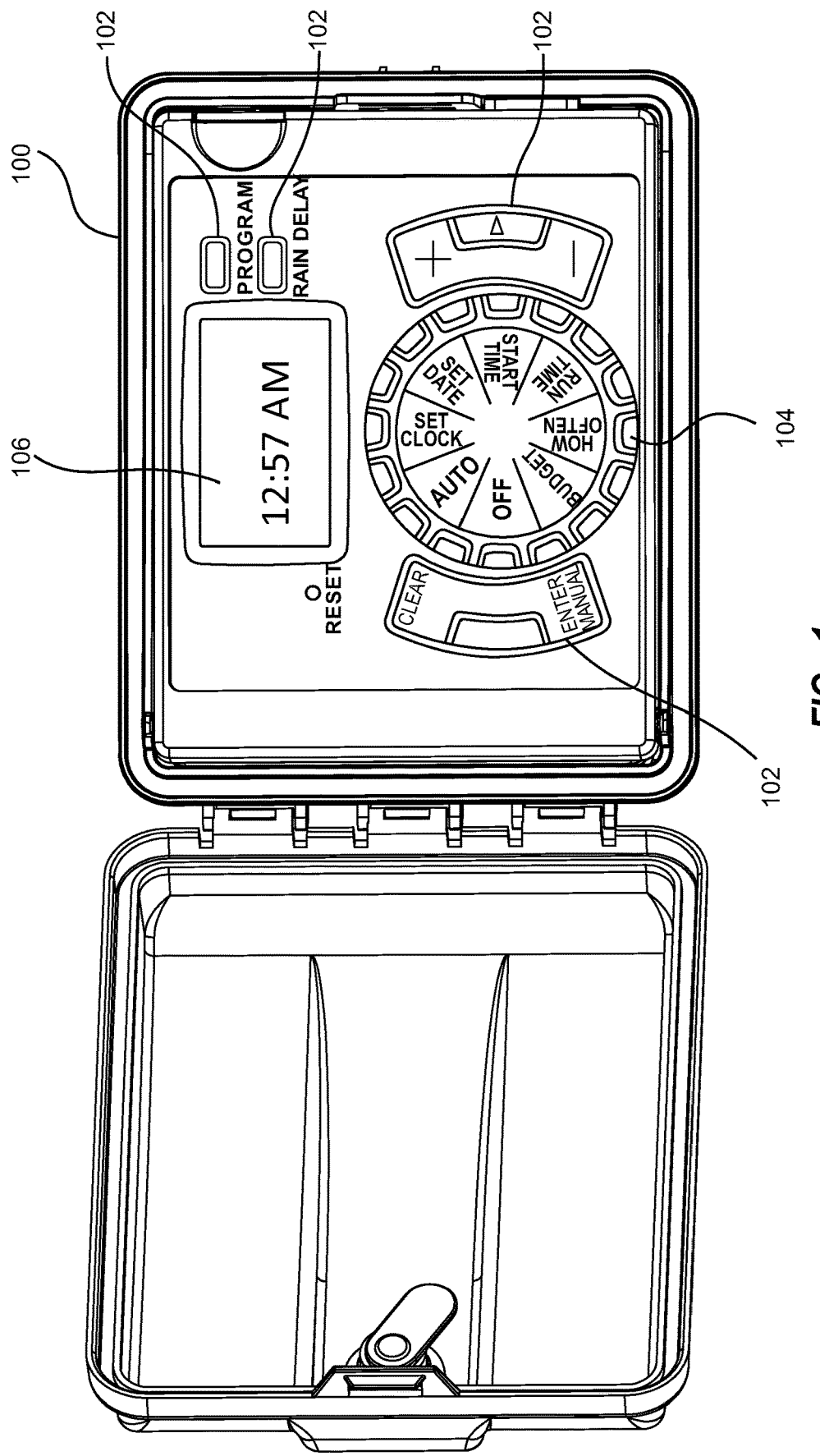
FIG. 1 illustrates one embodiment of a multi-zone irrigation controller.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

As used in this application, the phrases "an embodiment" or "in one embodiment" or the like do not refer to a single, specific embodiment of the disclosed subject matter. Instead, these phrases signify that the identified portion or portions of the disclosed subject matter may be combined with other aspects of the disclosure without limitation.

For this application, the phrases "connected to," "coupled to," and "in communication with" refer to any form of interaction between two or more entities, including mechanical, electrical, magnetic, electromagnetic, and thermal interaction and may also include integral formation. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanisms. The term "abut" refers to items that are in direct physical contact with each other, although the items may be attached, secured, fused, or welded together. The terms "integrally formed" refer to a body that is manufactured integrally (i.e., as a single piece, without requiring the assembly of multiple pieces). Multiple parts may be integrally formed with each other if they are formed from a single workpiece.

As used herein, the term "generally" indicates that a particular item or component is within 5°, 10°, or 15° of a specified orientation or value. As used herein, the term "substantially" indicates that a particular value is within 5%, 10% or 15% of a specified value.

In the figures, certain components may appear many times within a particular drawing. However, only certain instances of the component may be identified in the figures to avoid unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figures.

FIG. 1 illustrates one embodiment of a multi-zone irrigation controller 100. The multi-zone irrigation controller 100 may have various user input devices including, but not limited to: one or more input buttons 102, a programming dial 104, and a display screen 106. In at least one embodiment, the display screen 106 may be a touch-responsive display screen 106 configured to receive user inputs. However, it will also be understood that other embodiments are contemplated which may include a non-touch-responsive display screen 106 that is not configured to receive user inputs. The display screen 106 may be configured to display any relevant information to the user, as well as general notifications and recommendations, which will be described in more detail below.

Figure 2:
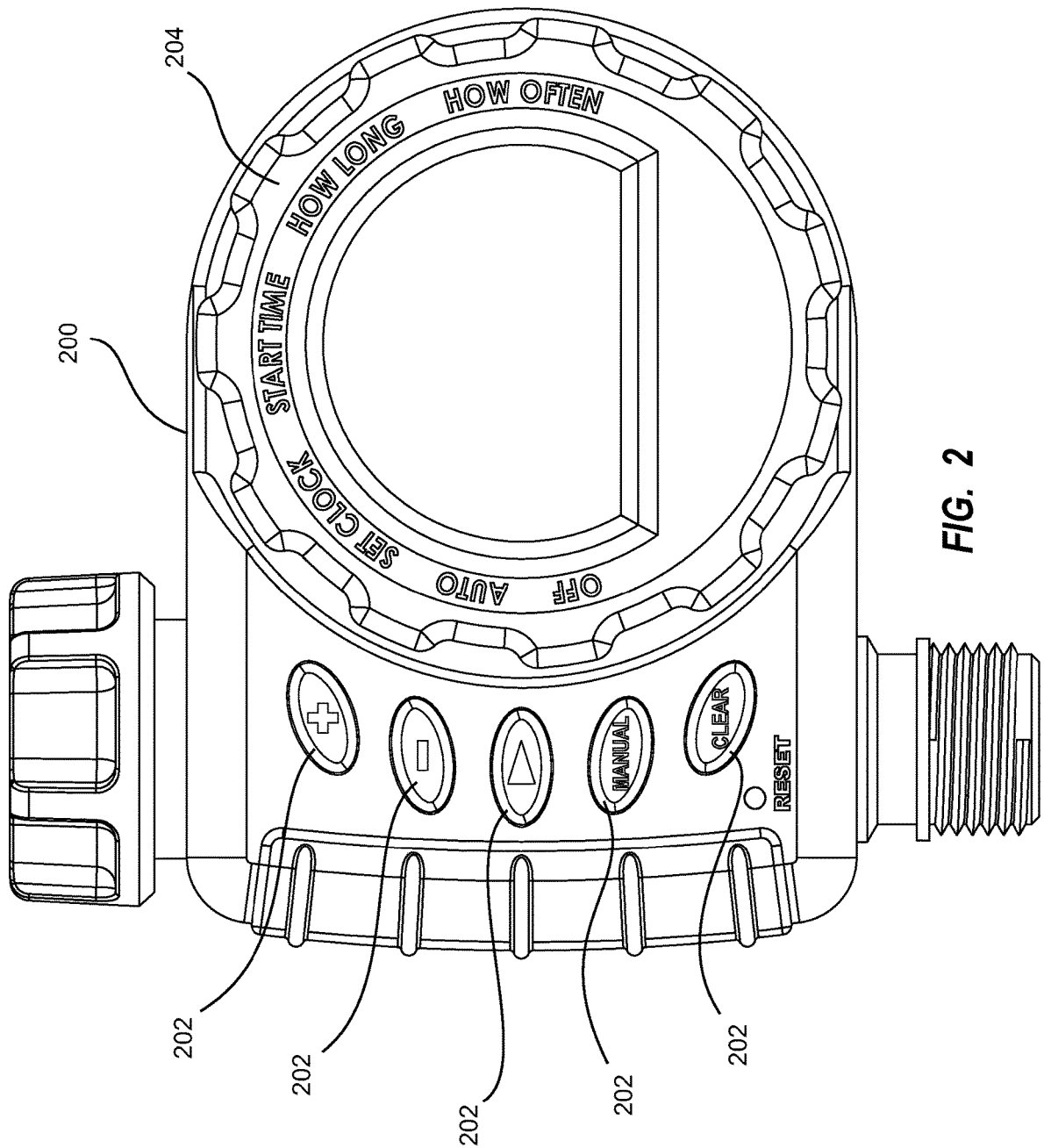
FIG. 2 illustrates one embodiment of a hose faucet irrigation controller.

FIG. 2 illustrates one embodiment of a hose faucet irrigation controller 200 that may also be used to control water consumption and perform other functions as described herein. The hose faucet irrigation controller 200 may have various user input devices including one or more input buttons 202 and a programming dial 204. In other embodiments, the hose faucet irrigation controller 200 may also include a display screen (not shown), which may or may not be a touch-responsive display screen configured to receive user inputs. The display screen may be configured to display any relevant information to the user including general notifications and recommendations.

The multi-zone irrigation controller 100 and the hose faucet irrigation controller 200 illustrated in FIGS. 1 and 2 comprise non-limiting examples and serve only to illustrate the type of local devices that may be used to perform the functions identified herein.

Figure 3:
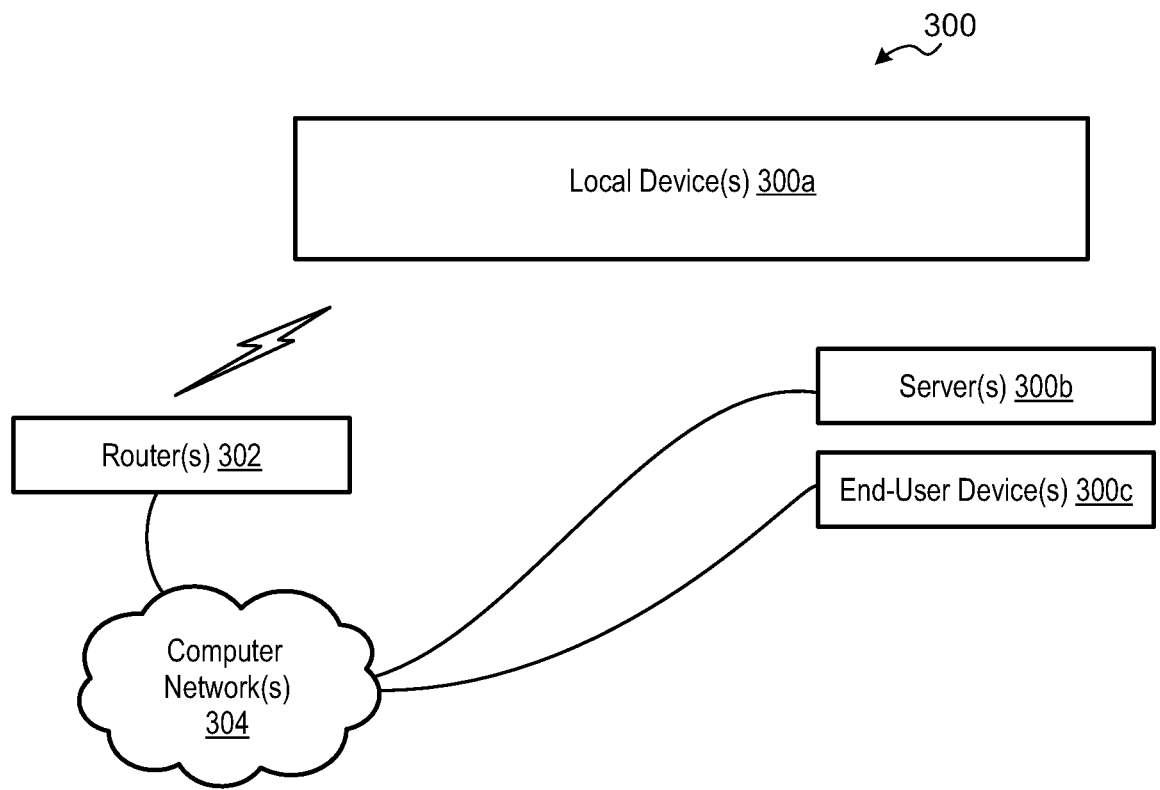
FIG. 3 is a schematic block diagram illustrating one embodiment of an irrigation controller.

FIG. 3 is a schematic block diagram illustrating one embodiment of an irrigation controller 300. The irrigation controller 300 may include one or more local device(s) 300a, one or more server(s) 300b, and one or more end-user device(s) 300c. The one or more local device(s) 300a, one or more server(s) 300b, and/or one or more end-user device(s) 300c may be any type of suitable computing device. A local device 300a may comprise, for example, a wall-mounted on-site irrigation controller 100, as illustrated in FIG. 1, or an on-site hose faucet controller 200, as illustrated in FIG. 2. In this context "on-site" signifies that the local device is in close proximity to the controlled sprinkler system. The server 300b may comprise, for example, a server having a processor, memory, executable instructions stored in the memory, and network communications hardware. The server(s) 300b may comprise any type of computing device that provides another computing device with or allows access to data or computational resources. In various embodiments, the end-user device(s) 300c may comprise, for example, a notebook computer, a laptop computer, a tablet, a mobile phone, a smartphone or a desktop computer. The functions identified in this application may be performed by one or more of the local device(s) 300a, the server(s) 300b and/or the end-user device(s) 300c.

Such as the multi-zone irrigation controller 100 illustrated in FIG. 1 and the hose faucet irrigation controller 200 illustrated in FIG. 2. The local device(s) 300a, one or more server(s) 300b, and one or more end-user device(s) 300c may be in electronic communication with each other via one or more router(s) 302 and/or one or more computer network(s) 304. However, it will be understood that in at least one embodiment, the local device(s) 300a may also be configured to operate in a standalone computing environment with minimal or periodic communication with the one or more servers 300b and the one or more end-user devices 300c via the one or more router(s) 302 and/or the one or more computer networks 304. In alternative embodiments, the local device(s) 300a may communicate frequently with the server(s) 300b and/or the end-user device(s) 300c with the functions disclosed herein being performed by one or more of the one or more local device(s) 300a, server(s) 300b and/or end-user device(s) 300c.

In general, the systems and methods presented herein may be carried out on any type of computing device via a single user, or by multiple different users. The computing devices may optionally be connected to each other and/or to other resources that are not illustrated in FIG. 3 and subsequent figures. Such connections may be wired or wireless, and may be implemented through the use of any known wired or wireless communication standard, including but not limited to: Ethernet, 802.11a, 802.11b, 802.11g, and 802.11n, universal serial bus (USB), Bluetooth, cellular, near-field communications (NFC), Bluetooth Smart, ZigBee, Z-Wave, and the like. In FIG. 3, by way of example, wired communications are shown with solid lines and wireless communications are shown with zig-zag lines (i.e., in the shape of a lightning bolt).

Communications between the various elements of FIG. 3 may be routed and/or otherwise facilitated through the use of one or more router(s) 302. The one or more router(s) 302 may be of any type known in the art and may be designed for wired and/or wireless communications through any known communications standard including, but not limited to, those listed above. The one or more router(s) 302 may facilitate communications between the one or more local device(s) 300a, the one or more server(s) 300b, the one or more end-user device(s) 300c, and the one or more computer network(s) 304.

The one or more computer network(s) 304 may include any type of network, including, but not limited to, local area networks and/or wide area networks, or a combination of local and wide area networks. The one or more computer network(s) 304 may be used to store, retrieve, and communicate information, such as data, web pages, web-connected services, executable code designed to operate over the Internet, and/or perform other functions that facilitate the provision of information and/or services over the one or more computer network(s) 304.

Figure 4:
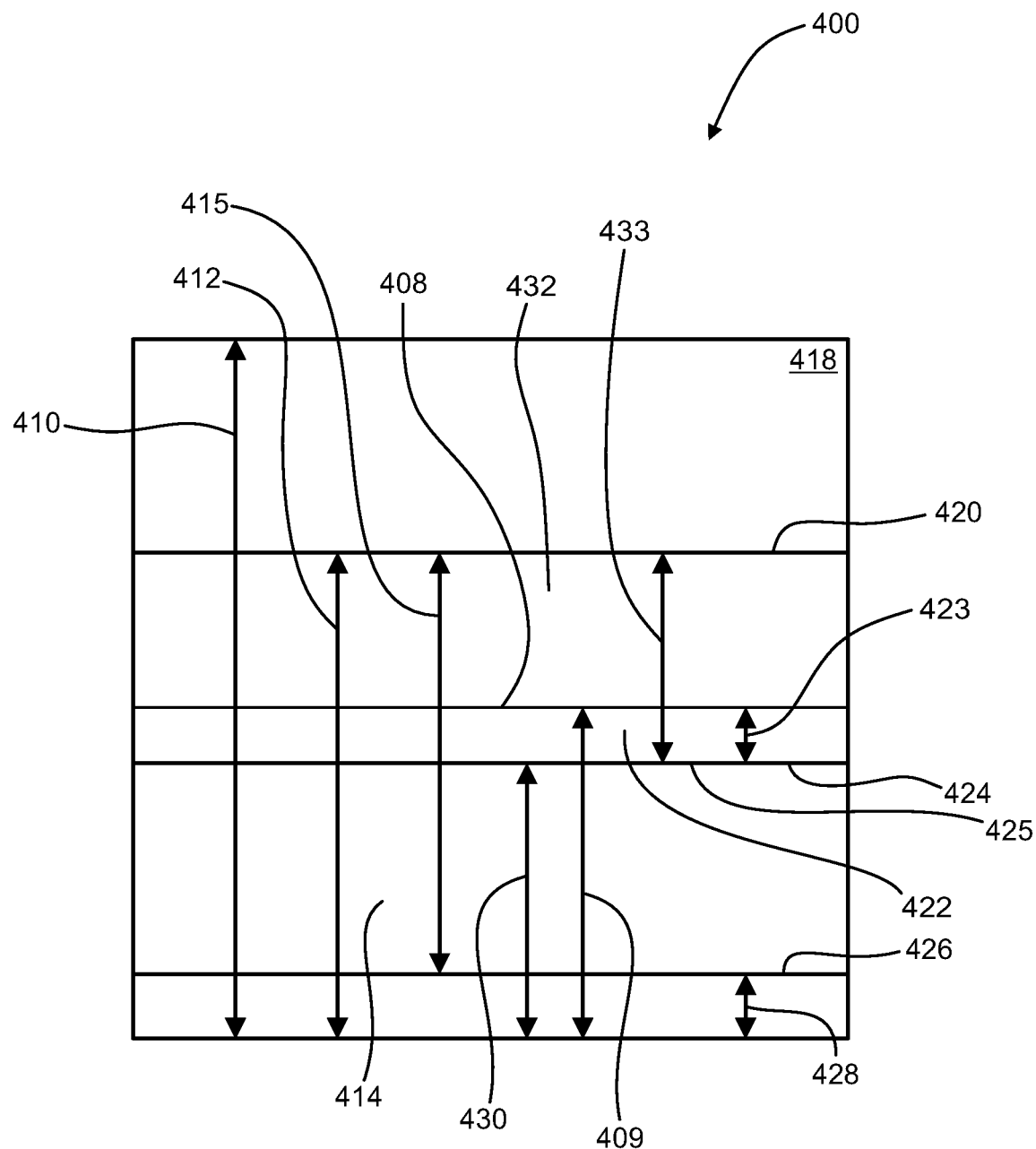
FIG. 4 is one embodiment of a soil depth diagram.

FIG. 4 illustrates one embodiment of a soil depth diagram 400, which may be used to visualize, estimate, track, and predict the water content (i.e., an estimated in-soil water level 408) of a particular soil. The soil water content is the quantity of water contained in the soil. The soil water content may be expressed as a depth, such as in inches, or, alternatively, may be expressed, for example, as a percentage of the volume or weight. However, it will be understood that any method of calculating and tracking the soil water content of a given soil may also be used without departing from the spirit and scope of the present disclosure.

Continuing with FIG. 4, the soil depth diagram 400 may include an in-soil water level 408, in-soil water level depth 409, a root zone depth 410, in-soil water capacity 420 (which may comprise a percentage of root zone depth 410), in-soil water capacity depth 412, available water 414, available water depth 415, readily available water 432, readily available water depth 433, condition specific readily available water 422, condition specific readily available water depth 423, allowable depletion 424 (which may comprise a percentage of available water 414), a replenishment point level 425, a replenishment point depth 430, a permanent wilting point 426 (which may comprise a percentage of root zone depth 410) and a permanent wilting point depth 428.

The in-soil water level 408 is an indication of the level or quantity of water within a particular region of soil. This level 408 may be referred to in the pertinent art as the "moisture balance." The in-soil water level 408 may be calculated employing in-soil water level depth 409, which may be specified, for example, in inches. When the in-soil water level 408 is estimated, the in-soil water level 408 may be referred to as an estimated in-soil water level 408. When the in-soil water level depth 409 is estimated, the in-soil water level depth 409 may be referred to as an estimated in-soil water level depth 409.

The root zone depth 410 of a soil may be defined as the depth to which a given plant's roots readily penetrate the soil, or alternatively, the depth in which the predominant root activity of a given plant occurs. Thus, the type of plant may determine the root zone depth 410. The root zone depth 410 may also be referred to as the effective root depth. For example, in some applications the effective root depth may be considered about 50% of the maximum root zone depth for a given type of plant. Some examples of root zone depths may include: four to six inches for annual flowers and ground covers, four to eight inches for cool season turf, six to twelve inches for shrubs and warm season turf, and twelve to twenty-four inches for trees. A default value for the root zone in the irrigation application may comprise, for example, six inches.

The in-soil water capacity 420 of a soil 418 may be defined as the maximum amount of in-soil water left within the root zone depth 410 after gravity drainage is complete and downward water flow due to gravity becomes negligible. The in-soil water capacity 420 may be measured using in-soil water capacity depth 412, which may be specified, for example, in inches. The type of soil 418 may determine the in-soil water capacity 420. For example, sandy soils have larger pores that can drain quickly, such that gravity drainage in these soils may be relatively quick. However, soils that contain clay may have smaller pores that trap water, such that gravity drainage in these soils takes more time. The in-soil water capacity 420 may also be referred to in the art as field capacity. In addition, the in-soil water capacity depth 412 may be referred to in the art as field capacity depth. When the in-soil water capacity 420 is estimated, the in-soil water capacity 420 may be referred to as an estimated in-soil water capacity 420. When the in-soil water capacity depth 412 is estimated, the in-soil water capacity depth 412 may be referred to as an estimated in-soil water capacity depth 412.

The available water 414 comprises the maximum amount of water that may be available to a plant within a soil 418. The available water 414 may be measured by the available water depth 415, which may be specified, for example, in inches. The available water 414 may be defined as the total water that may be stored between the in-soil water capacity 420 and the permanent wilting point 426. The available water 414 is the portion of water in a soil 418 that is available for absorption by the plant. When the available water 414 is estimated, the available water 414 may be referred to as an estimated available water 414. When the available water depth 415 is estimated, the available water depth 415 may be referred to as an estimated available water depth 415.

The readily available water 432 is the maximum amount of water that may be readily available to a plant in a soil 418. The readily available water 432 is water that can be removed from the soil with minimal energy and is thus easily accessible by the plant. The readily available water 432 may be measured by the readily available water depth 433, which may be identified, for example, in inches. The readily available water 432 may be defined as the water between the replenishment point level 425 and the in-soil water capacity 420. The readily available water 432 may vary according to, among other things, plant and soil type. In various embodiments, about 50% of the available water 414 may be considered the readily available water 432, though other percentages may also be chosen based on various factors. Even though all of the available water 414 may be accessed by a given plant, the closer the in-soil water level 408 gets to the permanent wilting point 426, the greater the stress the plant will experience. Plant stress and yield loss occur once the condition specific readily available water 422 has been depleted to or beyond (i.e., at or below) the replenishment point level 425, which may be referred to as the maximum allowable depletion 424. Thus, a maximum allowable depletion 424 (which may comprise a percentage of available water depth 415) may be calculated or formulated based at least on plant type. The term maximum allowable depletion 424 may be referred to in the art, for example, as allowable depletion or allowable moisture depletion. In various embodiments, once the in-soil water level 408 approaches or reaches the replenishment point level 425, the in-soil water level 408 may be replenished to bring the in-soil water level 408 towards the in-soil water capacity 420, thus increasing the water in the soil 418. When the readily available water 432 is estimated, the readily available water 432 may be referred to as estimated readily available water 432. When the readily available water depth 433 is estimated, the readily available water depth 433 may be referred to as estimated readily available water depth 433.

The replenishment point level 425 may be measured using a replenishment point depth 430, which may be specified, for example, in inches. The replenishment point depth 430 extends from the lower edge of the root zone 410 to the replenishment point level 425. As indicated above, as the in-soil water level 408 extends to or below the replenishment point level 425, plant stress and yield loss will occur.

The condition specific readily available water 422 may be considered the water between the estimated replenishment point level 425 and an estimated in-soil water level 408. The condition specific readily available water 422 may be measured employing the condition specific readily available water depth 423, which may be specified, for example, in inches. Please note that the condition specific readily available water 422 is distinct from readily available water 432. The condition specific readily available water 422 is based on the estimated in-soil water level 408, while the readily available water 432 is based on a difference between the in-soil water capacity 420 and the replenishment point level 425. When the condition specific readily available water 422 is estimated, the condition specific readily available water 422 may be referred to as estimated condition specific readily available water 422. When the condition specific readily available water depth 423 is estimated, the condition specific readily available water depth 423 may be referred to as estimated condition specific readily available water depth 423.

The permanent wilting point 426 may be defined as the level or point at which the plant can no longer obtain sufficient water from the soil to satisfy its water requirements. The permanent wilting point 426 may be measured using the permanent wilting point depth 428, which may be specified, for example, in inches. Once the permanent wilting point 426 has been reached, some plants may not fully recover if water is added to the soil thereafter.

Figure 5:
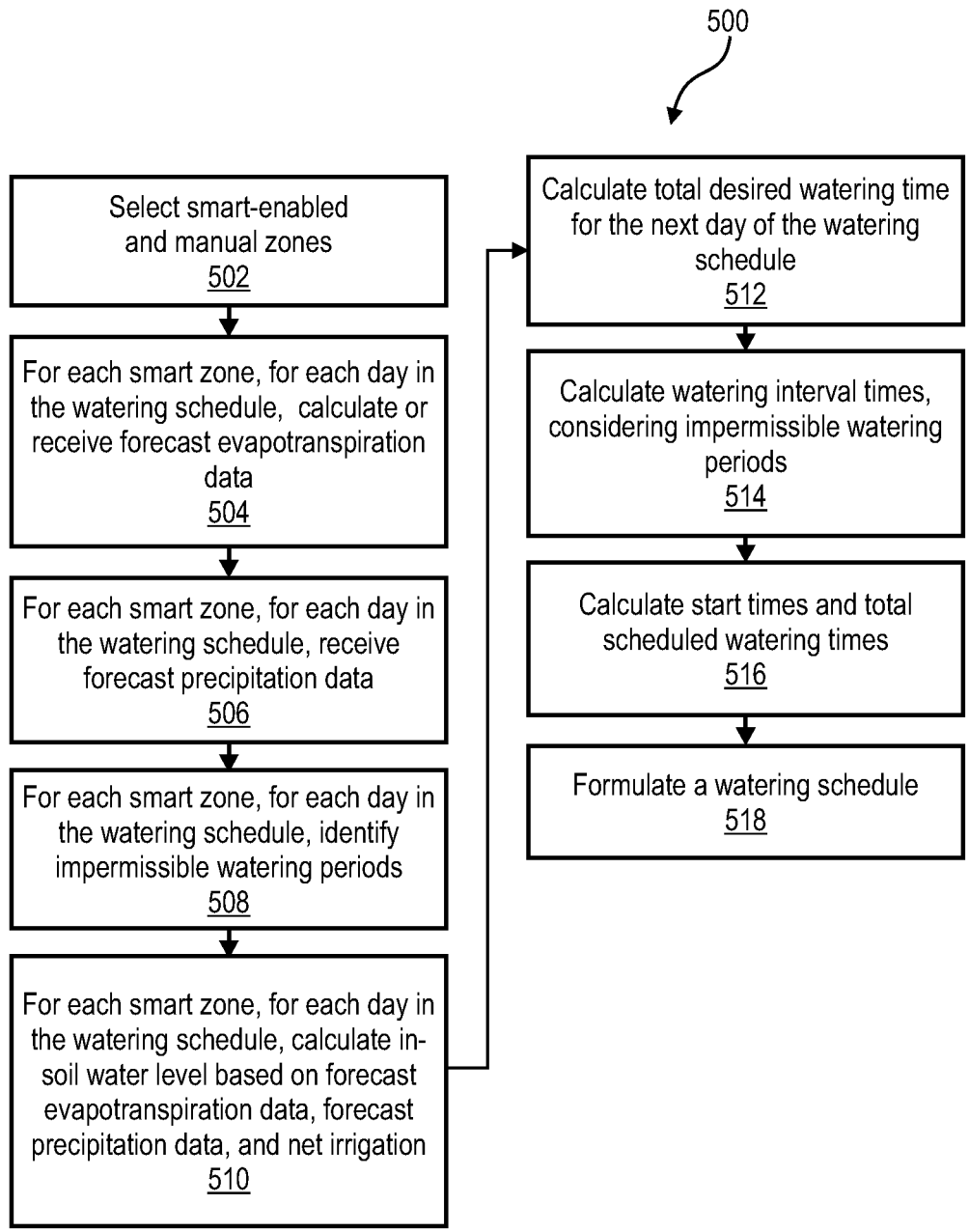
FIG. 5 is a flowchart illustrating one embodiment of a method for formulating a watering schedule.

FIG. 5 illustrates a flowchart of one embodiment of a method 500 for formulating a watering schedule. The method 500 may be practiced with, for example, the multi-zone irrigation controller 100 of FIG. 1, the hose faucet irrigation controller 200 of FIG. 2, the irrigation controller 300 of FIG. 3, or any other system or device within the scope of the present disclosure. Similarly, the multi-zone irrigation controller 100 of FIG. 1, the hose faucet irrigation controller 200 of FIG. 2, and the irrigation controller 300 of FIG. 3 may operate via the method 500 illustrated in FIG. 5, or via other methods within the scope of the present disclosure. The method 500 may be implemented by one or more processors (not shown) associated with the multi-zone irrigation controller 100 of FIG. 1, the hose faucet irrigation controller 200 of FIG. 2, the irrigation controller 300 of FIG. 3, or any other system or device within the scope of the present disclosure.

As shown, the method 500 may begin with step 502 in which the user may select which watering zones on the property the user desires to manage as "smart-enabled" watering zones (or "smart zones"), and which watering zones the user desires to manage as "manual zones." Each smart zone may then be managed entirely or partially by the irrigation controller, for example, to keep the estimated in-soil water level 408 within each smart zone at or above the replenishment point level 425 (or the maximum allowable depletion 424). In this manner, the plants in each of the smart zones may be continuously supplied with enough water for sufficient health, while avoiding over watering and thus conserving water. Alternatively, each manual zone may be managed based on manual user inputs for each manual zone selected by the user.

In step 504, forecast evapotranspiration data may be calculated or received for each day in the watering schedule. The forecast evapotranspiration data may be received from one or more institutions that track and/or forecast weather data. For example, the forecast evapotranspiration data may be received from the National Oceanic and Atmospheric Administration (NOAA), the Environmental Protection Agency (EPA), the International Water Management Institute (IWMI), and the like. The forecast evapotranspiration data may be received from these institutions from one or more servers or data repositories in an automated manner. The forecast evapotranspiration data may also be calculated based on current weather conditions, historical weather data, expected future weather conditions, or any combinations thereof. Alternatively, forecast evapotranspiration data may be manually entered by the user.

In step 506, forecast precipitation data may be received for each day in the watering schedule. The forecast precipitation data may also be received from one or more institutions that track and/or forecast weather data, as previously mentioned. Like the forecast evapotranspiration data, the forecast precipitation data may be received in an automated manner from various servers or data repositories. In various embodiments, forecast precipitation data may be manually entered by the user.

In step 508, impermissible watering periods may be identified for each day in the watering schedule and for each smart zone. Impermissible watering period data may be received from one or more institutions that track and/or mandate impermissible watering periods, such as water utility companies, municipal and/or regional water management agencies and the like. In various embodiments, impermissible watering period data may be manually entered by the user.

Table 1 below illustrates various symbols along with their associated descriptions, as well as calculations related to each symbol. The various symbols and their associated calculations may be implemented in software code (not shown) in order to carry out one or more steps of the method 500 via the one or more processors associated with the irrigation controllers and systems of the present disclosure. The symbols, descriptions, and calculations identified in Table 1 are only exemplary and are not limiting of the manner in which the method 500 may be implemented.

Table 1 is as follows:

TABLE 1

| No. | SYMBOL | DESCRIPTION | CALCULATION |
| --- | --- | --- | --- |
| (1) | Wli | Initial water level (day) (i.e., in-soil water level 408) | starting-wl OR wlf-previous [previous water level] |

TABLE 1-continued

| No. | SYMBOL | DESCRIPTION | CALCULATION |
|---|---|---|---|
| (2) | env-mb-change | Change in moisture balance (i.e., in-soil water level 408) due to environmental-only conditions | net-rainfall - ETc [ETc = crop evapotranspiration] |
| (3) | wlf-ex-irr | Final water level ex irrigation (day) (Note: This is the in-soil water level 408 if there is no irrigation.) | wli + env-mb-change |
| (4) | next-watering-wl | Water level on the next day able to irrigate if no irrigation occurs on the current day (Note: This is the in-soil water level 408 at the end of the next day if no irrigation takes place.) | wlf-ex-irr + (sum of env-mb-change_no_water) |
| (5) | should-water | Should irrigation occur in the next few days? (boolean) (Note: This algorithm is applied to each of the upcoming days in a set of days to determine whether watering is permissible and desired on that day.) | can-water [i.e., each day in set of upcoming days] AND (min(wlf-ex-irr, next-watering-wl) < replenishment-point) |
| (6) | max-irrigation | Maximum amount of irrigation due to zone and timer restrictions | (MAX_CYCLES [maximum number of start times that irrigation timer hardware supports for a particular period] * (max-runtime) [the maximum amount of moisture that the soil can absorb in a single watering episode and is based on infiltration rate] * (application-rate) [irrigation application rate considering head type, etc.] * (application efficiency [a percentage of how much water reaches the root zone])/60 |
| (7) | net-irrigation | The net irrigation to apply on the current day | If (should-water?, minimum of (max-irrigation, maximum of (field-capacity-depth [the maximum amount of water that may be stored in a particular root zone] - wlf-ex-irr, 0)), 0) |
| (8) | wlf | Final water level including irrigation (day) (Note: This is the final in-soil water level 408 considering irrigation, precipitation and evapotranspiration.) | wlf-ex-irr + net-irrigation |

Continuing with step 510 of the method 500, in step 510, estimated in-soil water levels 408 can be calculated for each smart zone on each day in the watering schedule based on the forecast evapotranspiration data, the forecast precipitation data, and net irrigation for each smart zone. In this manner, it is possible to estimate and predict the future daily in-soil water levels for each smart zone on each day in the watering schedule in order to take corrective action as needed. In various embodiments, the estimated in-soil water levels 408 may also be calculated utilizing the symbols and calculations illustrated above in Table 1. For example: (1) an initial water level at the beginning of the day for a smart zone may be found utilizing the first symbol and calculation listed in Table 1; (2) a predicted change in moisture balance (i.e., estimated in-soil water level 408) due to environmental-only conditions may be found utilizing the second symbol and calculation in Table 1; (3) a final estimated in-soil water level 408 at the end of the day (assuming no irrigation takes place that day) may be found utilizing the third symbol and calculation in Table 1; (4) an in-soil water level 408 at the end of the next day (if no irrigation takes place) may be found utilizing the fourth symbol and calculation in Table 1; (5) a determination of whether irrigation should occur in the next few days may be found utilizing the fifth symbol and calculation in Table 1; (6) a maximum amount of irrigation water in light of zone and timer restrictions may be found utilizing the sixth symbol and calculation in Table 1; (7) a net irrigation watering amount on the current day may be found utilizing the seventh symbol and calculation in Table 1; and (8) a final in-soil water level including all pertinent considerations (e.g., irrigation, precipitation, and evapotranspiration) may be found for each smart zone utilizing the eighth symbol and calculation listed in Table 1. Once again, it should be noted that the calculations, descriptions and symbols included in Table 1 are merely exemplary and do not limit in any way the manner in which the method 500 may be implemented.

Table 2 below illustrates additional symbols along with their associated descriptions and calculations, which may also be implemented to carry out one or more steps of the method 500. The symbols, descriptions, and calculations identified in Table 2 are only exemplary and are not limiting of the manner in which the method 500 may be implemented.

Table 2 is as follows:

TABLE 2

| No. | SYMBOL | DESCRIPTION | CALCULATION |
|---|---|---|---|
| (1) | zone-gross-rt | Gross runtime to apply desired net-irrigation for a zone | (net-irrigation * 60)/ (application-rate * effciency [a percentage of how much water reaches the root zone]) |
| (2) | gross-rt | Gross runtime for the program | sum of zone-gross-ft |

Continuing with step 512 of the method 500, in step 512, a total desired watering time may be calculated for each smart zone for the next day. The total desired watering time calculations may be based on the predicted in-soil water levels calculated in step 510. For example, the total desired watering time may be calculated to completely refill the in-soil water levels calculated in step 510, or to refill the in-soil water levels calculated in step 510, as much as possible, given any relevant limitations. In various embodiments, the total desired watering time may be calculated utilizing the symbols and calculations illustrated above in Table 2. For example: (1) a gross runtime to apply a desired net irrigation amount to a smart zone may be found utilizing the first symbol and calculation listed in Table 2; and (2) a gross runtime for all zones in a program may be found utilizing the second symbol and calculation listed in Table 2. Once again it should be noted that the calculations, descriptions and symbols included in Table 2 are merely exemplary and do not limit in any way the manner in which the method 500 may be implemented.

Table 3 below illustrates additional symbols along with their associated descriptions and calculations which may additionally be implemented to carry out one or more steps of the method 500. The symbols, descriptions, and calculations identified in Table 3 are only exemplary and are not limiting of the manner in which the method 500 may be implemented.

Table 3 is as follows:

TABLE 3

| No. | SYMBOL | DESCRIPTION | CALCULATION |
|---|---|---|---|
| (1) | d0 | Irrigation day ending at midnight | |
| (2) | d1 | Day after irrigation day at midnight | d0 + 1 |
| (3) | d2 | Two days after irrigation day at midnight | d0 + 2 |
| (4) | can-water-tomorrow? | Whether can irrigate on d1 (boolean) [i.e., is tomorrow an impermissible watering period?] | |
| (5) | suggested-start | Customer-supplied suggested start time or default (Note: If the user has input a suggested start time, it will be used. Otherwise, the default start time will be used.) | if (suggested-start, suggested-start, DEFAULT_START) |
| (6) | rstart | Restriction start time (Note: beginning of an impermissible watering period) | |
| (7) | rstop | Restriction stop time (Note: end of an impermissible watering period) | |
| (8) | has-watering-restrictions? | True if rstart is set (boolean) | |
| (9) | has-normal-restrictions? | True when the rstart is before the rstop (boolean) (Note: Normal restrictions extend from, for example, 6:00 AM to 10:00 PM each day. i.e., the start of the restriction period is within the same day as the end of the restriction period.) | rstart < rstop |
| (10) | unrestricted-watering-in | Allowable watering interval if no restrictions exist (Note: How long can the system water until a daily restriction (i.e no watering is permitted on Tuesday and Thursday) is encountered. A time restriction is one in which watering is restricted within particular times within a day.) | Interval (suggested-start, if (can-water-tomorrow?, d1, d2)) |
| (11) | normal-early-in | The early interval before restricted times for normal restrictions (Note: This is the length of the permissible watering interval before time of day restrictions apply after midnight on a particular day assuming that normal restrictions apply (i.e., the restriction stall time and restriction in time both | Interval (d0, rstart) |

TABLE 3-continued

| No. | SYMBOL | DESCRIPTION | CALCULATION |
|---|---|---|---|
| | | fall within the same day).) | |
| (12) | normal-late-in | The late interval after restricted times for normal restrictions Note: This is the length of the permissible watering interval after the restrictions have been lifted when normal restrictions apply.) | Interval (rstop, if(can-water-tomorrow?, d1 + rstart, d1)) |
| (13) | normal-default-in | The default to use between early and late normal intervals for normal restrictions (Note: Using normal restrictions, is the early or late watering interval closest to the requested start time?) | Closest (suggested-start, normal-early-in, normal-late-in) |
| (14) | normal-adjusted-default-in | Normal default interval with gross runtime adjustments factored into interval start/stop (Note: Identify a watering interval within the selected early or late watering interval based on amount of watering required to achieve a desired in-soil water level.) | if(normal-default-in = normal-early-in, interval(end(normal-early-in) - gross-rt, end (normal-early-in)), normal-late-in) |
| (15) | normal-largest-in | Largest of the early and late normal intervals (Note: Select the larger of the early and late intervals.) | if(normal-early-in > normal-late-in, normal-early-in, normal-late-in) |
| (16) | normal-suggested-in | Normal interval with the suggested start as the start time (Note: Length of the interval selected if the suggested start time is used.) | interval(suggested-start, end(normal-default-in)) |
| (17) | inverted-in | Interval where rstart is later than rstop (Note: Using an inverted restriction (i.e., the restriction period begins on one day and ends on the following day), calculate the start and stop time (the interval) of the watering interval excluding the restriction.) | interval(rstop, rstart) |
| (18) | inverted-suggested-in | Inverted interval with suggested-start at the beginning (Note: Calculate the inverted interval considering the requested start time.) | interval(suggested-start, end(inverted-in)) |
| (19) | can-use-suggested-start? | True if the suggested intervals are large enough to water gross-rt minutes (Note: Is true if either the normal or inverted suggested interval exceeds the desired gross runtime) | (normal-suggested-in OR inverted-suggested-in) >= gross-rt |
| (20) | can-use-default-in? | True if normal-default-in [internal closest to the suggested start | normal-default-in >= gross-rt |

TABLE 3-continued

| No. | SYMBOL | DESCRIPTION | CALCULATION |
|---|---|---|---|
| | | time] is at least gross-rt minutes | |
| (21) | watering-in | Final allowable watering interval selection | when has-watering-restrictions = false, unrestricted-watering-in WHEN has-normal-restrictions? AND can-use-suggested-start?, normal-suggested-in WHEN has-normal-restrictions AND can-use-default-in?, normal-adjusted-default-in WHEN has-normal-restrictions? normal-largest-in WHEN can-use-suggested-start?, inverted-suggested-in ELSE inverted-in |

Continuing with step 514 of the method 500, in step 514, watering interval times may be calculated based on the total desired watering times calculated in step 512 taking into further consideration any impermissible watering periods. For example, once the total desired watering times for each smart zone are known, the method 500 may try to fit the total desired watering times within a permissible watering period. If, however, the total desired watering times for each smart zone do not fit into the permissible watering period, then the method 500 may compress each watering interval time for each smart zone and/or truncate one or more watering interval time for individual smart zones, as will be discussed in more detail herein. In various embodiments, the watering interval times may be calculated utilizing the symbols and calculations illustrated above in Table 3. For example: (1) an irrigation day ending at midnight may be represented by the first symbol in Table 3; (2) a day after irrigation day (starting at midnight) may be found utilizing the second symbol and calculation listed in Table 3; (3) a second day after the irrigation day (starting at midnight) may be found utilizing the third symbol and calculation listed in Table 3; (4) a determination of whether or not tomorrow is a permissible irrigation day may be represented by the fourth symbol in Table 3; (5) a suggested start time may be represented by the fifth symbol and calculation in Table 3; (6) a restriction start time may be represented by the sixth symbol in Table 3; (7) a restriction stop time may be represented by the seventh symbol in Table 3; (8) a watering restriction boolean variable may be represented by the eighth symbol in Table 3; (9) another watering restriction boolean variable may be represented by the ninth symbol and calculation listed in Table 3; (10) an allowable watering interval if no restrictions exist may be found utilizing the tenth symbol and calculation listed in Table 3; (11) an early interval before restricted times for normal restrictions may be found utilizing the eleventh symbol and calculation listed in Table 3; (12) a late interval after restricted times for normal restrictions may be found utilizing the twelfth symbol and calculation listed in Table 3; (13) a default interval to use between early and late normal intervals for normal restrictions may be found utilizing the thirteenth symbol and calculation listed in Table 3; (14) a normal default interval, with gross runtime adjustments factored into interval start/stop times may be found utilizing the fourteenth symbol and calculation listed in Table 3; (15) a largest of the early and late normal intervals may be found utilizing the fifteenth symbol and calculation listed in Table 3; (16) a normal interval with the suggested start as the start time may be found utilizing the sixteenth symbol and calculation listed in Table 3; (17) an inverted interval may be found utilizing the seventeenth symbol and calculation listed in Table 3; (18) an inverted interval considering the requested start time may be found utilizing the eighteenth symbol and calculation listed in Table 3; (19) a determination of whether or not the suggested intervals are large enough to water the desired gross runtime may be found utilizing the nineteenth symbol and calculation listed in Table 3; (20) a determination of whether or not the normal-default-in (internal closest to the suggested start time) is at least the desired gross runtime minutes may be found utilizing the twentieth symbol and calculation listed in Table 3; and (21) a final allowable watering interval selection may be found utilizing the twenty-first symbol and calculation listed in Table 3. Once again it should be noted that the calculations, descriptions and symbols included in Table 3 are merely exemplary and do not limit in any way the manner in which the method 500 may be implemented.

Table 4 below illustrates additional symbols along with their associated descriptions and calculations, which may also be implemented to carry out one or more steps of the method 500. The symbols, descriptions, and calculations identified in Table 4 are only exemplary and are not limiting of the manner in which the method 500 may be implemented.

Table 4 is as follows:

TABLE 4

| No. | SYMBOL | DESCRIPTION | CALCULATION |
|---|---|---|---|
| (1) | compression | Percentage to compress gross-rt if the interval calculated is less than gross-rt minutes | minimum of (1, watering-in/gross-rt) |
| (2) | cycles | Number of cycles the program should run (Note: This is the minimum of the maximum number of cycles that a particular timer will support and the number of cycles that are needed applying the particular compression percentage considering infiltration rate.) | Minimum of (MAX_CYCLES, max(ceiling((compression) * (zone-gross-rt)/(max-runtime)))) |
| (3) | cycle-time | Gross runtime for each cycle (each cycle includes multiple zones at different times) | Sum of ceiling(zone-gross-rt * compression/cycles) |
| (4) | num-zones-watering | Number of zones watered in this program (input by user or determined by number of the valves connected) | |
| (5) | soak-time | Minutes to soak between cycles (Note: minutes to soak between cycles may be zero if the cycle is sufficiently long.) | if(num-zones-watering = 1 OR cycle-time < MIN_SOAK_MINS [established minimum soak time between cycles or could employ user in input], MIN_SOAK_MINS, 0) |
| (6) | start-times | Times of day to start each cycle (Note: Starting at the beginning time of the interval, identify a start | for cycles, loop t = start(watering-in), return t + cycle-time + soak-time |

TABLE 4-continued

| No. | SYMBOL | DESCRIPTION | CALCULATION |
|---|---|---|---|
| | | time considering the cycle time added to the soak time and repeat if more water is needed.) | |
| (7) | run-times | How long to run each zone in each cycle (Note: How long should each zone run within each cycle?) | For each zone, min(max-runtime,ceiling(zone-gross-rt * compression/cycles)) |

Continuing with step 516 of the method 500, in step 516, start times and total scheduled watering times may be calculated for each smart zone based on the considerations and results obtained in step 514. In various embodiments, the start times and total scheduled watering times may be calculated utilizing the symbols and calculations illustrated above in Table 4. For example: (1) a percentage to compress a gross runtime may be found utilizing the first symbol and calculation listed in Table 4; (2) a number of cycles the program may run may be found utilizing the second symbol and calculation listed in Table 4; (3) a gross runtime for each cycle may be found utilizing the third symbol and calculation listed in Table 4; (4) a number of zones watered in a program may be found utilizing the fourth symbol and calculation listed in Table 4; (5) a number of minutes to soak between cycles may be found utilizing the fifth symbol and calculation listed in Table 4; (6) a time of day to start each cycle may be found utilizing the sixth symbol and calculation listed in Table 4; and (7) a run-time (or run-times) may be found utilizing the seventh symbol and calculation listed in Table 4. Once again it should be noted that the calculations, descriptions and symbols included in Table 4 are merely exemplary and do not limit in any way the manner in which the method 500 may be implemented.

In step 518, a watering schedule may be formulated based on the start times and total scheduled watering times that were calculated for each smart zone in step 516.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified or various steps may be combined within the scope of the present disclosure.

Figure 6:
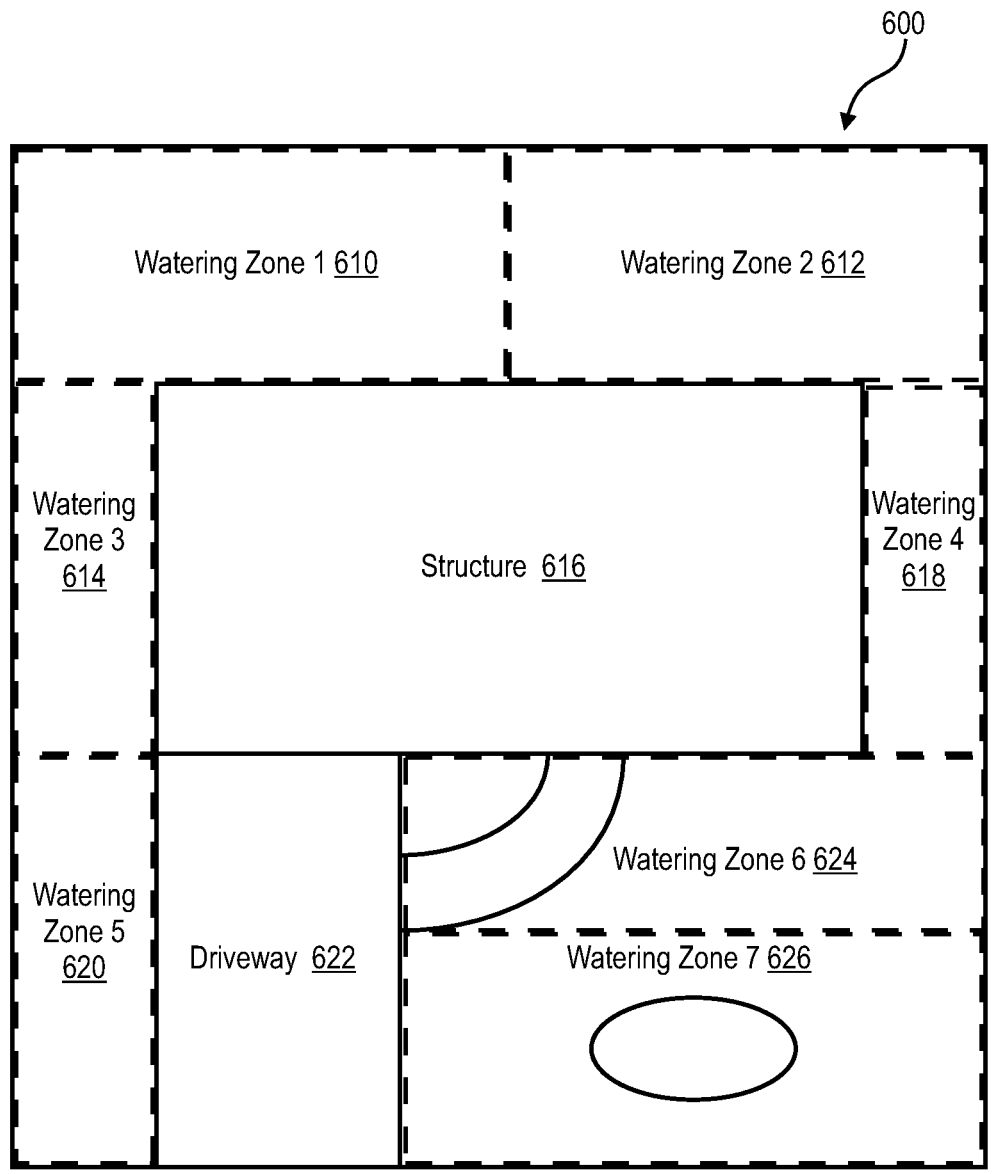
FIG. 6 illustrates one embodiment of a property with multiple watering zones.

Referring now to FIG. 6, an exemplary property 600 with multiple watering zones is illustrated. The exemplary property 600 of FIG. 6 includes seven distinct watering zones 610, 612, 614, 618, 620, 624, 626, a structure 616, and a driveway 622. However, it will be understood that different properties can have any number of watering zones and non-watering zones.

Figure 7:
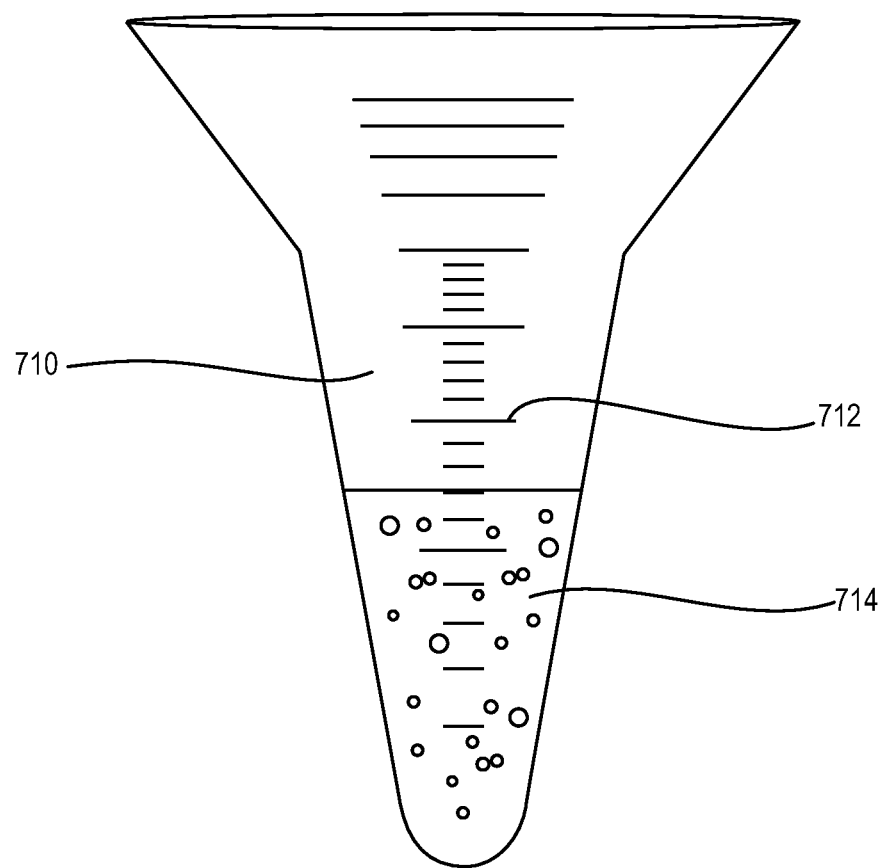
FIG. 7 illustrates one embodiment of a catch cup for measuring applied irrigation water.

FIG. 7 illustrates one embodiment of a catch cup 710 designed to capture and measure water 714 in order to facilitate embodiments of the present disclosure described herein. A catch cup 710 may be utilized, for example, to identify the amount of irrigation water applied by a sprinkling system to a particular location on a watered property within a particular period of time. The catch cup 710 may include one or more measurement markings 712 configured to indicate a level of the water 714 that has been captured by the catch cup 710.

Figure 8A:
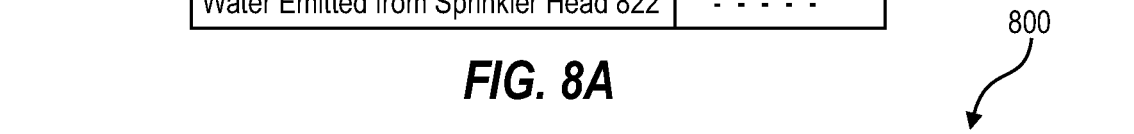
FIGS. 8A-8E illustrate an exemplary watering zone with catch cups arranged to measure applied irrigation water at various points within one embodiment of a watering zone.
Figure 8B:
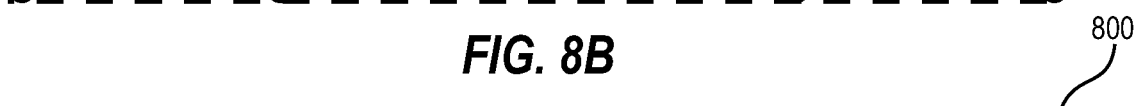
Figure 8C:
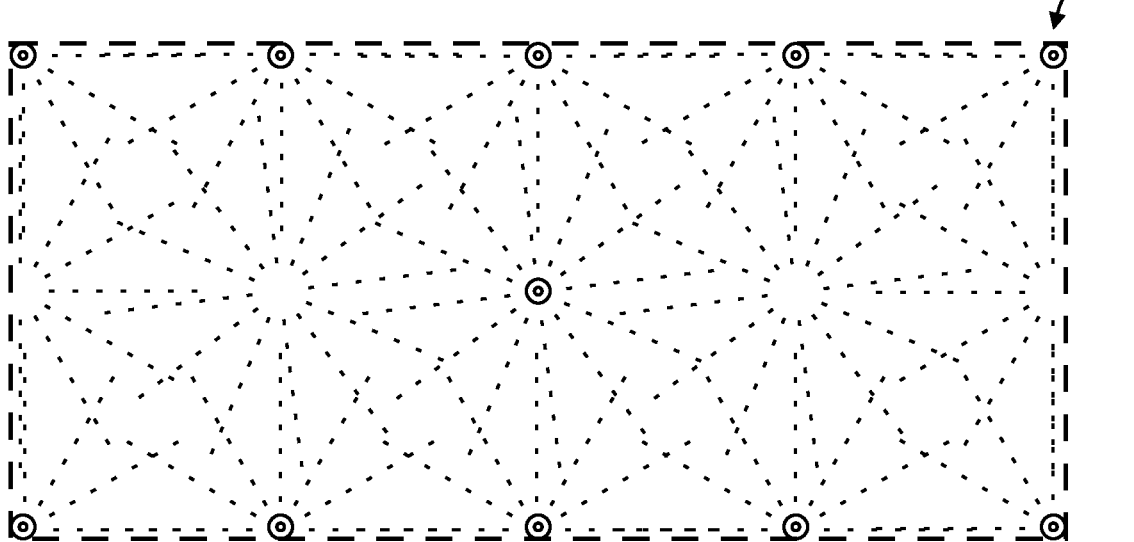
Figure 8D:
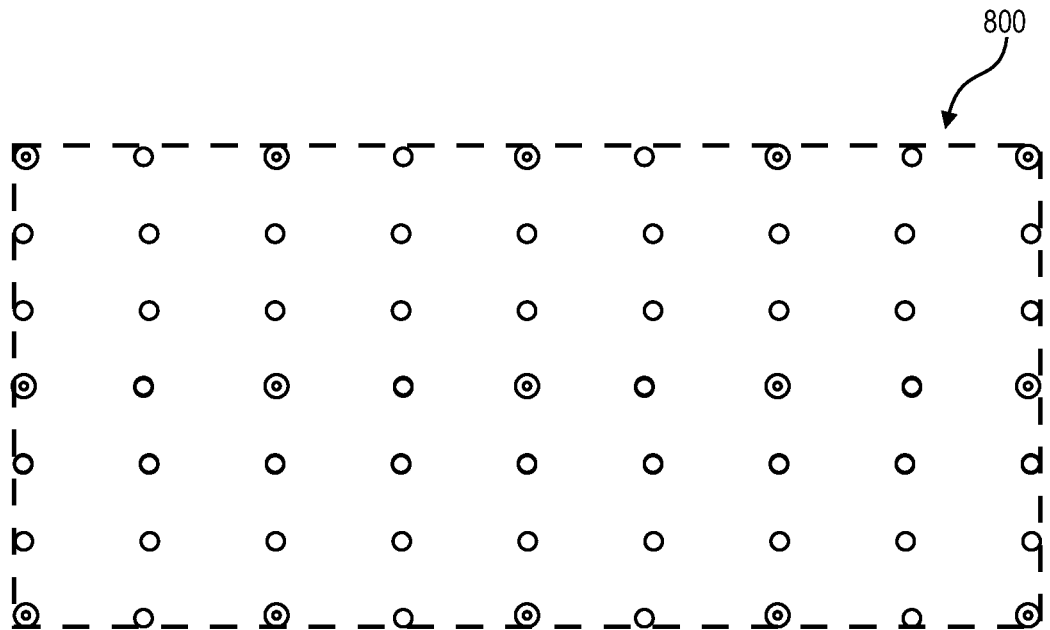
Figure 8E:
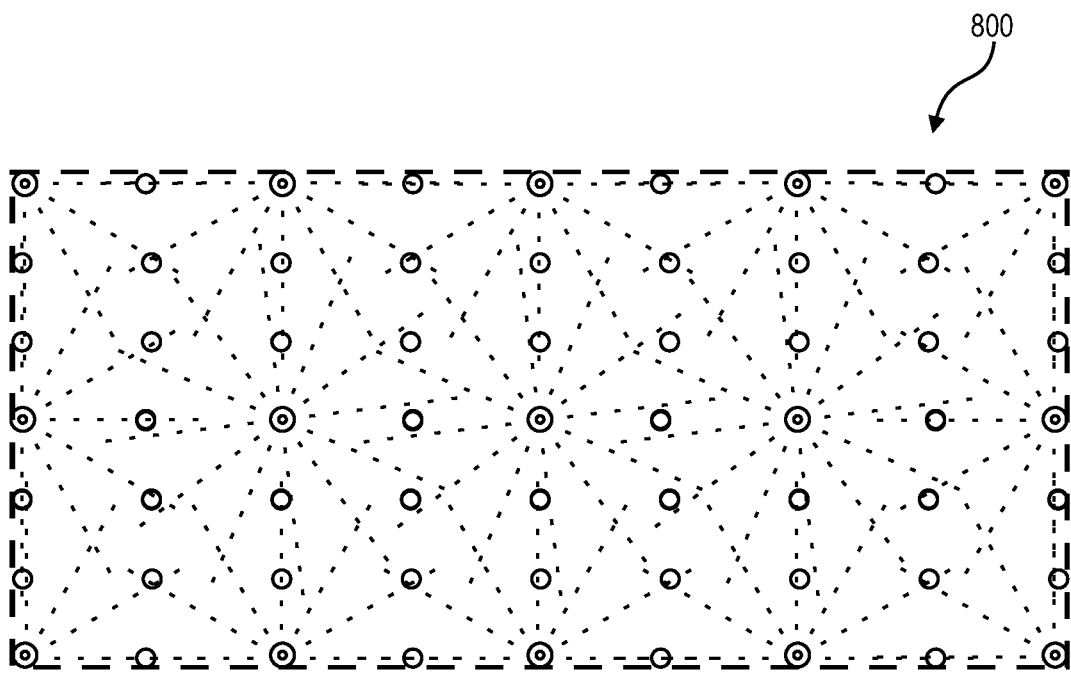

FIGS. 8A-8E illustrate how an exemplary watering zone 800 may utilize catch cups 710 to measure applied irrigation water at various points within the exemplary watering zone 800 in order to calculate a distribution uniformity of the water received from the sprinkler heads 820 throughout the exemplary watering zone 800. FIG. 8A is a legend of symbols pertaining to FIGS. 8B-8E. FIG. 8B illustrates the exemplary watering zone 800 with sprinkler heads 820 regularly spaced throughout the exemplary watering zone 800 with no water being emitted from the sprinkler heads 820. FIG. 8C illustrates the exemplary watering zone 800 with the sprinkler heads 820 emitting water. FIG. 8D illustrates the exemplary watering zone 800 with sprinkler heads 820 and catch cups 710 regularly spaced throughout the exemplary watering zone 800 with no water being emitted from the sprinkler heads 820. FIG. 8E illustrates the exemplary watering zone 800 with the sprinkler heads 820 emitting water, such that the catch cups 710 may capture the water from the sprinkler heads 820 and a distribution uniformity of the water may be calculated for the exemplary watering zone 800. A distribution uniformity value for the applied irrigation water may be calculated, for example, based on the average of the measurement values (i.e., water levels) of all catch cups 710 in the exemplary watering zone 800, the average of the measurement values of the lowest quartile of catch cups 710 in the exemplary watering zone 800, or any other subset of the catch cups 710 in the exemplary watering zone 800.

Figure 9:
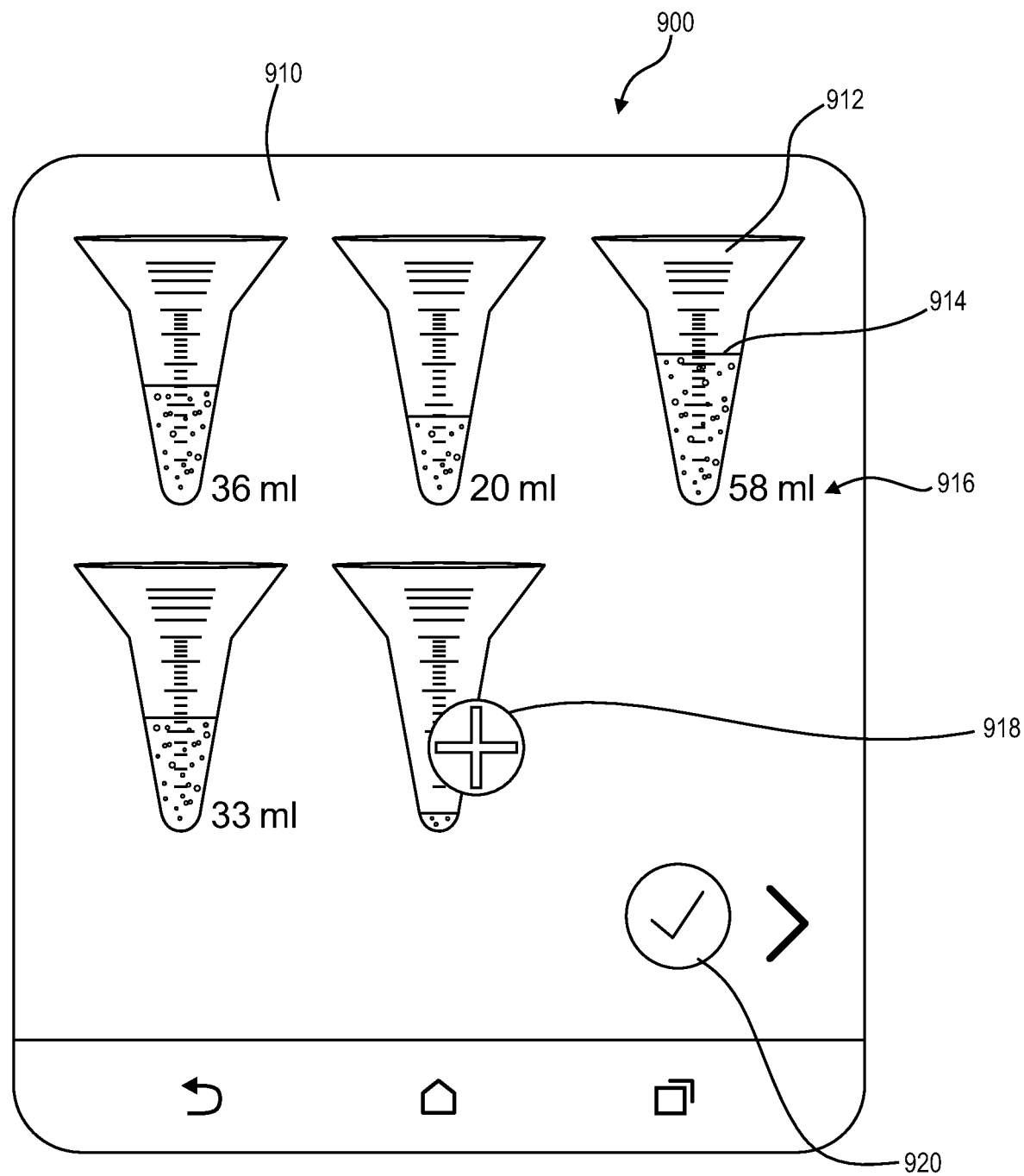
FIG. 9 is one embodiment of a graphical user interface configured to receive catch cup data.

FIG. 9 illustrates one embodiment of a graphical user interface 910 configured to receive and record catch cup data via a suitable end-user device 900. The graphical user interface 910 may include a visual representation of one or more catch cups 912, a visual representation of a water level 914 associated with each of the one or more catch cups 912, a numeric value of the water level 916 associated with each of the one or more catch cups 912, an add catch cup icon 918, and a completed icon 920. In this manner, the graphical user interface 910 can help simplify the process of calculating one or more distribution uniformity values based on the catch cup data.

Figure 10A:
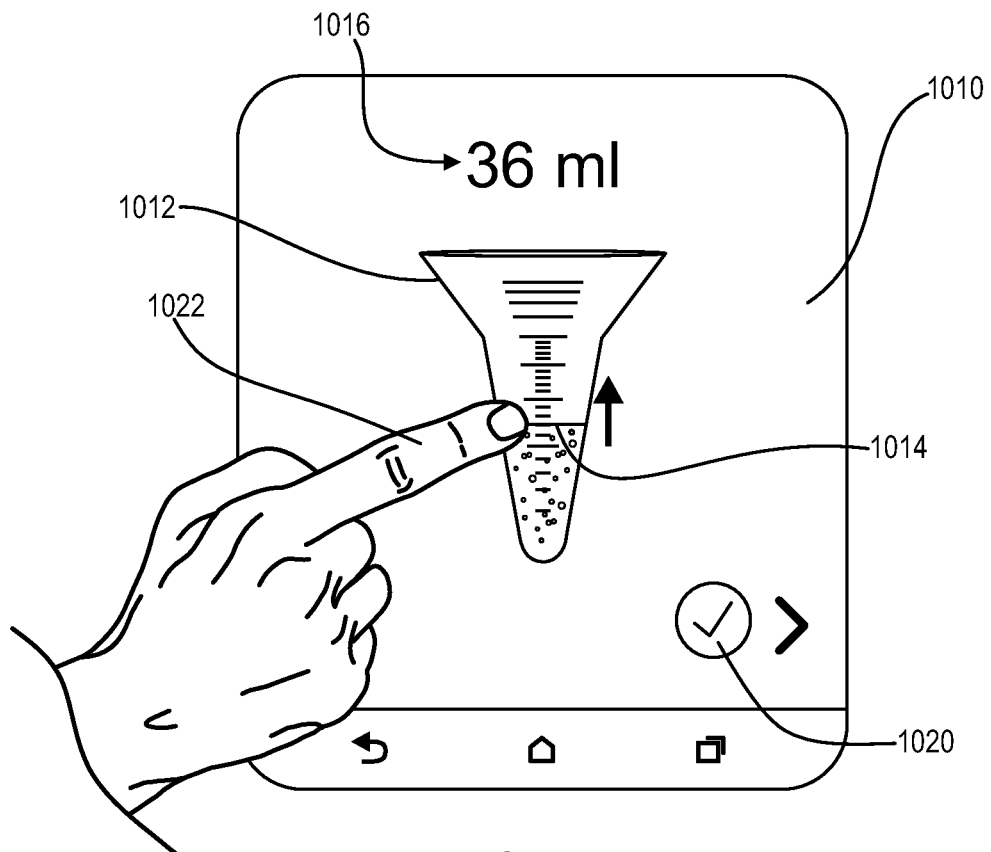
FIGS. 10A and 10B illustrate a graphical user interface for inputting measurement values for a catch cup shown together with the user inputting one such value.
Figure 10B:
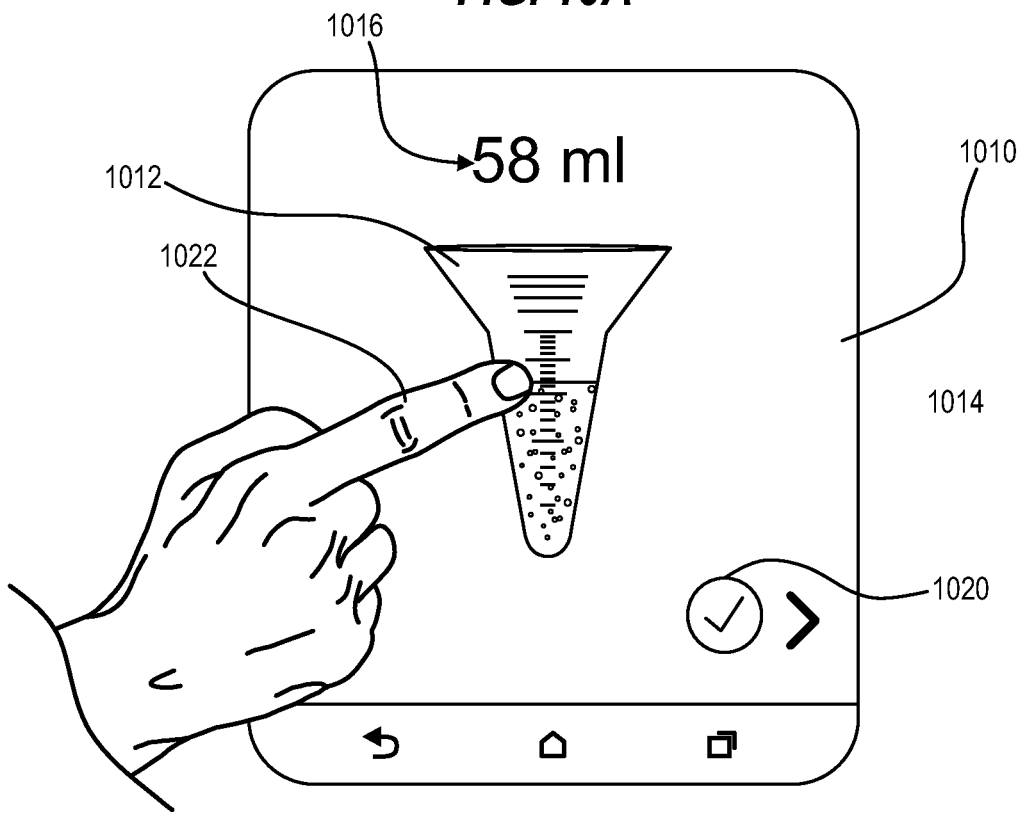

FIGS. 10A and 10B illustrate how a user may use her or his finger 1022 to enter catch cup data in various embodiments of a graphical user interface 1010. The graphical user interface 1010 may include a visual representation of one or more catch cups 1012, a visual representation of a water level 1014 associated with each of the one or more catch cups 1012, a numeric value representing the water level 1016 associated with each of the one or more catch cups 1012, and a completed icon 1020. In this example, the user may use his or her finger 1022 to enter catch cup data by selecting a water level 1014 on the visual representation of the catch cup 1012 by touching the water level 1014 or sliding his or her finger up and down (sometimes referred to as "upward or downward touch input") to adjust the water level 1014 measurement. However, it will be understood that in other embodiments, a touch-responsive interface may not be used (e.g., the user may enter the catch cup data via a mouse pointer, a keyboard, or any other known method).

Figure 11A:
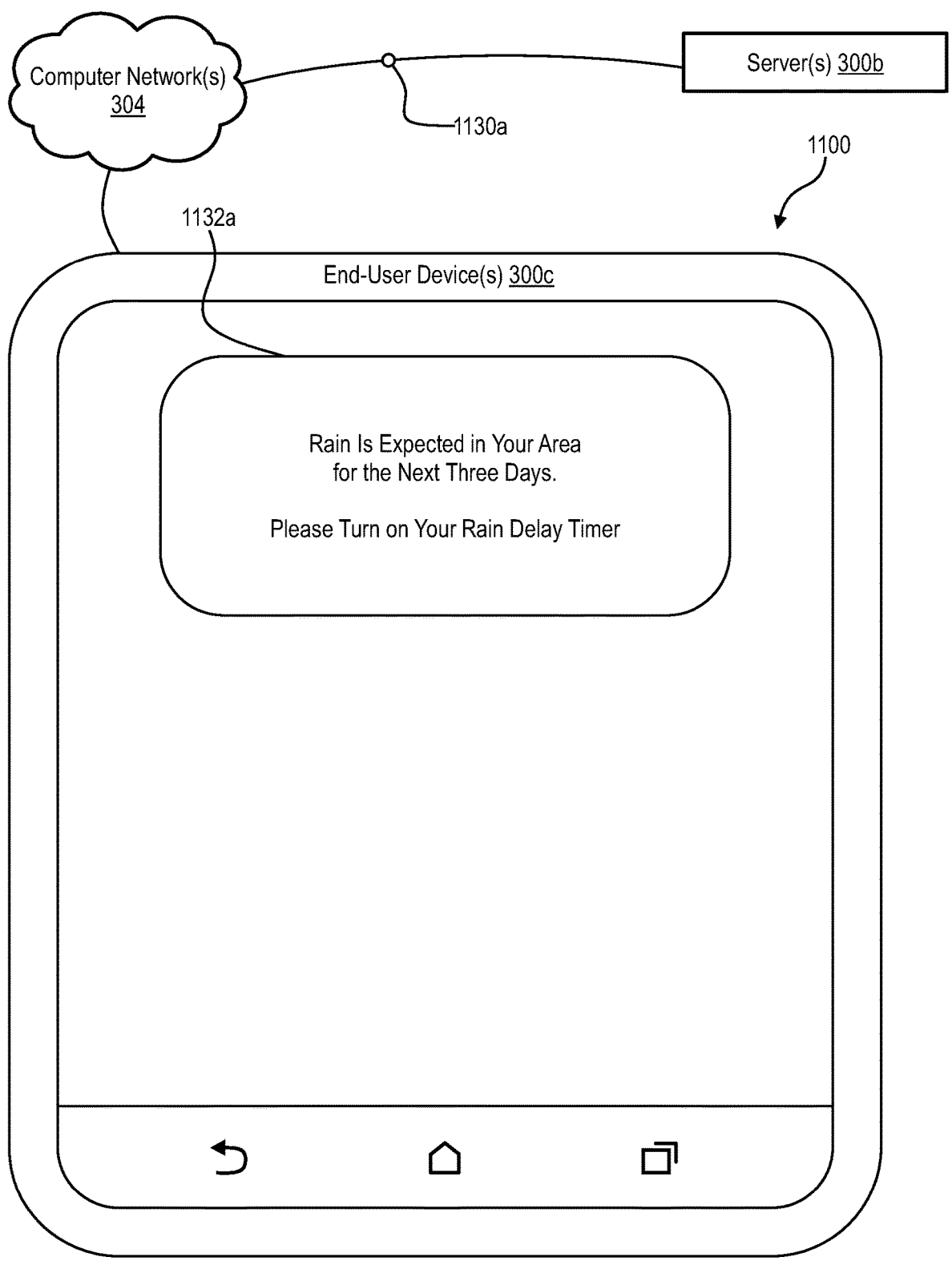
FIGS. 11A and 11B illustrate one embodiment of a system configured to transmit water usage notifications.
Figure 11B:
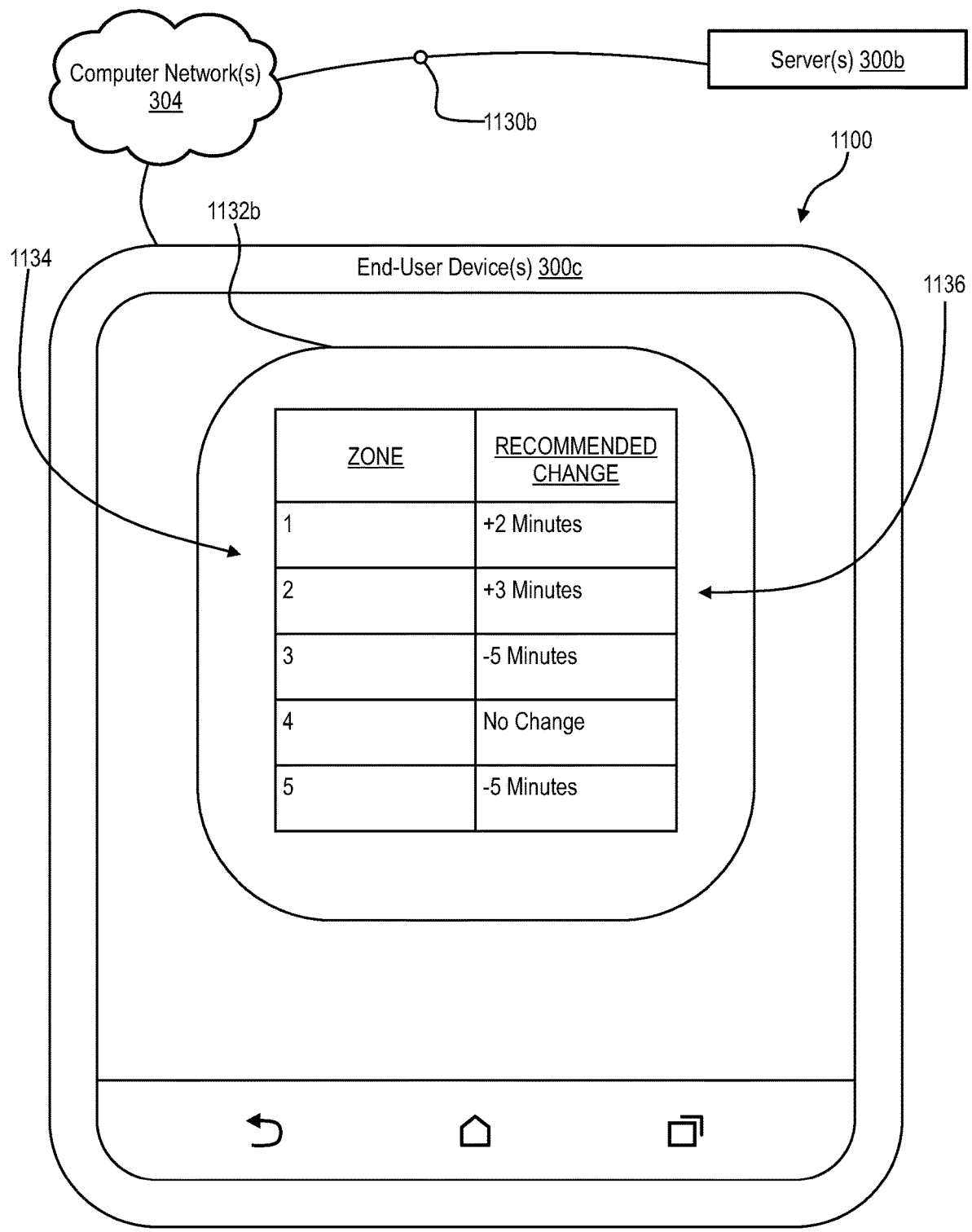

FIGS. 11A and 11B illustrate one embodiment of a system 1100 configured to transmit water usage notifications 1130a and recommendations to the user. The system 1100 may include one or more end-user device(s) 300c, one or more server(s) 300b, and one or more computer network(s) 304. The one or more server(s) 300b may be configured to electronically transmit the notification 1130a to the one or more end-user device(s) 300c via the one or more computer network(s) 304. The one or more end-user device(s) 300c may then be configured to display a visual representation 1132a of the notification 1130a to the user. In this manner, a user with a non-automated, or partially automated, irrigation controller device (not shown) can receive useful information and recommendations that help the user achieve improved water conservation and irrigation efficiency through manually adjusting the user's non-automated, or partially automated, irrigation controller device. For example, the visual representation 1132a of the notification 1130a in FIG. 11A alerts the user to expect rain during the next three days and recommends that the user turns on the rain delay timer. Similarly, the visual representation 1132b of the notification 1130b in FIG. 11B alerts the user to recommended water schedule changes via a zone column 1134 and a recommended changes column 1136 identifying recommended water schedule changes for one or more watering zones.

Figure 12A:
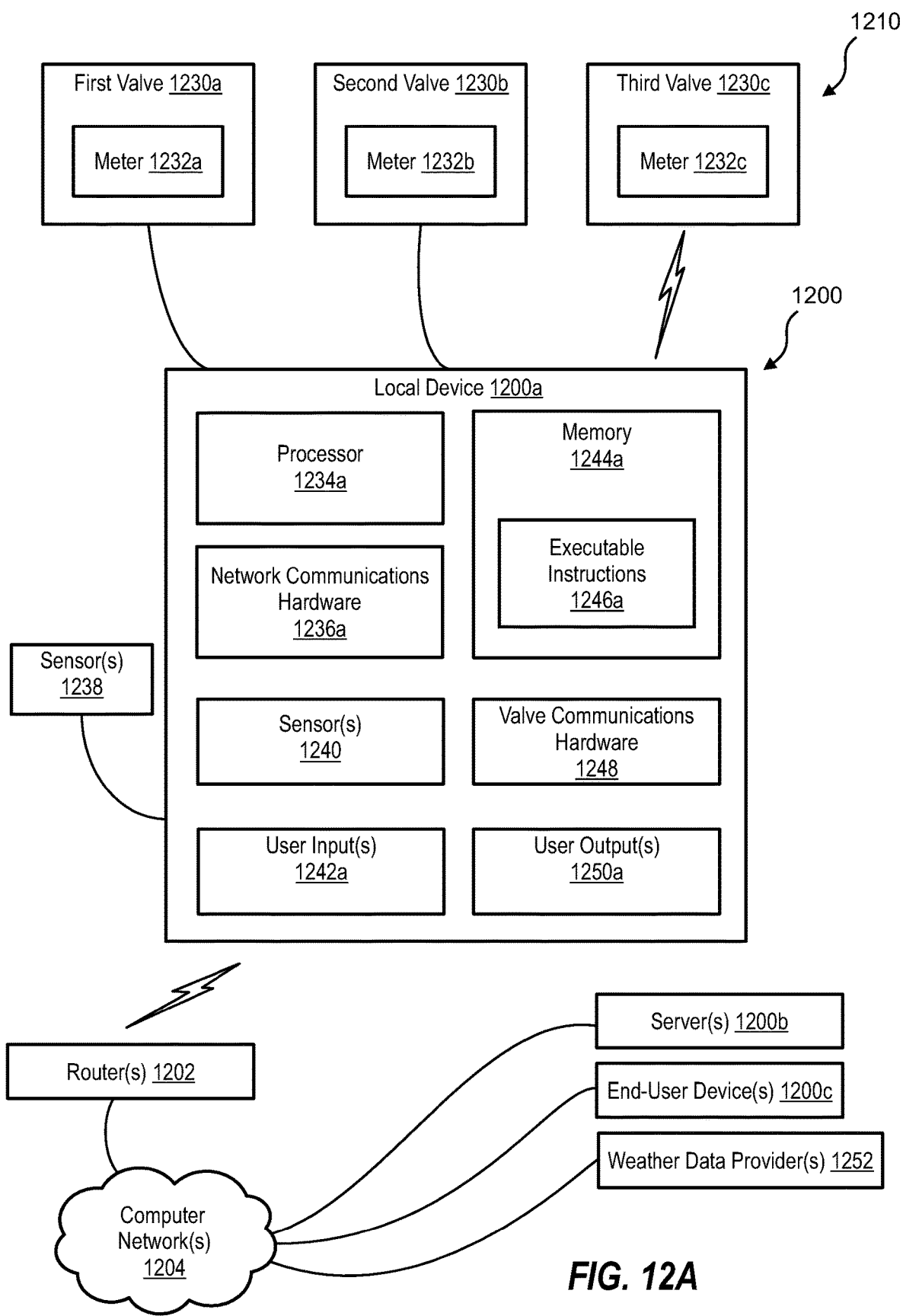
FIG. 12A is a schematic block diagram illustrating one embodiment of an irrigation system including an irrigation controller.

FIG. 12A is a schematic block diagram illustrating one embodiment of an irrigation system 1210 including a series of irrigation valves 1230a-c, one or more weather data provider(s) 1252, and an irrigation controller 1200. The irrigation controller 1200 may comprise a local device 1200a, one or more sensor(s) 1238, one or more router(s) 1202, one or more computer network(s) 1204, one or more server(s) 1200b, and one or more end-user device(s) 1200c one or more router(s) 1202, the one or more computer network(s) 1204, the one or more server(s) 1200b, and the one or more end-user device(s) 1200c may include, for example, similar components and functionality as those shown in the irrigation controller 300 of FIG. 3 and, accordingly, will not be described again.

Each of the irrigation valves 1230a-c may comprise hardware, such as a solenoid valve, that opens and closes a water flow pathway associated with each valve 1230a-c in response to electrical signals generated by the irrigation controller 1200. Each of the irrigation valves 1230a-c may also include an optional meter 1232a-c. Each meter 1232a-c may monitor the amount of water flowing through each of the valves 1230a-c. Water meter flow data may be related to the amount of water flowing through each of the valves 1230a-c and may be transmitted wirelessly or via a wired connection to the local device 1200a. The water meter flow data may be in the form of an electronic signal that uniquely identifies each valve 1230a-c to which the water meter flow data pertains in order to distinguish the water meter flow data related to each of the valves 1230a-c. The meters 1232a-c may be positioned in alternative locations throughout the system 1210. For example, a single meter 1232a-c could pertain to multiple valves 1230a-c or all of the valves 1230a-c. In various embodiments, one or more of the valves 1230a-c could comprise the hose faucet irrigation controller 200 shown in FIG. 2. Moreover, in at least one embodiment, the local device 1200a may be, for example, the multi-zone irrigation controller 100 of FIG. 1.

As shown, the local device 1200a may include a processor 1234a that is designed to execute instructions. The processor 1234a may be of any of a wide variety of types, including microprocessors with x86-based architecture or other architecture known in the art, application-specific integrated circuits (ASICs), field-programmable gate arrays (FPGA's), and the like. The processor 1234a may optionally include multiple processing elements, or "cores." The processor 1234a may include a cache that provides temporary storage of data incident to the operation of the processor 1234a.

The local device 1200a may further include memory 1244a, which may be volatile memory (such as random-access memory (RAM)) and/or non-volatile memory (such as a solid-state drive or a hard disk drive). The memory 1244a may include one or more memory modules (not shown), executable instructions 1246a, data referenced by such executable instructions 1246a, and/or any other data that may beneficially be made readily accessible to the processor 1234a.

The local device 1200a may further include network communications hardware 1236b to facilitate wired and/or wireless communications between the local device 1200a and any other device in the system 1210. The network communications hardware 1236b may include Ethernet adapters, universal serial bus (USB) adapters, and/or any wireless hardware utilizing the protocols described previously with reference to FIG. 3 such as Wi-Fi adapters, ZigBee adapters, Z-Wave adapters, Bluetooth adapters, cellular adapters, and/or the like.

The local device 1200a may also include any number of sensors 1240 integrated with the local device 1200a and/or sensors 1238 that may be separate from, but in communication with the local device 1200a. Types of sensors 1238, 1240 may include, but are not limited to: temperature sensors, precipitation sensors, soil moisture sensors, humidity sensors, wind sensors, and the like. Examples of local devices 1200a are provided in FIGS. 1 and 2 herein.

The local device 1200a may also include valve communications hardware 1248 configured to communicate with and/or control each of the valves 1230a-c associated with the system 1210. The valve communications hardware 1248 may include, for example, a TRIAC, wiring and/or connection mechanisms to attach wiring to the local device 1200a. In one or more embodiments, the local device 1200a may communicate wirelessly with one or more of the valves 1230a-c. Accordingly, the valve communications hardware 1248 may comprise a wireless transmitter and/or wireless transit for communicating with one or more of the valves 1230a-c. In alternative embodiments, valve communication hardware 1248 may also be included in a server or end-user device. A valve communications hardware 1248 may be in electronic communication with the processor 1234a. The valve communications hardware 1248 may be configured to generate electrical signals to control one or more irrigation valves 1230a-c, each of the one or more irrigation valves 1230a-c being associable with at least one watering zone of a property.

The local device 1200a may additionally include one or more user inputs 1242a configured to receive input from the user. The user inputs 1242a may be integrated into the local device 1200a, or may be separate from the local device 1200a and connected to it via a wired or wireless connection. The user inputs 1242a may include elements such as touch-responsive screens, buttons, keyboards, mice, track balls, track pads, styli, digitizers, digital cameras, microphones, and/or other user input devices known in the art.

The local device 1200a may also include one or more user outputs 1250a configured to provide output to the user. The user outputs 1250a may be integrated into the local device 1200a or may be separate from the local device 1200a and connected to it via a wired or wireless connection. The user outputs 1250a may include elements such as a display screen, speaker, vibration device, LED or other lights, and/or other output devices known in the art. In some embodiments, one or more of the user inputs 1242a may be combined with one or more of the user outputs 1250a, as may be the case with a touch-responsive screen.

The local device 1200a may include various other components not shown or described herein. Those of skill in the art will recognize, with the aid of the present disclosure, that any such components may be used to carry out embodiments of the present disclosure, in addition to or in the alternative to the components shown and described in connection with FIG. 12A.

Figure 12B:
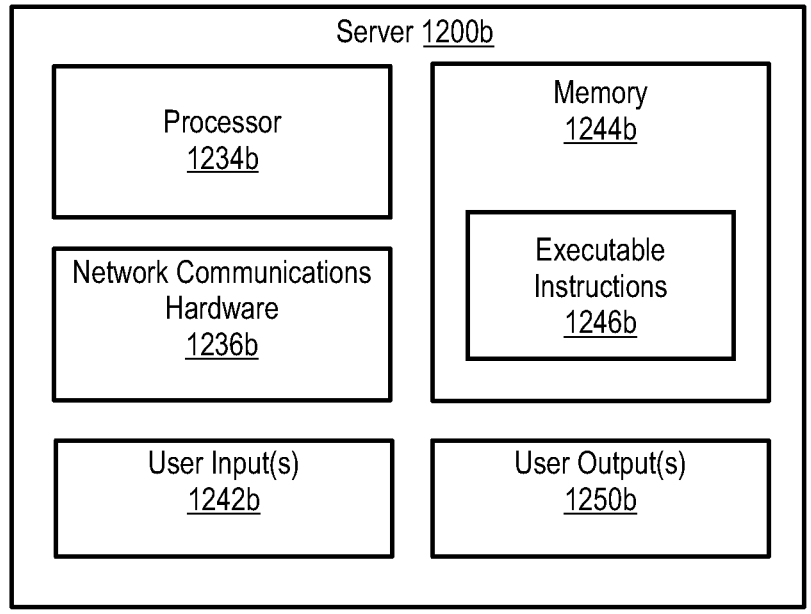
FIG. 12B is a schematic block diagram illustrating a server, which may comprise at least a portion of an irrigation controller.
Figure 12C:
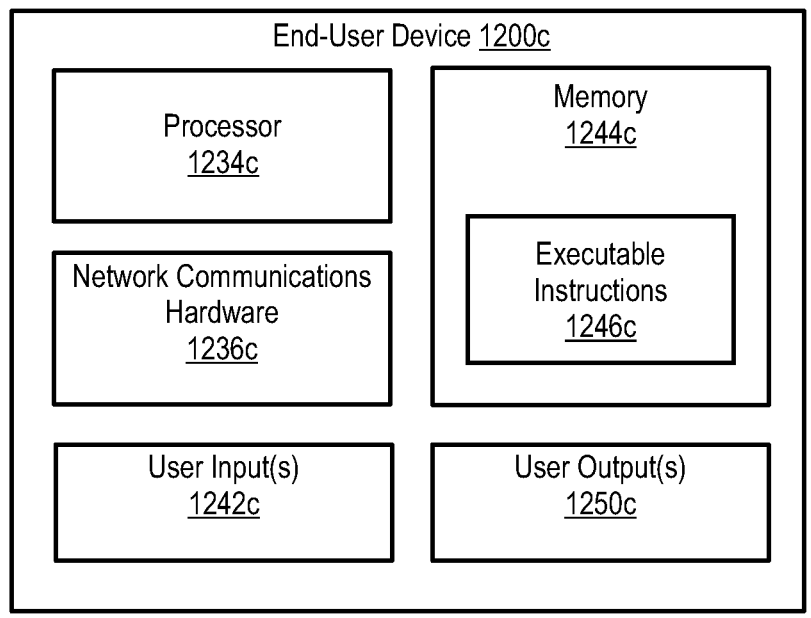
FIG. 12C is a schematic block diagram illustrating an end-user device, which may comprise at least a portion of an irrigation controller.

FIG. 12B is a schematic block diagram illustrating a server 1200b, which may cooperate with the end-user device 1200c of FIG. 12C to enable practice of embodiments of the present disclosure with client/server architecture. In this embodiment, the end-user device 1200c may be configured to function as a "dumb terminal," that is, it may be made to function in conjunction with the server 1200b. For example, in various embodiments the end-user device 1200c may be a smartphone configured to merely interface the user with the server 1200b. However, it will be understood that in other embodiments, the end-user device 1200c may be configured to carry out embodiments of the present disclosure in a standalone computing environment (i.e., without relying on communication with or through other devices). As noted above, the end-user device 1200c may comprise, for example, a notebook computer, a laptop computer, a tablet, a mobile phone, a smartphone or a desktop computer.

Computing functions may be carried out, in various embodiments, by the server 1200b and/or by the end-user device 1200c in various combinations. Thus, the processors 1234b, 1234c, the memory 1244b, 1244c, the executable instructions 1246b, 1246c, the network communications hardware 1236b, 1236c the user inputs 1242b, 1242c, and the user outputs 1250b, 1250c may be housed in the server 1200b and/or the end-user device 1200c and may have similar functions to those components previously described in FIG. 12A.

Figure 13A:
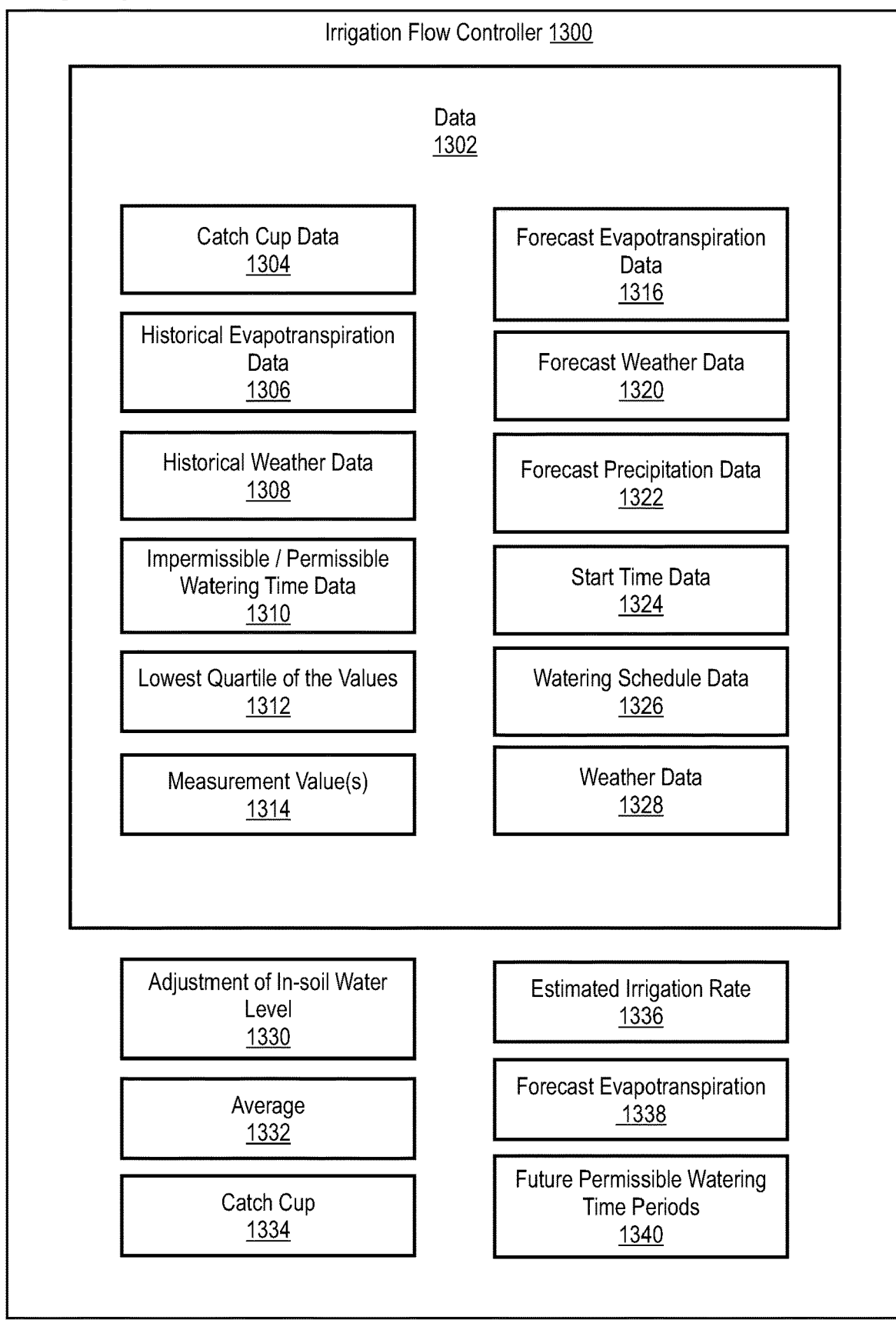
FIGS. 13A-B illustrate a functional block diagram of one embodiment of an irrigation controller.
Figure 13B:
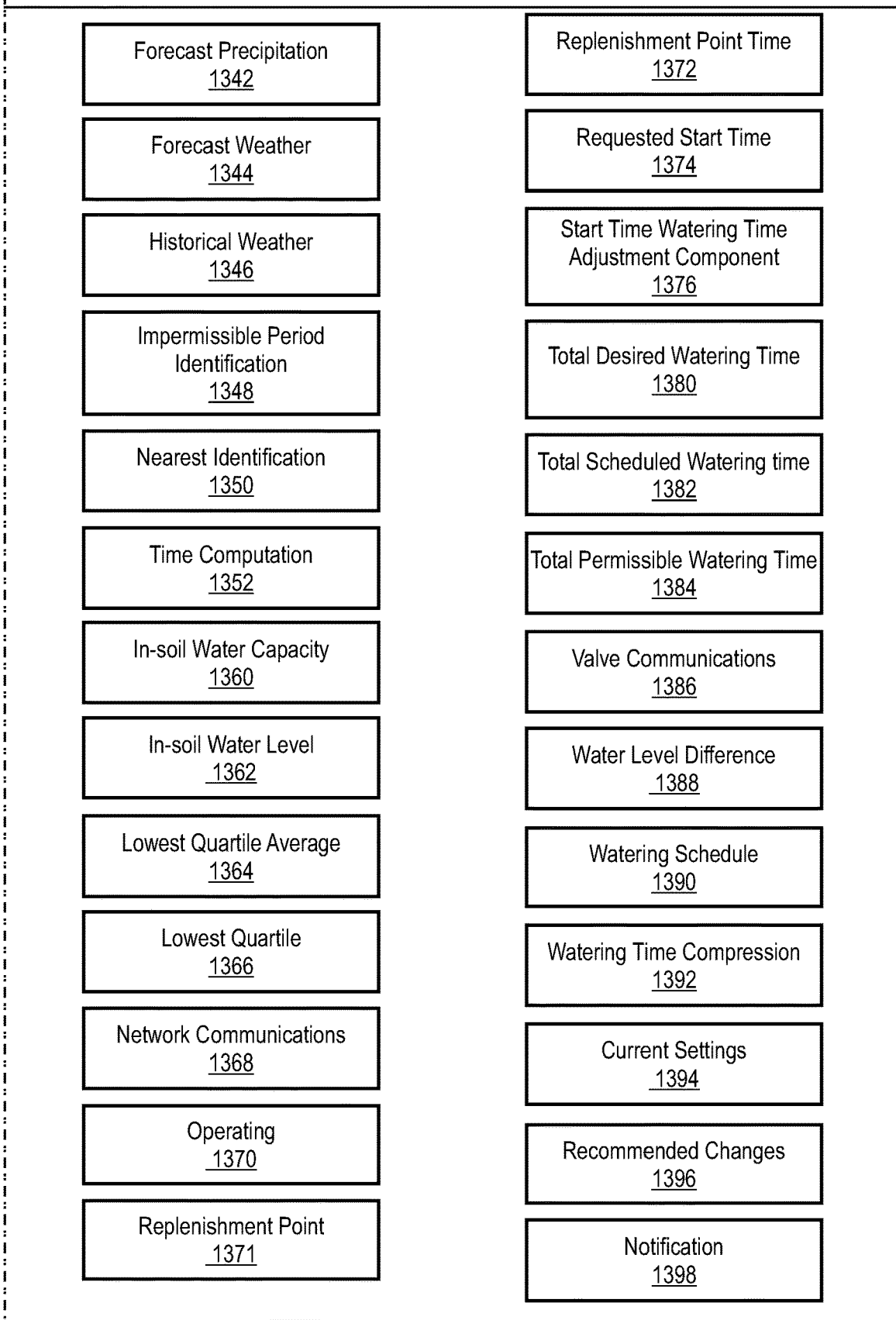

FIGS. 13A-B illustrate a functional block diagram of one embodiment of an irrigation flow controller 1300 configured to control water consumption and perform other functions. The irrigation flow controller 1300 may include data 1302 including, but not limited to: catch cup data 1304, historical evapotranspiration data 1306, historical weather data 1308, impermissible/permissible watering time data 1310, lowest quartile of the catch cup values 1312, catch cup measurement values 1314, forecast evapotranspiration data 1316, forecast weather data 1320, forecast precipitation data 1322, start time data 1324, water scheduling data 1326 and/or weather data 1328. The irrigation flow controller 1300 may also include various components configured to receive, process, calculate, store or otherwise utilize the foregoing data 1302 including, but not limited to: an adjustment of in-soil water level component 1330, an average component 1332, a catch cup component 1334, an estimated irrigation rate component 1336, a forecast evapotranspiration component 1338, a future permissible watering time periods component 1340, a forecast precipitation component 1342, a forecast weather component 1344, a historical weather component 1346, an impermissible period identification component 1348, a nearest identification component 1350, a time computation component 1352, an in-soil water capacity component 1360, an in-soil water level component 1362, a lowest quartile average component 1364, a lowest quartile component 1366, a network communications component 1368, an operating component 1370, a replenishment point component 1371, a replenishment point time component 1372, a requested start time component 1374, a start watering time adjustment component 1376, a total desired watering time component 1380, a total scheduled watering time component 1382, a total permissible watering time component 1384, a valve communications component 1386, a water level difference component 1388, a watering schedule component 1390, a watering time compression component 1392, a current settings component 1394, a recommended changes component 1396, and a notification component 1398. The irrigation flow controller 1300 may use the hardware components in the local device 1200a, server 1200b and/or an end-user device 1200c in FIGS. 12A-C to perform the functions associated with each of the components identified above. Each of the data and components associated with the irrigation flow controller 1300 of FIGS. 13A-B will be explained in more detail below.

Figure 14A:
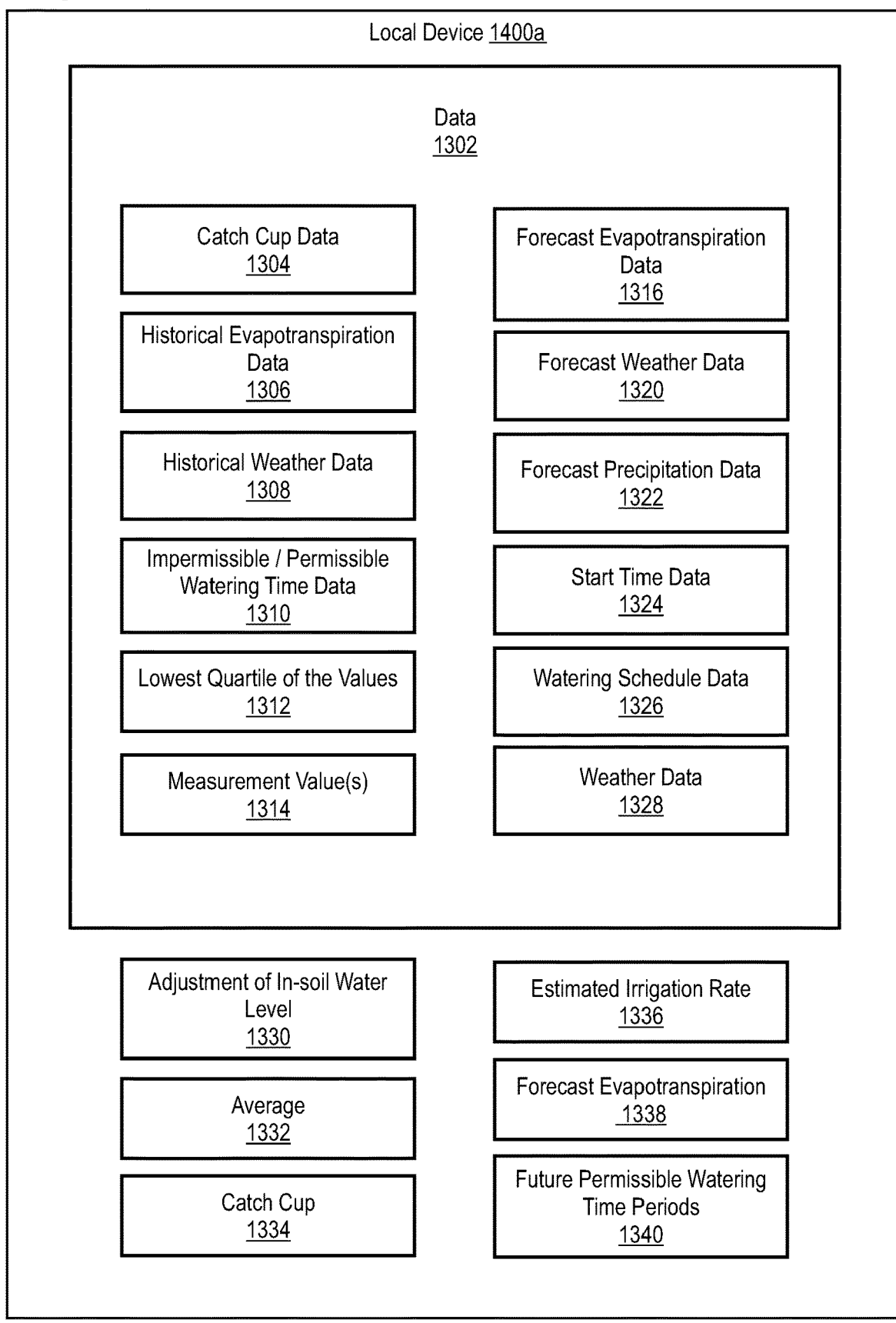
FIGS. 14A-B illustrate a functional block diagram of one embodiment of a local device, which may comprise at least a portion of an irrigation controller.
Figure 14B:
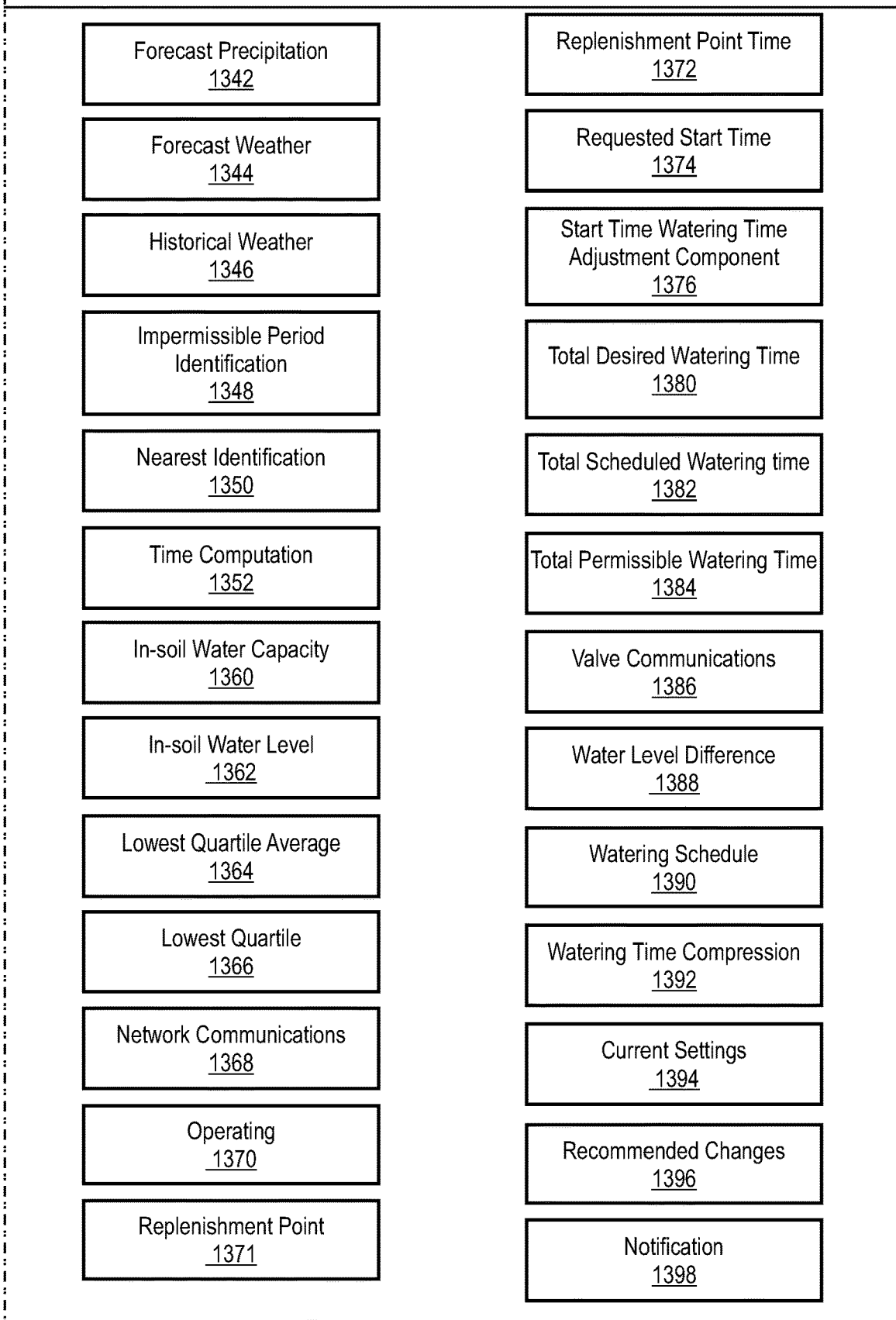

FIGS. 14A-B illustrate a functional block diagram of a local device 1400a configured to control water consumption and perform other functions. The local device 1400a may include various types of data 1302 including, but not limited to, catch cup data 1304, historical evapotranspiration data 1306, historical weather data 1308, impermissible/permissible watering time data 1310, lowest quartile of the catch cup values 1312, catch cup measurement values 1314, forecast evapotranspiration data 1316, forecast weather data 1320, forecast precipitation data 1322, start time data 1324, water scheduling data 1326, and/or weather data 1328. The local device 1400a may also include various components configured to receive, process, calculate, store or otherwise utilize the foregoing data 1302 including, but not limited to: an adjustment of in-soil water level component 1330, an average component 1332, a catch cup component 1334, an estimated irrigation rate component 1336, a forecast evapotranspiration component 1338, a future permissible watering time periods component 1340, a forecast precipitation component 1342, a forecast weather component 1344, a historical weather component 1346, an impermissible period identification component 1348, a nearest identification component 1350, a time computation component 1352, an in-soil water capacity component 1360, an in-soil water level component 1362, a lowest quartile average component 1364, a lowest quartile component 1366, a network communications component 1368, an operating component 1370, a replenishment point component 1371, a replenishment point time component 1372, a requested start time component 1374, a start watering time adjustment component 1376, a total desired watering time component 1380, a total scheduled watering time component 1382, a total permissible watering time component 1384, a valve communications component 1386, a water level difference component 1388, a watering schedule component 1390, a watering time compression component 1392, a current settings component 1394, a recommended changes component 1396, and a notification component 1398. The local device 1400a may use one or more of the hardware components in the local device 1200a in FIG. 12A to perform the functions associated with each of the functional components identified above. The data and components associated with the local device 1400a of FIGS. 14A-B will be explained in more detail below.

Figure 15A:
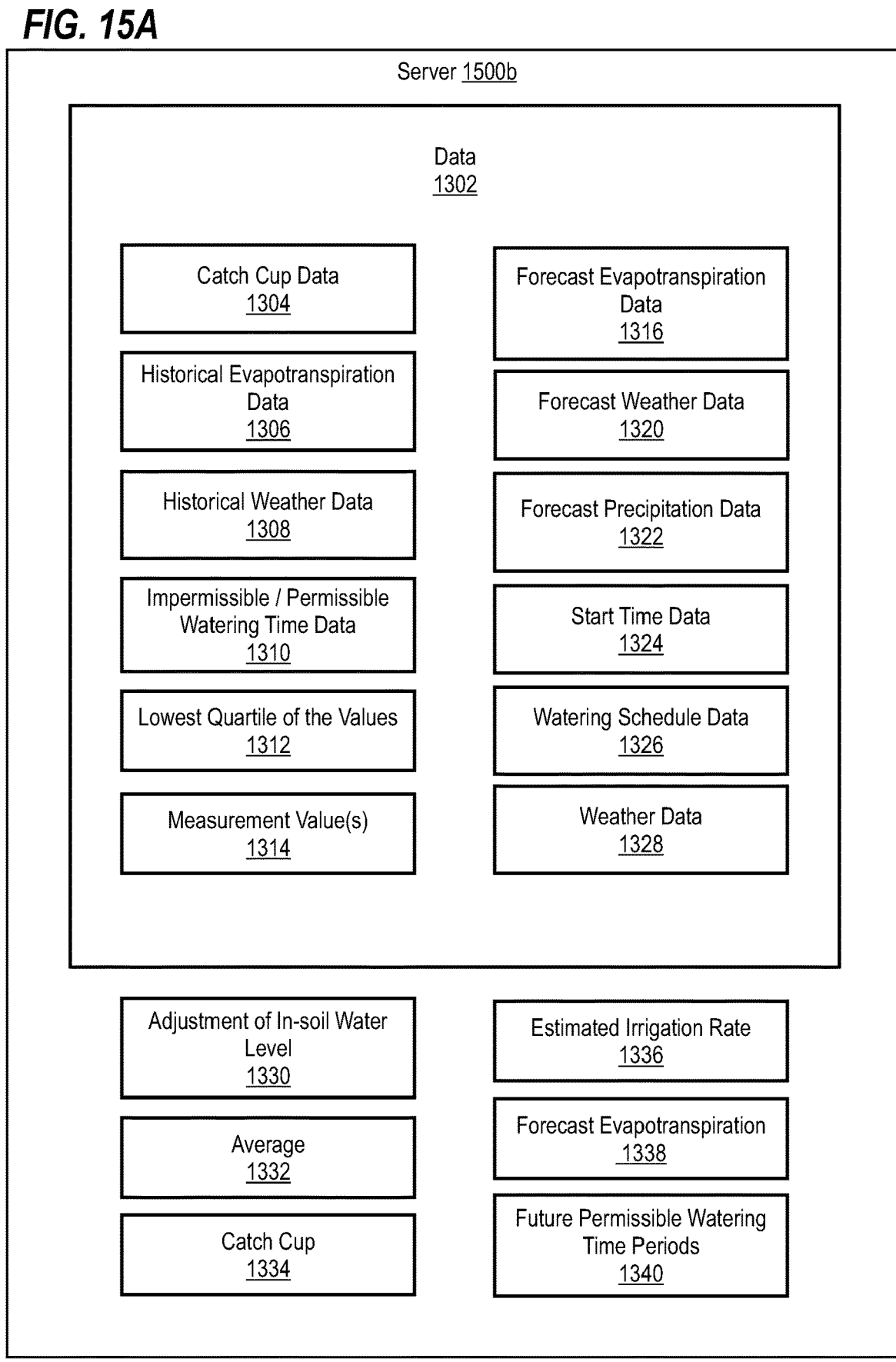
FIGS. 15A-B illustrate a functional block diagram of one embodiment of a server, which may comprise at least a portion of an irrigation controller.
Figure 15B:
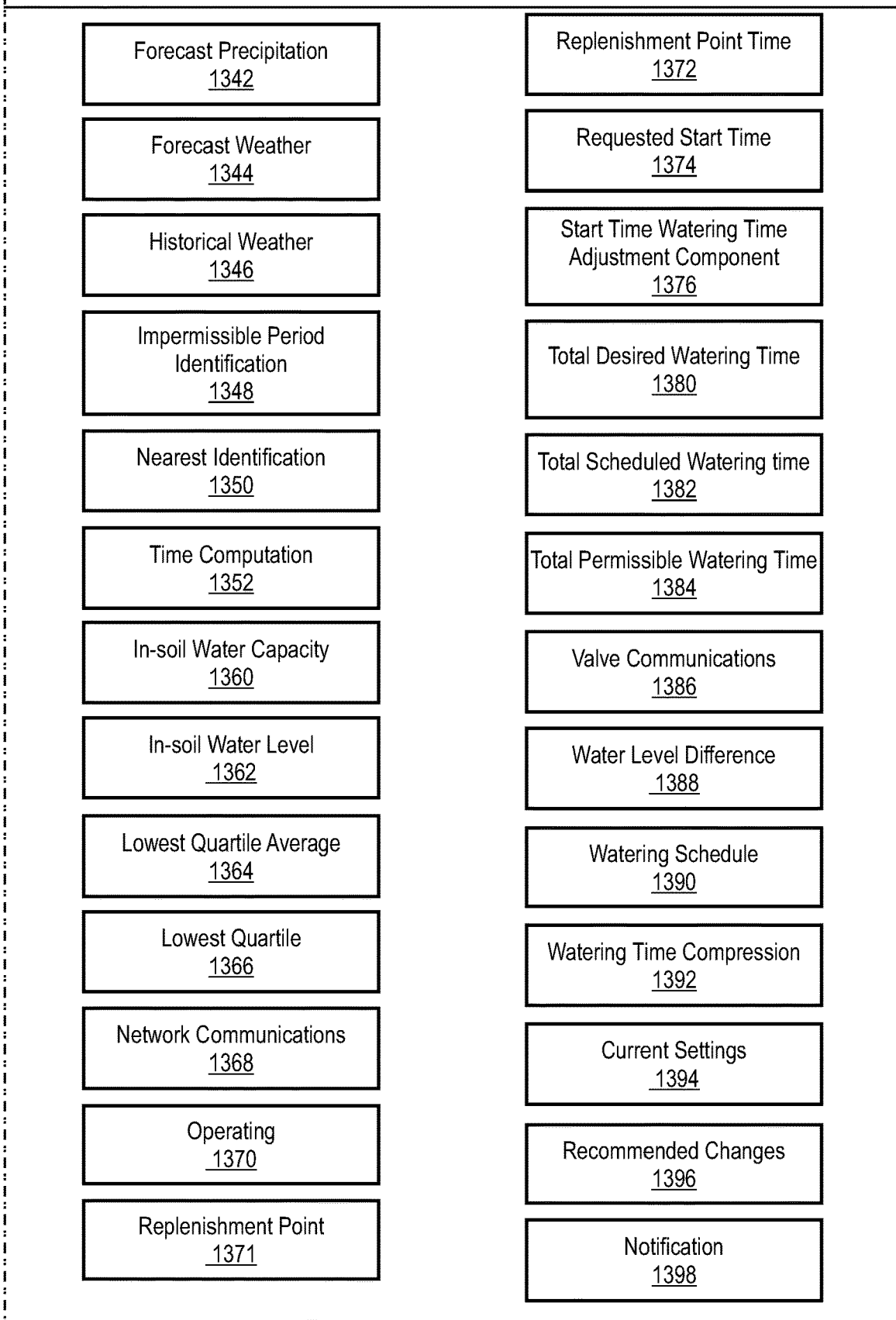

FIGS. 15A-B illustrate a functional block diagram of a server 1500b configured to control water consumption and perform other functions. The server 1500b may include various types of data 1302 including, but not limited to, catch cup data 1304, historical evapotranspiration data 1306, historical weather data 1308, impermissible/permissible watering time data 1310, lowest quartile of the catch cup values 1312, catch cup measurement values 1314, forecast evapotranspiration data 1316, forecast weather data 1320, forecast precipitation data 1322, start time data 1324, water scheduling data 1326, and/or weather data 1328. The server 1500b may also include various components configured to receive, process, calculate, store or otherwise utilize the foregoing data 1302 including, but not limited to: an adjustment of in-soil water level component 1330, an average component 1332, a catch cup component 1334, an estimated irrigation rate component 1336, a forecast evapotranspiration component 1338, a future permissible watering time periods component 1340, a forecast precipitation component 1342, a forecast weather component 1344, a historical weather component 1346, an impermissible period identification component 1348, a nearest identification component 1350, a time computation component 1352, an in-soil water capacity component 1360, an in-soil water level component 1362, a lowest quartile average component 1364, a lowest quartile component 1366, a network communications component 1368, an operating component 1370, a replenishment point component 1371, a replenishment point time component 1372, a requested start time component 1374, a start watering time adjustment component 1376, a total desired watering time component 1380, a total scheduled watering time component 1382, a total permissible watering time component 1384, a valve communications component 1386, a water level difference component 1388, a watering schedule component 1390, a watering time compression component 1392, a current settings component 1394, a recommended changes component 1396, and a notification component 1398. The server 1500b may use one or more of the hardware components in server 1200b in FIG. 12B to perform the functions associated with each of the functional components identified above. Each of the above data and components associated with the server 1500b of FIGS. 15A-B will be explained in more detail below.

Figure 16A:
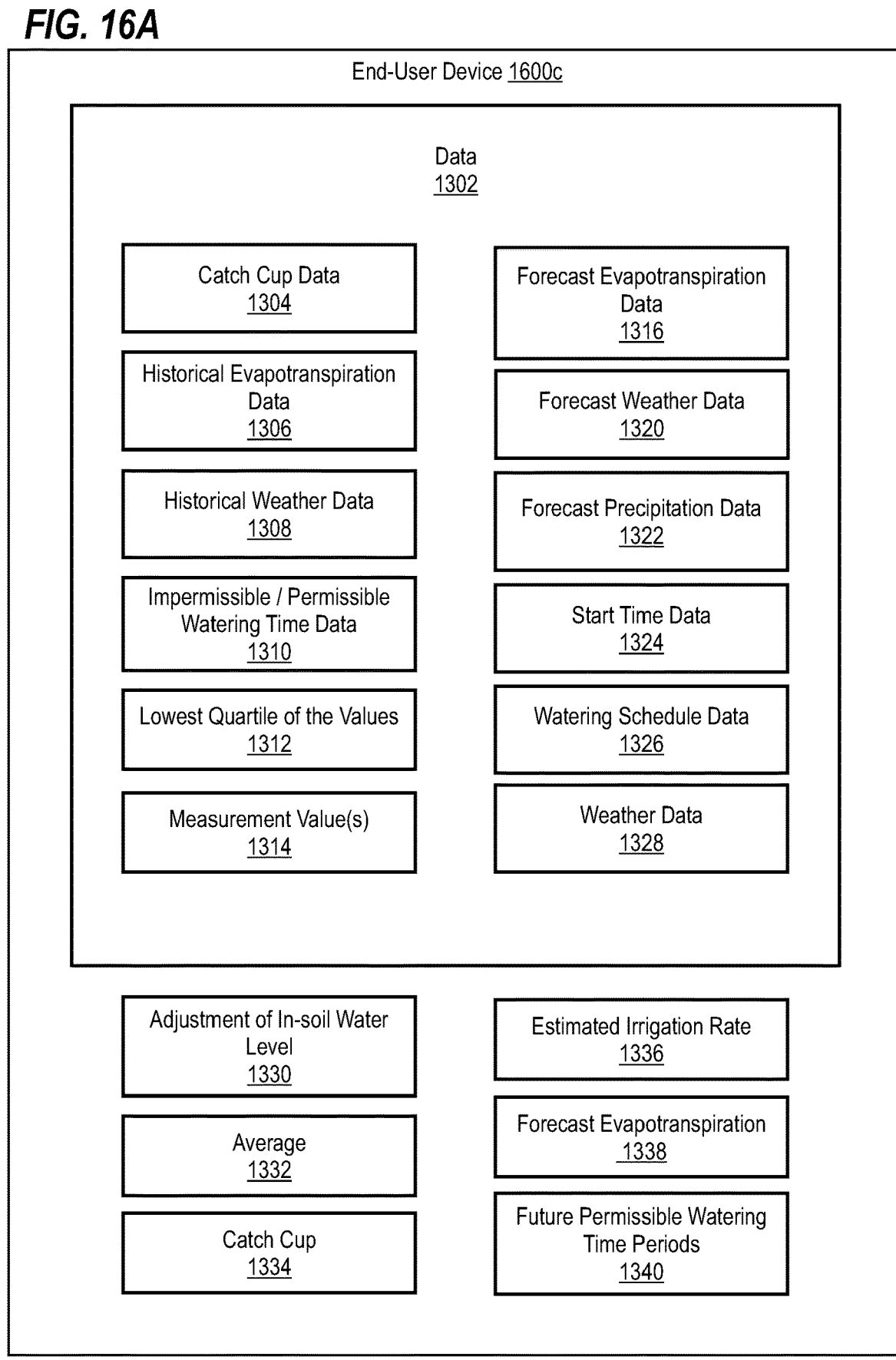
FIGS. 16A-B illustrate a functional block diagram of one embodiment of an end-user device, which may comprise at least a portion of an irrigation controller.
Figure 16B:
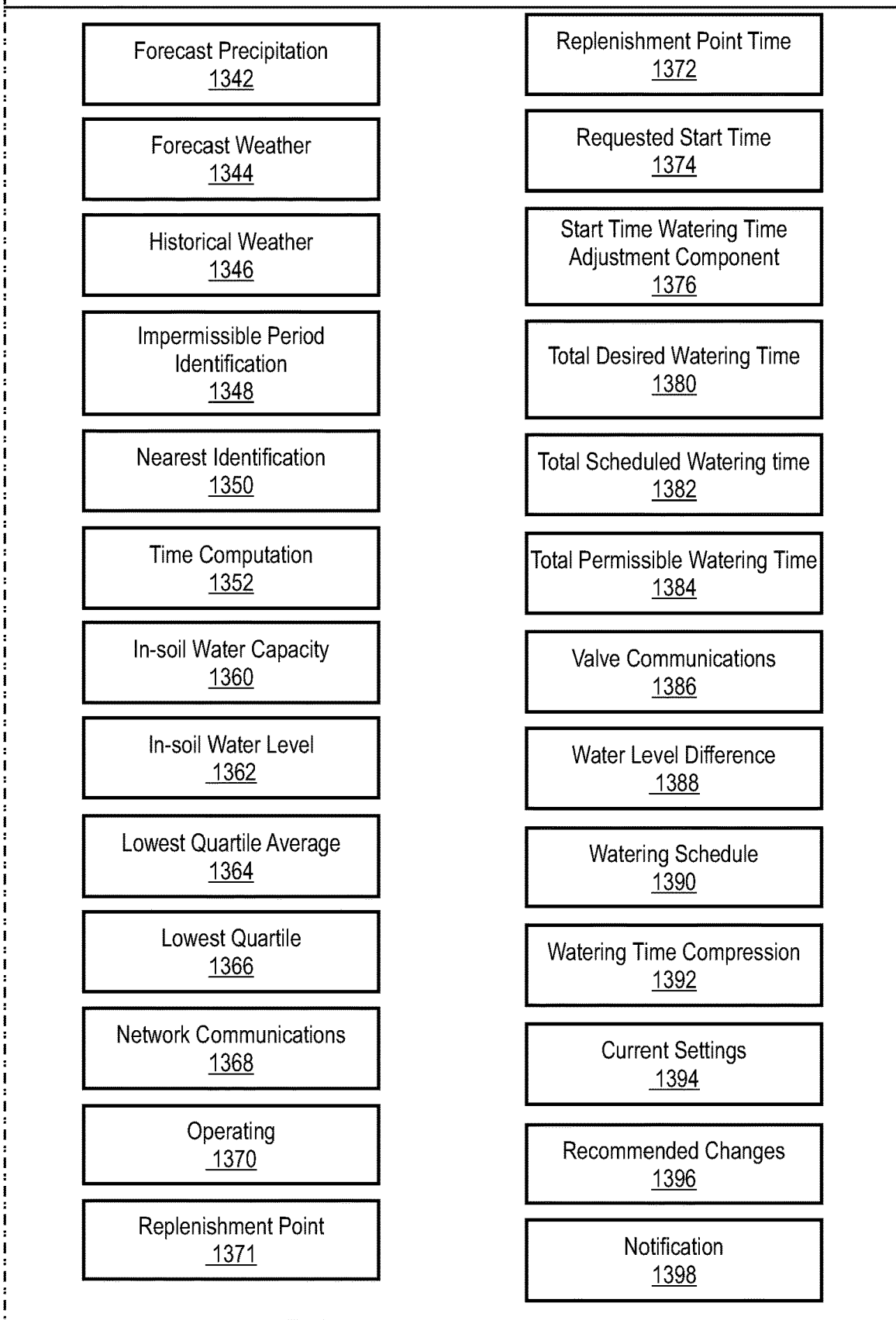

FIGS. 16A-B illustrate a functional block diagram of an end-user device 1600c configured to control water consumption and perform other functions. The end-user device 1600c may include data 1302 including, but not limited to: catch cup data 1304, historical evapotranspiration data 1306, historical weather data 1308, impermissible/permissible watering time data 1310, lowest quartile of the catch cup values 1312, catch cup measurement values 1314, forecast evapotranspiration data 1316, forecast weather data 1320, forecast precipitation data 1322, start time data 1324, water scheduling data 1326, and/or weather data 1328. The end-user device 1600c may also include various components configured to receive, process, calculate, store or otherwise utilize the foregoing data 1302 including, but not limited to: an adjustment of in-soil water level component 1330, an average component 1332, a catch cup component 1334, an estimated irrigation rate component 1336, a forecast evapotranspiration component 1338, a future permissible watering time periods component 1340, a forecast precipitation component 1342, a forecast weather component 1344, a historical weather component 1346, an impermissible period identification component 1348, a nearest identification component 1350, a time computation component 1352, an in-soil water capacity component 1360, an in-soil water level component 1362, a lowest quartile average component 1364, a lowest quartile component 1366, a network communications component 1368, an operating component 1370, a replenishment point component 1371, a replenishment point time component 1372, a requested start time component 1374, a start watering time adjustment component 1376, a total desired watering time component 1380, a total scheduled watering time component 1382, a total permissible watering time component 1384, a valve communications component 1386, a water level difference component 1388, a watering schedule component 1390, a watering time compression component 1392, a current settings component 1394, a recommended changes component 1396, and a notification component 1398. Each of the above data and components associated with the end-user device 1600c of FIGS. 16A-B will be explained in more detail below.

Referring now to FIGS. 13A-B, 14A-B, 15A-B and 16A-B, more specific descriptions of the data and functional components will be provided. The catch cup data 1304 may comprise values representing a water level in each catch cup 710. The catch cup data 1304 could also include, for example, an average of the values for all of the cups 710 and/or an average of the lowest quartile of the values 1312 of the catch cups 710.

The historical evapotranspiration data 1306 comprises actual data observed in the past related to evapotranspiration. This data 1306 may be obtained from various sources, such as sensor(s) 1238, 1240. The historical evapotranspiration data 1306 may be received from a remote server sponsored by one or more weather data provider(s) 1252 and may involve further computation or no computation in order to obtain the historical evapotranspiration data 1306.

The historical weather data 1308 comprises actual data observed in the past related to weather. This data 1308 may be directly obtained using sensors 1238, 1240 or may be obtained from a remote server utilized by weather data provider(s) 1252. The data 1308 could comprise information related to temperature, precipitation, wind speed and direction, barometric pressure, humidity, etc.

The impermissible/permissible watering time data 1310 may comprise data indicating when watering is permitted. In various embodiments, legally impermissible watering times are considered as well as times when watering is unwise, such as watering in the heat of the day. Alternatively, only legally impermissible watering times are considered, such as when watering is prohibited by a municipality or by a homeowners' association. In various embodiments, both impermissible and permissible watering time data 1310 may be obtained via a user input or from a remote server. Alternatively, impermissible watering times may be obtained from a remote source, and then the permissible watering times may be calculated therefrom. In one or more embodiments, the permissible watering times may be obtained from a remote source, after which the impermissible watering times may be calculated.

The lowest quartile of the values 1312 may comprise a subset of the catch cup data 1304. The lowest quartile of the values 1312 comprise the quarter of the lowest values for the catch cups 710.

The measurement values 1314 may also comprise a subset of the catch cup data 1304. The measurement values 1314 comprise all values indicating a water level within each catch cup 710, for example, for a particular watering zone for a property.

The forecast evapotranspiration data 1316 indicates predicted evapotranspiration information in one or more future periods of time. The data 1316 may be obtained from a remote server sponsored by one or more weather data providers 1252. Alternatively, the forecast evapotranspiration data 1316 may be calculated based on other types of data observed using one or more sensors 1240, 1238 or received from a remote server.

The forecast weather data 1320 indicates predicted weather information in one or more future periods of time. The forecast evapotranspiration data 1316 may comprise a subset of the forecast weather data 1320. The forecast weather data 1320 again may be calculated or may be received from a source. The forecast weather data 1320 may comprise, for example, information related to temperature, precipitation, wind speed and direction, barometric pressure, humidity, etc.

The forecast precipitation data 1322 indicates predicted precipitation in future periods of time. Once again, the forecast precipitation data 1322 may be received from one or more weather data provider(s) 1252 or may be calculated based on other received data or data received from sensor(s) 1238, 1240. The forecast precipitation data 1322 may be a subset of the forecast weather data 1320.

The start time data 1324 indicates, for example, a requested start time for sending electrical open signals to one or more associated valves 1230*a-c*. The start time data 1324 may also comprise not merely a requested start time but a scheduled start time. The requested start time and the scheduled start time may be different when other factors suggest that the requested start time, for example, does not provide adequate time for watering of one or more watering zones.

The water scheduling data 1326 comprises data identifying, for example, scheduled and/or requested start times for one or more watering zones. The water scheduling data 1326 may further comprise data indicating a total desired watering time, total permissible watering time (if, for example, watering restrictions are in place) for one or more zones. The water scheduling data 1326 may further comprise runtimes for each of the one or more watering zones and may further comprise start times for each of the zones. The start time data 1324 and the impermissible/permissible watering time data 1310 may comprise a subset of the water scheduling data 1326.

The weather data 1328 may comprise both historical weather data 1308 and forecast weather data 1320. As indicated above, the forecast weather data 1320 may be computed from data obtained by sensors 1238, 1240 or received from another source. Alternatively, the forecast weather data 1320 may be received from another source without further computation.

The adjustment of in-soil water level component 1330 may adjust the estimated in-soil water level 408 when there are differences or inconsistencies between historical weather data 1308 and forecast weather data 1320. Additional information and context are provided for this component 1330 in connection with, for example, step 1918 of FIG. 19. For example, if the forecast evapotranspiration data 1316 is inaccurate, the estimated in-soil water level 408 should be adjusted accordingly. In various embodiments, the adjustment of in-soil water level component 1330 may be configured to alter an estimated in-soil water level 408 for a point in time based at least in part on a forecast evapotranspiration data 1316 for a period of time preceding the point in time to an altered estimated in-soil water level 408 for the point in time based at least in part on differences between the forecast evapotranspiration data 1316 for the period of time and a historical evapotranspiration data 1306 for the period of time. The adjustment of in-soil water level component 1330 may comprise, for example, a processor 1234*a-c*, memory 1244*a-c*, executable instructions 1246*a-c*, network communications hardware 1236*a-c*, sensor(s) 1240, user input(s) 1242*a-c*, user output(s) 1250*a-c*, sensor(s) 1238, valve communications hardware 1248 and/or computer network(s) 1204. The adjustment of in-soil water level component 1330 may be a subset of or have overlap with the in-soil water level component 1362. The adjustment of in-soil water level component 1330 may, for example, communicate with and/or have overlap with the forecast evapotranspiration component 1338, the forecast precipitation component 1342, the forecast weather component 1344, the historical weather component 1346, in-soil water level component 1362, the network communications component 1368, the operating component 1370, and/or the watering schedule component 1390. As used herein, the term "overlap" signifies that two or more functional components may use common hardware or software resources.

The average component 1332 may, in various embodiments, calculate the average of all measurement values for input catch cups 710. Additional information and context in relation to this component 1332 are provided, for example, in connection with step 2012 of FIG. 20. The average component 1332 may comprise, for example, a processor 1234*a-c*, memory 1244*a-c*, executable instructions 1246*a-c*, network communications hardware 1236*a-c*, sensor(s) 1238, sensor(s) 1240, user input(s) 1242*a-c*, user output(s) 1250*a-c*, one or more routers 1202 and/or computer network(s) 1204. The average component 1332 may communicate with and/or have overlap with the catch cup component 1334, the lowest quartile average component 1364, the lowest quartile component 1366, a network communications component 1368 and/or the valve communications component 1386.

The catch cup component 1334 may, in various embodiments, utilize catch cup data 1304 to make adjustments to the watering schedule data 1326. Additional information and context regarding this component 1334 are provided, for example, in connection with step 2010 of FIG. 20. In various embodiments, the catch cup component 1334 may receive a measurement value 1314 representing a quantity of water captured by each catch cup 710 within one of the watering zones during a test watering period. Measurement values 1314 for the catch cups 710 may be obtained via a sensor 1238 or may be input manually by a user into a user interface utilizing one or more user input(s) 1242*a-c*. In various embodiments, a catch cup component 1334 may be configured to receive one or more measurement values 1314 representing a quantity of water captured by each catch cup 710 positioned within the at least one watering zone during a test watering period and to automatically adjust the watering schedule, without additional human intervention beyond inputting the one or more measurement values 1314, based on the one or more measurement values 1314. The catch cup component 1334 may comprise, for example, a processor 1234*a-c*, memory 1244*a-c*, executable instructions 1246*a-c*, network communications hardware 1236*a-c*, sensor(s) 1238, sensor(s) 1240, valve communications hardware 1248, user input(s) 1242*a-c*, user output(s) 1250*a-c*, one or more routers 1202 and/or computer network(s) 1204. The catch cup component 1334 may, for example, communicate and/or have overlap with the average component 1332, the lowest quartile average component 1364, estimated irrigation rate component 1336, the lowest quartile component 1366, the network communications component 1368 and/or the watering schedule component 1390.

The estimated irrigation rate component 1336 may calculate an estimated irrigation rate for one or more watering zones within a property. Additional information and context regarding this component 1336 are provided, for example, in connection with step 2018 of FIG. 20 and step 2220 of FIG. 22. The estimated irrigation rate component 1336 may do so based on data obtained from another source or from user input. For example, a user may specify the type of sprinkler used in connection with one or more of the watering zones. This information may be utilized by the estimated irrigation rate component 1336 to determine or calculate an estimated irrigation rate based on the irrigation rate imparted by operation of the valve associated with one of the watering zones utilizing, for example, information related to sprinkler type. Additional information may be input or obtained, such as water pressure and velocity using one or more sensors 1238, 1240. In addition, the estimated irrigation rate component 1336 may interact with the catch cup component 1334 to determine the estimated irrigation rate. In various embodiments, the estimated irrigation rate component 1336 may calculate the estimated irrigation rate based on the average of the lowest quartile of the values 1312 for the catch cups 710 and the average of the measurement values 1314 for all the catch cups 710. The estimated irrigation rate component 1336 may comprise, for example, a processor 1234a-c, memory 1244a-c, executable instructions 1246a-c, network communications hardware 1236a-c, sensor(s) 1238, sensor(s) 1240, valve communications hardware 1248, user input(s) 1242a-c, user output(s) 1250a-c, one or more routers 1202 and/or computer network(s) 1204. The estimated irrigation rate component 1336 may, for example, communicate and/or have overlap with the catch cup component 1334, lowest quartile average component 1364, lowest quartile component 1366, network communications component 1368 and/or with watering schedule component 1390.

The forecast evapotranspiration component 1338 may calculate or receive evapotranspiration data 1316 based on forecast weather data 1320, as will be explained in further detail, for example, in connection with step 1716 of FIG. 17, step 2022 of FIG. 20, and step 2214 of FIG. 22. The forecast evapotranspiration data 1316 may be received utilizing the network communications component 1368. In addition or alternatively, data may be received from the sensors 1238, 1240 or based on user input, which may be utilized to calculate the forecast evapotranspiration data 1316 utilizing the forecast evapotranspiration component 1338 and/or forecast weather data 1320. The forecast evapotranspiration component 1338 may comprise, for example, a processor 1234a-c, memory 1244a-c, executable instructions 1246a-c, network communications hardware 1236a-c, sensor(s) 1238, sensor(s) 1240, valve communications hardware 1248, user input(s) 1242a-c, user output(s) 1250a-c, one or more routers 1202 and/or computer network(s) 1204. The forecast evapotranspiration component 1338 may, for example, communicate and/or have overlap with the forecast weather component 1344, the in-soil water level component 1362, the network communications component 1368 and/or the watering schedule component 1390.

The future permissible watering time periods component 1340 may identify permissible watering periods within a future temporal period. Additional information and context regarding this component 1340 are provided, for example, in connection with step 2114 of FIG. 21. The future permissible watering time periods component 1340 may utilize impermissible/permissible watering time data 1310 which may be received from a source via a server or may be input by a user utilizing one or more user input(s) 1242a-c. The future permissible watering time periods component 1340 may comprise, for example, a processor 1234a-c, memory 1244a-c, executable instructions 1246a-c, network communications hardware 1236a-c, user input(s) 1242a-c, user output(s) 1250a-c, one or more routers 1202 and/or computer network(s) 1204. The future permissible watering time periods component 1340 may, for example, communicate and/or have overlap with the impermissible period identification component 1348, network communications component 1368, the nearest identification component 1350, the time computation component 1352 and/or a total permissible watering time component 1384.

The forecast precipitation component 1342 may receive forecast precipitation data 1322 for at least one watering zone, as will be explained in further detail, for example, in connection with step 2216 of FIG. 22 and step 2316 of FIG. 23. The forecast precipitation component 1342 may comprise, for example, a processor 1234a-c, memory 1244a-c, executable instructions 1246a-c, network communications hardware 1236a-c, user output(s) 1250a-c, one or more routers 1202 and/or computer network(s) 1204. The forecast precipitation component 1342 may, for example, communicate and/or have overlap with the forecast weather component 1344 and/or the watering schedule component 1390.

The forecast weather component 1344 may receive forecast precipitation data 1322 for at least one of the watering zones for a period of time, as will be explained in further detail, for example, in connection with step 2024 of FIG. 20. In addition, the forecast weather component 1344 may utilize information received via one or more user input(s) 1242a-c or sensors 1238, 1240 to formulate a weather forecast. The forecast weather component 1344 may comprise, for example, a processor 1234a-c, memory 1244a-c, executable instructions 1246a-c, network communications hardware 1236a-c, sensor(s) 1238, sensor(s) 1240, user input(s) 1242a-c, user output(s) 1250a-c, one or more routers 1202 and/or computer network(s) 1204. The forecast weather component 1344 may, for example, communicate and/or have overlap with the adjustment of in-soil water level component 1330, the forecast evapotranspiration component 1338, the forecast precipitation component 1342, the historical weather component 1346, the network communications component 1368 and/or the watering schedule component 1390.

The historical weather component 1346 may obtain historical weather data 1308 for a particular period of time, as will be explained in further detail in connection with step 1916 of FIG. 19. The historical weather component 1346 may obtain the historical weather data 1308 from the server, user input(s) 1242a-c and one or more sensors 1238, 1240. The historical weather component 1346 may comprise, for example, a processor 1234a-c, memory 1244a-c, executable instructions 1246a-c, network communications hardware 1236a-c, sensor(s) 1238, sensor(s) 1240, user input(s) 1242a-c, one or more routers 1202 and/or computer network(s) 1204. The historical weather component 1346 may, for example, communicate and/or have overlap with the adjustment of in-soil water level component 1330 and/or the network communications component 1368.

The impermissible period identification component 1348 may identify one or more impermissible periods of time within a temporal period when irrigation is impermissible based on impermissible/permissible watering time data 1310, as will be explained in further detail in connection with step 1810 of FIG. 18. The impermissible period identification component 1348 may perform this task using solely data 1302 or user input received or may perform computations based on data or user input received to identify when irrigation is impermissible. Impermissible period identification component 1348 may comprise, for example, a processor 1234a-c, memory 1244a-c, executable instructions 1246a-c, network communications hardware 1236a-c, user input(s) 1242a-c, one or more routers 1202 and/or computer network(s) 1204. The impermissible period identification component 1348 may, for example, communicate and/or have overlap with the future permissible watering time periods component 1340, the network communications component 1368 the nearest identification component 1350, the time computation component 1352 and/or the total permissible watering time component 1384.

The nearest identification component 1350 may identify the permissible watering period nearest a requested start time or that encompassed the requested start time, as will be explained in further detail in connection with step 2116 of FIG. 21. The nearest identification component 1350 may identify the nearest permissible watering period to the requested start time or any permissible watering period that encompasses the requested start time using, for example, start time data 1324 and/or impermissible/permissible watering time data 1310. The impermissible/permissible watering time data 1310 may be input by a user or received from another source, such as a remote server. The nearest identification component 1350 may comprise, for example, a processor 1234*a-c*, memory 1244*a-c*, executable instructions 1246*a-c*, network communications hardware 1236*a-c*, user input(s) 1242*a-c*, user output(s) 1250*a-c*, one or more routers 1202 and/or computer network(s) 1204. The nearest identification component 1350 may, for example, communicate and/or have overlap with the requested start time component 1374, the total desired watering time component 1380, the future permissible watering time periods component 1340, impermissible period identification component 1348, the total permissible watering time component 1384, the time computation component 1352, the start watering time adjustment component 1376 and/or the watering schedule component 1390.

The time computation component 1352 may calculate the time within the nearest permissible watering period (identified by the nearest identification component 1350) after the requested start time, as will be explained in further detail in connection with step 2117 of FIG. 21. To state it a different way, the time computation component 1352 calculates the time that is (1) within the nearest permissible watering period, and (2) after the requested start time. The time computation component 1352 may do so, for example, using start time data 1324 and/or impermissible/permissible watering time data 1310. The time computation component 1352 may comprise, for example, a processor 1234*a-c*, memory 1244*a-c*, executable instructions 1246*a-c*, network communications hardware 1236*a-c*, user input(s) 1242*a-c*, user output(s) 1250*a-c*, one or more routers 1202 and/or computer network(s) 1204. The time computation component 1352 may, for example, communicate and/or have overlap with the requested start time component 1374, the total desired watering time component 1380, the future permissible watering time periods component 1340, impermissible period identification component 1348, the total permissible watering time component 1384, the nearest identification component 1350, the start watering time adjustment component 1376, and/or the watering schedule component 1390.

The in-soil water capacity component 1360 may identify an estimated in-soil water capacity 420 for soil for one or more watering zones on a property, as will be explained in additional detail in connection with step 1710 of FIG. 17, step 2026 of FIG. 20, step 2212 of FIG. 22 and/or step 2312 of FIG. 23. As noted above, the in-soil water capacity 420 may be referred to as field capacity. The in-soil water capacity component 1360 may do so based on, for example, user input specifying a soil type. In addition, a default soil type may be utilized if no user input is received. Alternatively, a likely soil type may be determined by this component 1360 using GPS data or zip code data. The in-soil water capacity component 1360 may comprise, for example, a processor 1234*a-c*, memory 1244*a-c*, executable instructions 1246*a-c*, network communications hardware 1236*a-c*, user input(s) 1242*a-c*, user output(s) 1250*a-c*, one or more routers 1202 and/or computer network(s) 1204. In various embodiments, the in-soil water capacity component 1360 may estimate in-soil water capacity for at least one watering zone based at least in part on user input specifying a soil type for the at least one watering zone. The in-soil water capacity component 1360 may, for example, communicate and/or have overlap with the network communications component 1368 and/or watering schedule component 1390.

The in-soil water level component 1362 may ascertain an estimated future or current in-soil water level 408, as will be explained in additional detail, for example, in connection with step 1712 of FIG. 17, steps 1910 and 1914 of FIG. 19, steps 2020 and 2026 of FIG. 20, and steps 2210 and 2218 of FIG. 22, and steps 2310 and 2318 of FIG. 23. The in-soil water level component 1362 may estimate in-soil water level 408 based on a number of different factors, including, for example, historical evapotranspiration data 1306, soil-type data, historical weather data 1308, forecast evapotranspiration data 1316, forecast weather data 1320, forecast precipitation data 1322 and other weather data 1328. The in-soil water level component 1362 may comprise, for example, a processor 1234*a-c*, memory 1244*a-c*, executable instructions 1246*a-c*, sensor(s) 1240, user input(s) 1242*a-c*, user output(s) 1250*a-c* and/or sensor(s) 1238. The in-soil water level component 1362 may employ historical evapotranspiration data 1306, historical weather data 1308, forecast evapotranspiration data 1316, forecast weather data 1320, forecast precipitation data 1322, and/or water scheduling data 1326. The in-soil water level component 1362 may interact with and/or have overlap with the adjustment of in-soil water level component 1330, forecast evapotranspiration component 1338, forecast precipitation component 1342, forecast weather component 1344, historical weather component 1346, network communications component 1368 and/or watering schedule component 1390.

The lowest quartile average component 1364 may calculate an average of the measurement values within the lowest quartile of the values 1312 of catch cups 710 for a particular test watering period, as will be explained in additional detail in connection with step 2016 of FIG. 20. The measurement values 1314 for each catch cup 710, as indicated above, may be obtained via user input(s) 1242*a-c* or via sensor(s) 1238, 1240. The lowest quartile average component 1364 may comprise, for example, a processor 1234*a-c*, memory 1244*a-c*, executable instructions 1246*a-c*, network communications hardware 1236*a-c*, sensor(s) 1238, sensor(s) 1240, valve communications hardware 1248, user input(s) 1242*a-c*, user output(s) 1250*a-c*, one or more routers 1202 and/or computer network(s) 1204. The lowest quartile average component 1364 may, for example, communicate and/or have overlap with the average component 1332, the catch cup component 1334, the lowest quartile component 1366, the network communications component 1368 and/or the estimated irrigation rate component 1336.

The lowest quartile component 1366 may identify one or more measurement values 1314 for catch cups 710 falling within the lowest quartile of the values 1312 based on the catch cup data 1304 and/or measurement values 1314. Additional information and context regarding this component 1366 are provided, for example, in connection with step 2014 of FIG. 20. The lowest quartile component 1366 may comprise, for example, a processor 1234*a-c*, memory 1244*a-c*, executable instructions 1246*a-c*, network communications hardware 1236*a-c*, user input(s) 1242*a-c*, user output(s) 1250*a-c*, one or more routers 1202 and/or computer network(s) 1204. The lowest quartile component 1366 may, for example, communicate and/or have overlap with the average component 1332, the catch cup component 1334, the lowest quartile average component 1364, the network communications component 1368, and/or the estimated irrigation rate component 1336.

The network communications component 1368 may be utilized for communicating with other devices in communication with the computer network(s) 1204. The network communications component 1368 may comprise, for example, a processor 1234a-c, memory 1244a-c, executable instructions 1246a-c, network communications hardware 1236a-c, one or more routers 1202 and/or computer network(s) 1204. The network communications component 1368 may communicate and/or have overlap with many of the other components identified in the FIGS. 13A-B, including, for example, the forecast evapotranspiration component 1338, the future permissible watering time periods component 1340, the forecast precipitation component 1342, the forecast weather component 1344, the historical weather component 1346 and/or the impermissible period identification component 1348.

The operating component 1370 may operate the sprinkler controller in accordance with a watering schedule, which may be based on and specified by watering schedule data 1326. Additional information and context regarding this component 1370 are provided, for example, in connection with step 1726 of FIG. 17, step 1820 of FIG. 18 and/or step 2124 of FIG. 21. The operating component may, for example, transmit electrical signals to open or close irrigation valves 1230a-c using valve communications hardware 1248, which may include one or more TRIACs. The operating component 1370 may comprise, for example, a processor 1234a-c, memory 1244a-c, executable instructions 1246a-c, network communications hardware 1236a-c, valve communications hardware 1248, user input(s) 1242a-c, user output(s) 1250a-c, one or more routers 1202 and/or computer network(s) 1204. The operating component 1370 may, for example, communicate and/or have overlap with the valve communications component 1386 and/or the watering schedule component 1390.

The replenishment point component 1371 may calculate a replenishment point level 425 for the at least one watering zone within a property, as will be explained in additional detail, for example, in connection with step 1714 of FIG. 17. As noted above, the replenishment point level 425 may be computed based on various factors, including soil type and root zone depth 410. These factors affecting a replenishment point level 425 may be input by a user or may be received from a remote source. The replenishment point component 1371 may comprise, for example, a processor 1234a-c, memory 1244a-c, executable instructions 1246a-c, network communications hardware 1236a-c, sensor(s) 1238, sensor(s) 1240, valve communications hardware 1248, user input(s) 1242a-c, user output(s) 1250a-c, one or more routers 1202 and/or computer network(s) 1204. The replenishment point component 1371 may, for example, communicate and/or have overlap with the replenishment point time component 1372 and/or the watering schedule component 1390.

The replenishment point time component 1372 may calculate, based at least in part on the forecast evapotranspiration data 1316, an estimated replenishment point time when the estimated in-soil water level 408 will reach or extend below the replenishment point level 425 within the at least one watering zone, as will be explained in further detail in connection with, for example, step 1718 of FIG. 17. In various embodiments, the replenishment point time indicates the estimated time (based, for example, on forecast evapotranspiration data 1316, forecast weather data 1320, the estimated in-soil water level 408) when the estimated in-soil water level 408 will reach or extend below the replenishment point level 425. In various embodiments, the estimated replenishment point time component may utilize the equation in row no. (3) of Table 8 herein. The replenishment point time component 1372 may comprise, for example, a processor 1234a-c, memory 1244a-c, executable instructions 1246a-c, network communications hardware 1236a-c, sensor(s) 1238, sensor(s) 1240, user input(s) 1242a-c, user output(s) 1250a-c, one or more routers 1202 and/or computer network(s) 1204. The replenishment point time component 1372 may, for example, communicate and/or have overlap with the replenishment point component 1371 and/or watering schedule component 1390.

The requested start time component 1374 may receive user input specifying a requested start time for at least one watering zone, as will be explained in further detail in connection with step 2110 of FIG. 21. Various types of user interfaces may be presented to a user in accordance with the foregoing. For example, a user may be asked to input, using text-to-speech technology, a requested start time at an end-user device 1200c, 1600c. Employing voice recognition technology, user input in the form of a user's voice may be received to indicate a requested start time. Of course, other types of user interfaces may be employed to receive the requested start time for a particular watering zone. The requested start time component 1374 may comprise, for example, a processor 1234a-c, memory 1244a-c, executable instructions 1246a-c, network communications hardware 1236a-c, sensor(s) 1238, sensor(s) 1240, user input(s) 1242a-c, user output(s) 1250a-c, one or more routers 1202 and/or computer network(s) 1204. The requested start time component 1374 may, for example, communicate and/or have overlap with future permissible watering time periods component 1340, network communications component 1368, the requested start time component 1374 and/or start watering time adjustment component 1376.

The start watering time adjustment component 1376 may, if a computed time (i.e., the time (1) after the start time and (2) within the nearest permissible watering period) is less than the total desired run time, move the start time (which may be specified by start time data 1324) backward or forward in time relative to the requested start time to increase the total permissible watering time. Additional information and context regarding this component 1376 are provided, for example, in connection with steps 2118, 2120 and 2123 of FIG. 21. In one or more embodiments, the start watering time adjustment component 1376 may move a requested start time for watering specified by user input backward or forward in time to increase a total permissible watering time before an impermissible watering period, as explained more fully, for example, in connection with the method 2100 of FIG. 21. In various embodiments, the start watering time adjustment component 1376 may move a requested start time (e.g., a start time requested by a user) backward or forward in time to allow for additional time to water one or more zones of the property. In various embodiments, a start watering time adjustment component 1376 be configured to move a start time for watering away from a user-requested start time based on an analysis of permissible and impermissible watering periods (which may be based on permissible/impermissible watering time data 1310). The start watering time adjustment component 1376 may comprise, for example, a processor 1234a-c, memory 1244a-c, executable instructions 1246a-c, network communications hardware 1236a-c, user input(s) 1242a-c, user output(s) 1250a-c, one or more routers 1202 and/or computer network(s) 1204. The start watering time adjustment component 1376 may, for example, communicate and/or have overlap with the network communications component 1368, the requested start time component 1374, the nearest identification component 1350, the time computation component 1352 and/or the total desired watering time component 1380.

The total desired watering time component 1380 may calculate a total desired watering time (sometimes referred to, for example, as a "total desired run time" or "total ideal run time") equal to a sum of desired watering times (sometimes referred to, for example, as "run time") for each of the watering zones within the future temporal period. The computations of the total desired watering time component 1380 may be based, for example, on forecast weather data 1320. Additional information and context regarding this component 1380 are provided, for example, in connection with step 512 of FIG. 5, step 1814 of FIG. 18 and/or step 2112 of FIG. 21. A desired watering time indicates a watering time for a zone to achieve a particular watering objective (which objective may vary depending upon the particular implementation) when there are no watering restrictions. The total desired watering time component 1380 may comprise, for example, a processor 1234*a-c*, memory 1244*a-c*, executable instructions 1246*a-c*, network communications hardware 1236*a-c*, user input(s) 1242*a-c*, user output(s) 1250*a-c*, one or more routers 1202 and/or computer network(s) 1204. The total desired watering time component 1380 may, for example, communicate and/or have overlap with a requested start time component 1374, the future permissible watering time periods component 1340, the total permissible watering time component 1384, the start watering time adjustment component 1376, the watering schedule component 1390, the nearest identification component 1350, the time computation component 1352 and/or the operating component 1370.

The total scheduled watering time component 1382 may, without human intervention, calculate a scheduled watering time for the at least one of the watering zones based at least in part on a ratio between the lowest quartile average (the average of the lowest quartile of values 1312 for catch cups 710) and the average of the measurement values 1314 for all of the catch cups 710 used during a test watering period. Additional information and context regarding this component 1382 are provided, for example, at step 2028 of FIG. 20. The total scheduled watering time component 1382 may comprise, for example, a processor 1234*a-c*, memory 1244*a-c*, executable instructions 1246*a-c*, network communications hardware 1236*a-c*, user input(s) 1242*a-c*, user output(s) 1250*a-c*, valve communications hardware 1248, one or more routers 1202 and/or computer network(s) 1204. The total scheduled watering time component 1382 may, for example, communicate and/or have overlap with the average component 1332, the lowest quartile component 1366 and/or the lowest quartile average component 1364.

The total permissible watering time component 1384 may calculate the total permissible watering time within a temporal period after the start time specified by the start time data 1324. The total permissible watering time is the time within the temporal period outside of any impermissible watering times. The total permissible watering time component 1384 may do so by communication with other components and/or devices via the computer network(s) 1204 or using data stored within the device performing the operation. Additional information and context regarding this component 1384 are provided, for example, in connection with step 1812 of FIG. 18. The total permissible watering time component 1384 may comprise, for example, a processor 1234*a-c*, memory 1244*a-c*, executable instructions 1246*a-c*, network communications hardware 1236*a-c*, user input(s) 1242*a-c*, user output(s) 1250*a-c*, one or more routers 1202 and/or computer network(s) 1204. The total permissible watering time component 1384 may, for example, communicate and/or have overlap with the requested start time component 1374, the total desired watering time component 1380, the future permissible watering time periods component 1340, the start watering time adjustment component 1376 the nearest identification component 1350, the time computation component 1352 and/or the watering schedule component 1390.

The valve communications component 1386 may transmit electrical signals to one or more of the valves 1230*a-c* to open or close the one or more valves. The valve communications component 1386 may comprise, for example, a processor 1234*a-c*, memory 1244*a-c*, executable instructions 1246*a-c* and/or valve communications hardware 1248, one or more routers 1202 and/or computer network(s) 1204. The valve communications component 1386 may, for example, communicate and/or have overlap with the watering schedule component 1390.

The water level difference component 1388 may identify a difference between an estimated in-soil water level 408 and the estimated in-soil water capacity 420 for at least one of the watering zones. Additional information and context regarding this component 1388 are provided, for example, in connection with step 2222 of FIG. 22. The water level difference component 1388 may comprise, for example, a processor 1234*a-c*, memory 1244*a-c*, executable instructions 1246*a-c*, network communications hardware 1236*a-c*, sensor(s) 1238, sensor(s) 1240, 1240, user input(s) 1242*a-c*, user output(s) 1250*a-c*, valve communications hardware 1248, one or more routers 1202 and/or computer network(s) 1204. Water level difference component 1388 may, for example, communicate and/or have overlap with the forecast evapotranspiration component 1338, the forecast precipitation component 1342, the estimated irrigation rate component 1336, the in-soil water level component 1362, the in-soil water capacity component 1360 and/or the watering schedule component 1390.

The watering schedule component 1390 may formulate a watering schedule based on watering schedule data 1326. The watering schedule component 1390 may consider a number of factors, such as the position of the in-soil water level 408 relative to the replenishment point level 425, catch cup data 1304, the total permissible watering time relative to the total desired watering time, a requested start time (which may comprise a portion of the start time data 1324) and/or upcoming impermissible watering periods. Additional information and context regarding this component 1390 are provided, for example, in connection with steps 1722, 1724 and 1726 of FIG. 17, steps 1816, 1818 and 1820 of FIG. 18, step 2030 of FIG. 20, steps 2122 and 2123 of FIG. 21, step 2224 of FIG. 22. The watering schedule component 1390 may comprise, for example, a processor 1234*a-c*, memory 1244*a-c*, executable instructions 1246*a-c*, network communications hardware 1236*a-c*, sensor(s) 1238, sensor(s) 1240, user input(s) 1242*a-c*, user output(s) 1250*a-c*, valve communications hardware 1248, one or more routers 1202 and/or computer network(s) 1204. The watering schedule component 1390 may, for example, communicate with and/or overlap each of the components identified in FIGS. 13A-B and 14-16.

The watering time compression component 1392 is configured to proportionally reduce an actual watering time for each watering zone within the property if a total desired watering time for all of the watering zones exceeds a total permissible watering time within a temporal period. Additional information and context regarding this component 1392 are provided, for example, in connection with method 2100 of FIG. 21. The watering time compression component 1392 may comprise, for example, a processor 1234a-c, memory 1244a-c, executable instructions 1246a-c, network communications hardware 1236a-c, sensor(s) 1238, sensor(s) 1240, user input(s) 1242a-c, user output(s) 1250a-c, valve communications hardware 1248, one or more routers 1202 and/or computer network(s) 1204. The watering time compression component 1392 may, for example, communicate and/or have overlap with the impermissible period identification component 1348, the total permissible watering time component 1384, the total desired watering time component 1380 and/or watering schedule component 1390.

The current settings component 1394 may obtain current settings for an irrigation timer. In various embodiments, the current settings component 1394 may obtain the current settings from a remotely located irrigation timer via one or more computer networks 1204. For example, a server 1500b and/or an end-user device 1600c may obtain current settings for a local device 1400a via one or more computer networks 1204. Additional information and context regarding this component 1394 are provided, for example, in connection with step 2320 of FIG. 23. The current settings component 1394 may comprise, for example, a processor 1234a-c, memory 1244a-c, executable instructions 1246a-c, network communications hardware 1236a-c, user input(s) 1242a-c, user output(s) 1250a-c, one or more routers 1202 and/or computer network(s) 1204. The current settings component 1394 may, for example, communicate and/or have overlap with the current settings component 1394, the in-soil water level component 1362, in-soil water capacity component 1360, the forecast evapotranspiration component 1338, the forecast precipitation component 1342, the watering schedule component 1390, the recommended changes component 1396 and/or notification component 1398.

The recommended changes component 1396 may formulate a set of one or more recommended changes for the watering schedule component 1390 of an irrigation timer. The recommended changes component 1396 may operate and reside on a device remote from a local device 1400a, such as on a server 1500b and/or an end-user device 1600c. Additional information and context regarding this component 1396 are provided, for example, in connection with step 2322 of FIG. 23. The recommended changes component 1396 may comprise, for example, a processor 1234a-c, memory 1244a-c, executable instructions 1246a-c, network communications hardware 1236a-c, user input(s) 1242a-c, user output(s) 1250a-c, valve communications hardware 1248, one or more routers 1202 and/or computer network(s) 1204. The recommended changes component 1396 may, for example, communicate and/or have overlap with the current settings component 1394, the in-soil water level component 1362, in-soil water capacity component 1360, the forecast evapotranspiration component 1338, the forecast precipitation component 1342, the watering schedule component 1390 and/or notification component 1398.

The notification component 1398 may transmit or present electronic notification of a set of one or more recommended changes to the watering schedule. The electronic notification may be formulated into a user interface which may be viewed by a user on, for example, a local device 1400a, a server 1500b, and/or an end-user device 1600c. Additional information and context regarding this component 1398 are provided, for example, in connection with step 2324 of FIG. 23. The notification component 1398 may comprise, for example, a processor 1234a-c, memory 1244a-c, executable instructions 1246a-c, network communications hardware 1236a-c, user input(s) 1242a-c, user output(s) 1250a-c, valve communications hardware 1248, one or more routers 1202 and/or computer network(s) 1204. The notification component 1398 may, for example, communicate and/or have overlap with the current settings component 1394, the in-soil water level component 1362, in-soil water capacity component 1360, the forecast evapotranspiration component 1338, the forecast precipitation component 1342, the watering schedule component 1390 and/or the recommended changes component 1396.

It should be noted that the functional components identified in FIGS. 13A-B, 14A-B, 15A-B, and 16A-B may operate on one or more of the local device 1400a, the server 1500b, and/or the end-user device 1600c. In various embodiments, each of the local device 1400a, the server 1500b, and/or the end-user device 1600c may perform all or a portion of the identified functions. Accordingly, the disclosed subject matter encompasses computations and operations performed by a single device and a group of devices.

Referring now to FIGS. 17-23, the illustrated methods may be practiced, for example, using the multi-zone irrigation controller 100 of FIG. 1, the hose faucet irrigation controller 200 of FIG. 2, the irrigation controller 300 of FIG. 3, the irrigation controller 1200 or local device 1200a of FIG. 12A, the server 1200b of FIG. 12B, the end-user device 1200c of FIG. 12C, the irrigation flow controller 1300 of FIGS. 13A-B, the local device 1400a of FIGS. 14A-B, the server 1500b of FIGS. 15A-B, the end-user device 1600c of FIGS. 16A-B and/or any other system or device within the scope of the present disclosure. Moreover, the method 1700 may be implemented by one or more processors and memory associated with any system or device within the scope of the present disclosure, such as the memory 1244a-c and processors 1234a-c illustrated in FIGS. 12A-C.

Figure 17:
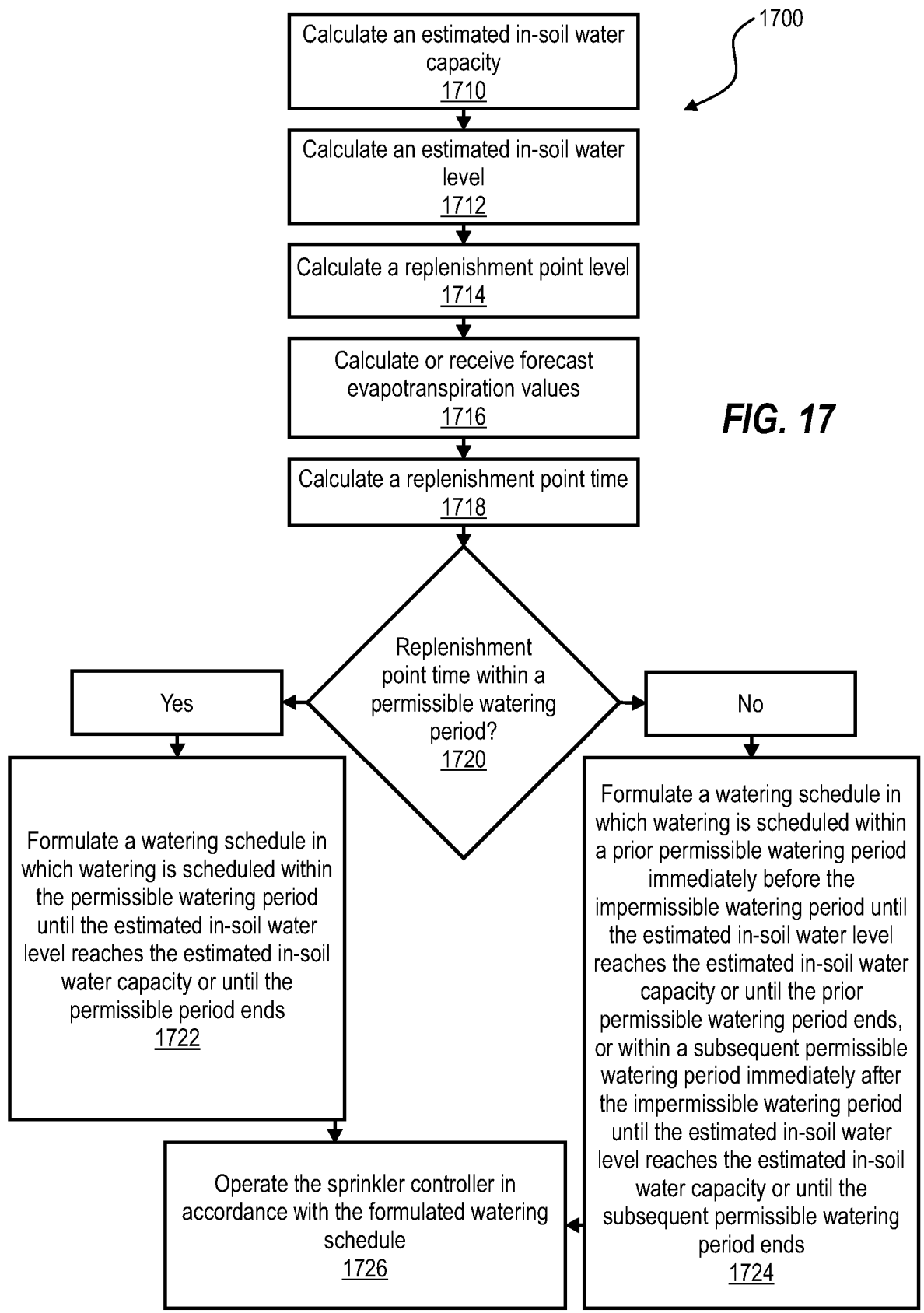
FIG. 17 is a flowchart illustrating one embodiment of a method for irrigating a property based at least in part on an estimated replenishment point level.

With reference now to FIG. 17, a flowchart is shown of a method 1700 for formulating a watering schedule based at least in part on an estimated replenishment point level 425. The method 1700 may begin with step 1710 in which an estimated in-soil water capacity 420 may be calculated for at least one watering zone by an in-soil water capacity component 1360. The estimated in-soil water capacity 420 may be calculated based on the type of soil in the watering zone (e.g., sandy soil, loam soil, clay soil, etc.). The type of soil may be a default type of soil in general (or for a specific area based on GPS coordinates or ZIP Code) or, alternatively, may be specified through user input. Alternatively and/or additionally, the estimated in-soil water capacity 420 may be obtained from an external source (for example, from a server or from memory) which may be based on or provided by a look-up table, a governmental agency, or any other external source that tracks the estimated in-soil water capacity 420 for soils in an area. Alternatively, the estimated in-soil water capacity 420 may be directly measured by any known technique in the art, and/or may be calculated for the at least one watering zone, based at least in part on user input specifying a soil type for the at least one watering zone.

In step 1712, an estimated in-soil water level 408 may be calculated for the at least one watering zone by an in-soil water level component 1362. The estimated in-soil water level 408 may be calculated based on prior/historical irrigation, precipitation, evapotranspiration, and weather data. Alternatively, the estimated in-soil water level 408 may be calculated, for example, using historical evapotranspiration data 1306 and other historical weather data 1308. As used herein, the term "calculate" may encompass direct measurement of the in-soil water level 408 through, for example, use of a sensor 1238.

In step 1714, a replenishment point level 425 may be calculated for the at least one watering zone by a replenishment point component 1371. The replenishment point level 425 may be calculated, for example, based on the type of plants in the at least one watering zone, the root zone depth 410 of the plants, the type of soil, and the estimated in-soil water capacity 420 of the soil. Alternatively, the replenishment point level 425 may be chosen based on known measurements of similar soils/plants to estimate an appropriate replenishment point level 425.

In step 1716, forecast evapotranspiration data 1316 may be calculated or received by a forecast evapotranspiration component 1338 for the at least one watering zone. In various embodiments, the forecast evapotranspiration component 1338 may calculate the forecast evapotranspiration data 1316 based at least in part on forecast weather data 1320. Forecast weather data 1320 may include forecast temperature data, forecast humidity data, forecast wind data and the like.

In step 1718, a replenishment point time may be calculated by a replenishment point time component 1372 for the at least one watering zone. In various embodiments, the replenishment point time may be based at least in part on the forecast evapotranspiration data 1316. In various embodiments, the equation provided in row no. (3) of Table 8 may be utilized to calculate the replenishment point time. It should be noted that other equations may be employed to ascertain the replenishment point time.

In step 1720, a determination of whether a replenishment point time is estimated to occur within a permissible watering period may be made. Should the replenishment point time occur within a permissible watering period, the method 1700 may proceed to step 1722. Alternatively, should the replenishment point time be estimated to not occur within a permissible watering period, the method 1700 may proceed to step 1724.

In step 1722, a watering schedule may be formulated by a watering schedule component 1390 in which watering is scheduled within the permissible watering period until the estimated in-soil water level 408 reaches the estimated in-soil water capacity 420 or until the permissible period ends. Thus, the watering schedule may schedule electrical signals to be sent to open the one or more irrigation valves associated with the at least one watering zone. In this manner, the formulated watering schedule may allow the estimated in-soil water level 408 to reach the estimated in-soil water capacity 420 in the conditions enumerated above.

In step 1724, a watering schedule may be formulated in which watering is scheduled within a prior permissible watering period immediately before the impermissible watering period until the estimated in-soil water level 408 reaches the estimated in-soil water capacity 420 or until the prior permissible watering period ends, or within a subsequent permissible watering period immediately after the impermissible watering period until the estimated in-soil water level 408 reaches the estimated in-soil water capacity 420 or until the subsequent permissible watering period ends. Thus, the formulated watering schedule may allow the estimated in-soil water level 408 to reach the estimated in-soil water capacity 420 while not watering within any impermissible watering periods.

In step 1726, the sprinkler controller may be operated in accordance with the formulated watering schedule obtained from step 1722 or step 1724 by an operating component 1370.

Figure 18:
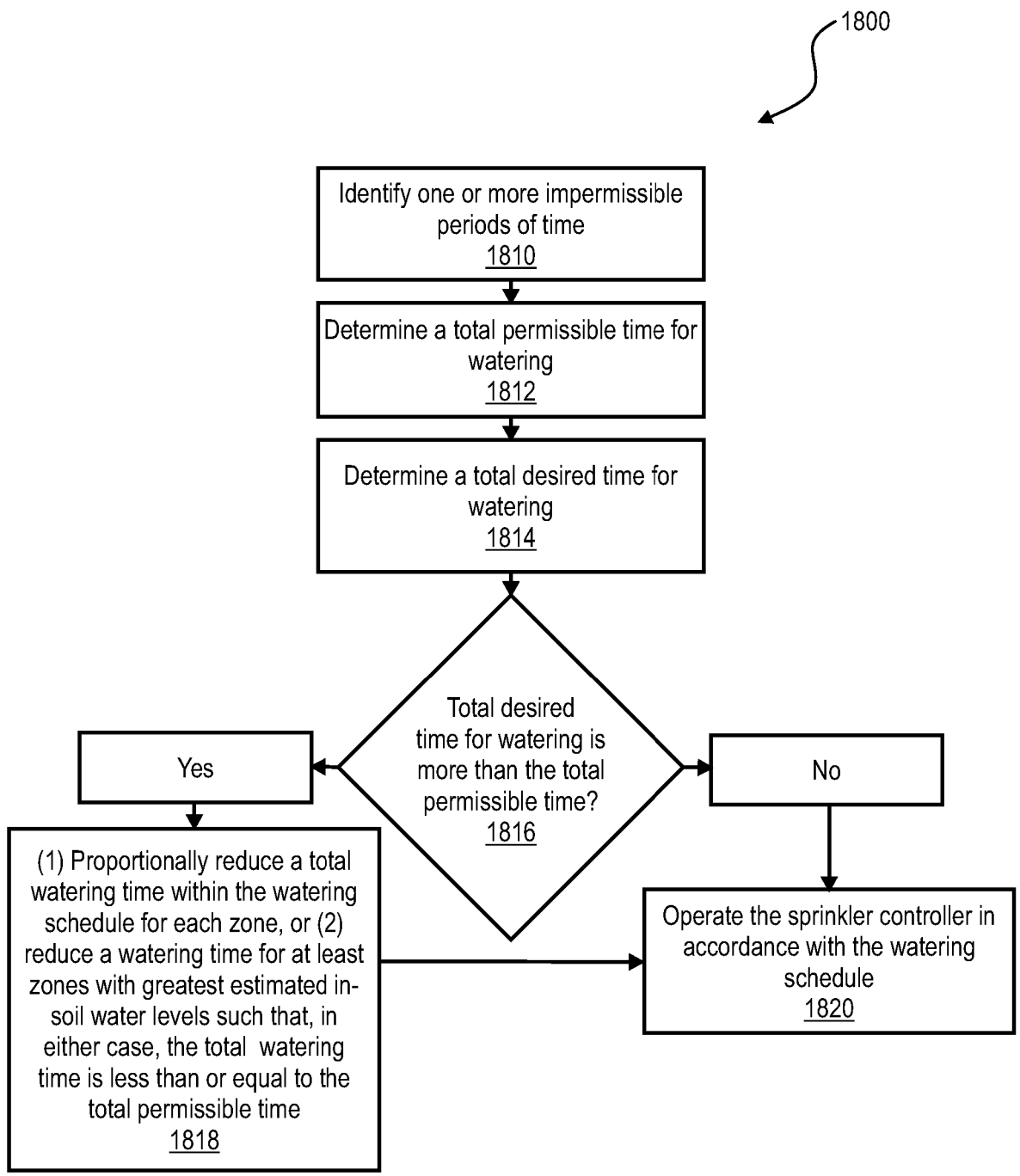
FIG. 18 is a flowchart illustrating one embodiment of a method for formulating a watering schedule based on one or more impermissible periods of time.

Referring now to FIG. 18, a flowchart is shown of a method 1800 for formulating a watering schedule based on one or more impermissible watering periods. As shown, the method 1800 may begin with step 1810 in which one or more impermissible periods of time for watering are identified based on impermissible/permissible watering time data 1310 received by an impermissible period identification component 1348. The one or more impermissible periods of time may be instituted by a water management company, agency, government, or the like in order to help conserve water. Impermissible periods of time may include certain times of the day (e.g., during the hottest times of the day when evapotranspiration is high) or may last for entire days or any other period of time.

In step 1812, a total permissible time for watering within the temporal period, outside of the one or more impermissible periods of time, is determined by a total permissible watering time component 1384.

In step 1814, a total desired time for watering the property during the temporal period based, at least in part, on forecast weather data 1320 for the property is determined by a total desired watering time component 1380.

In step 1816, a determination of whether the total desired time for watering is more than the total permissible time is made by a watering schedule component 1390. If the total desired time for watering is more than the total permissible time, the method 1800 may proceed to step 1818. Alternatively, if the total desired time for watering is less than (or equal to) the total permissible time, the method 1800 may proceed to step 1820.

In step 1818, the watering schedule component 1390 may proportionally reduce a total watering time (or actual watering time) within the watering schedule for each zone by a watering time compression component 1392, or alternatively, the watering schedule component 1390 may reduce a watering time for at least one zone based on the greatest estimated in-soil water levels 408 such that the total watering time is less than or equal to the total permissible time.

In step 1820, an operating component 1370 may operate the sprinkler controller in accordance with the formulated watering schedule.

Figure 19:
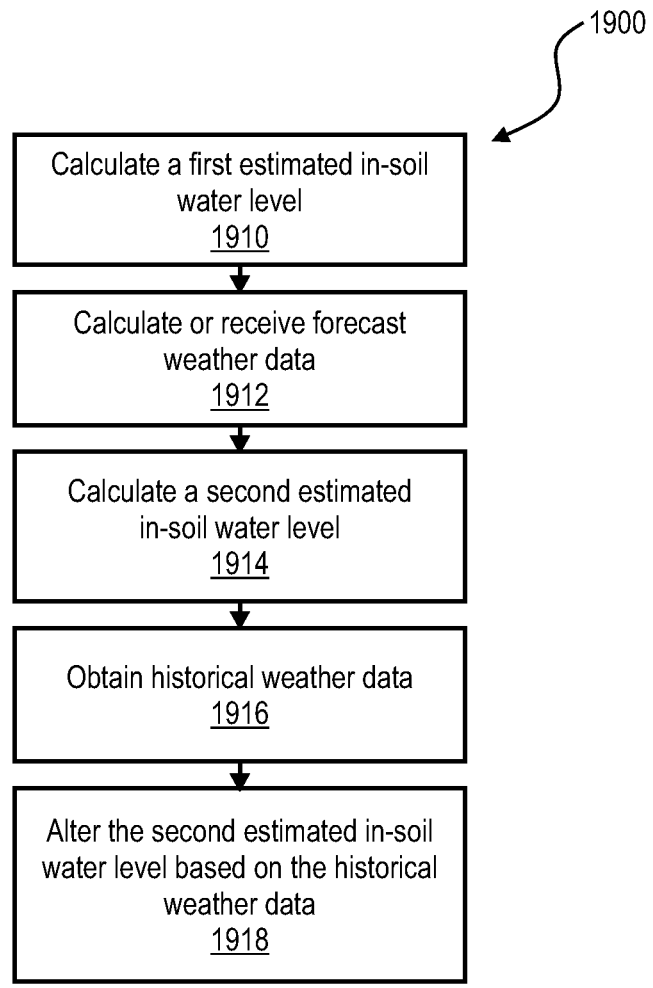
FIG. 19 is a flowchart illustrating one embodiment of a method for updating an estimated in-soil water level based on historical weather data.

Referring now to FIG. 19, a flowchart is shown of a method 1900 for updating an estimated in-soil water level 408 based on historical weather data 1308. The method 1900 may begin with step 1910 in which a first estimated in-soil water level 408 for at least one of the watering zones on the property at a first point in time may be calculated by an in-soil water level component 1362, as previously discussed with reference to FIG. 17.

In step 1912, forecast evapotranspiration data 1316 for the at least one of the watering zones during the intermediate period of time may be calculated or received by a forecast evapotranspiration component 1338. The forecast evapotranspiration data 1316 may be based at least in part on forecast weather data 1320 for an intermediate period of time extending between the first point in time and a subsequent, second point in time.

In step 1914, a second estimated in-soil water level 408 for the at least one watering zone on the property at the second point in time may be calculated by the in-soil water level component 1362. The second estimated in-soil water level 408 may also be based at least in part on the forecast evapotranspiration data 1316.

In step 1916, historical weather data 1308 after the second point in time for the intermediate period of time may be obtained by a historical weather component 1346.

In step 1918, the second estimated in-soil water level 408 at the second point in time may be altered by the adjustment of in-soil water level component 1330 in accordance with differences or inconsistencies between the forecast weather data 1320 and the historical weather data 1308.

Furthermore, in at least one embodiment, the irrigation schedule may be adjusted based on the altered second estimated in-soil water level 408. In various embodiments, the estimated in-soil water level 408 may be adjusted or corrected when historical weather data 1308 is inconsistent with forecast weather data 1320. In another embodiment, an estimated in-soil water level 408 for a point in time may be altered based at least in part on a forecast evapotranspiration data 1316 for a period of time preceding the point in time to an altered estimated in-soil water level 408 for the point in time based at least in part on differences or inconsistencies between the forecast evapotranspiration data 1316 for the period of time and a historical evapotranspiration data 1306 for the period of time.

Figure 20:
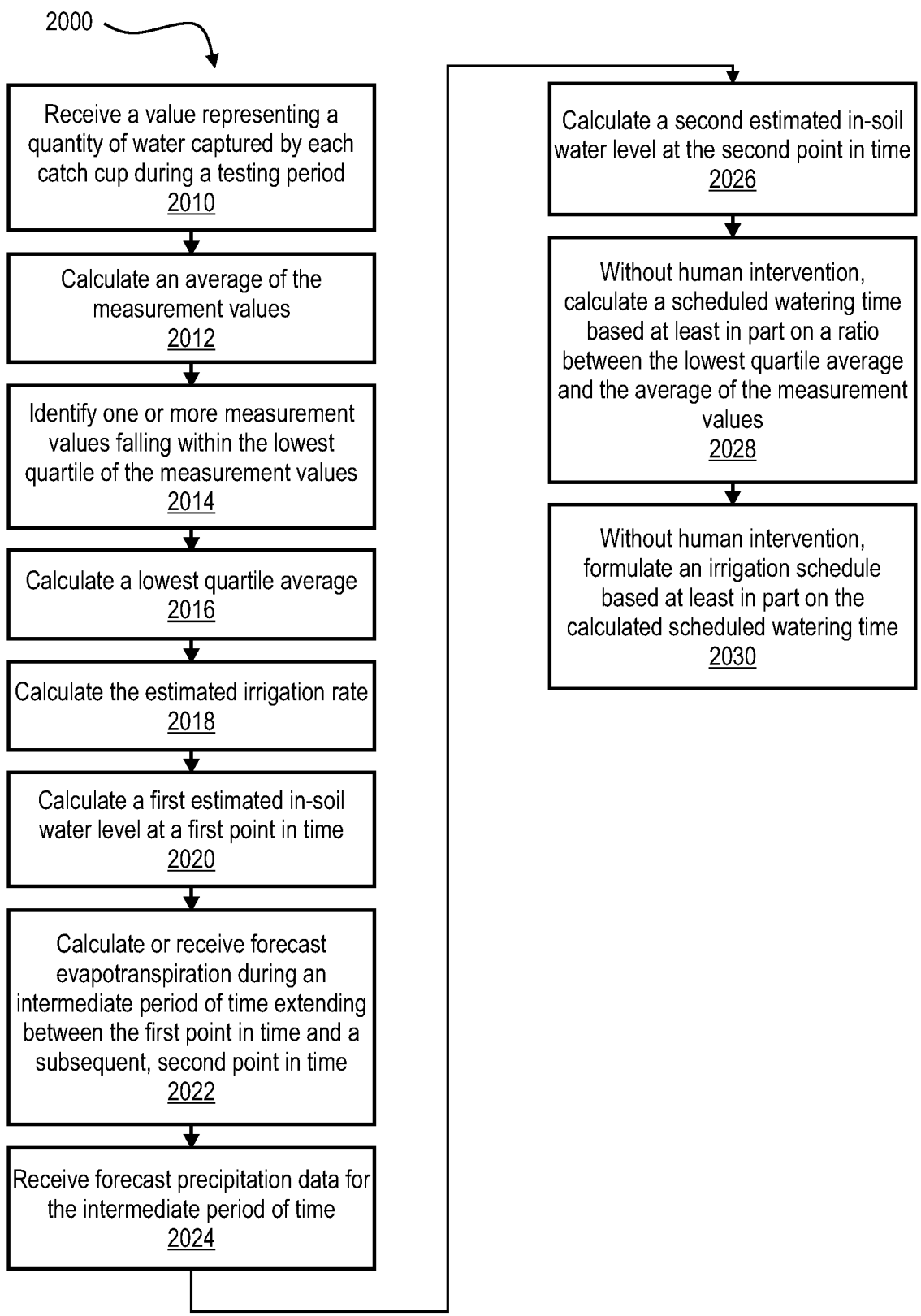
FIG. 20 is a flowchart illustrating one embodiment of a method for formulating a watering schedule based on measurement values for one or more catch cups.

Referring now to FIG. 20, a flowchart is shown of a method 2000 for formulating a watering schedule based on a lowest quartile average of measurement values 1314 for the catch cups 710.

Table 5 below illustrates data, information, equations and variables, along with their associated sample values, units, and explanations which may be employed, in various embodiments, to carry out one or more steps of the method 2000 of FIG. 20. The information, sample values, units, and explanations identified in Table 5 are only exemplary and are not limiting of the manner in which the method 2000 may be implemented.

Table 5 is as follows:

TABLE 5

| No. | Name | Sample Value | Units | Explanation |
|---|---|---|---|---|
| (1) | Zip Code | 84010 | No units | Input by user or obtained from GPS on local device 300a, 1200a, or 1400a or an associated end-user device 300c, 1200c, or 1600c |
| (2) | Testing Run Time for Catch Cups 710 | 5 | Minutes | The use of catch cup data measurement values 1314 is optional; this value may be input by a user or a default value may be used |
| (3) | Soil Texture Class | Clay | No units | The default value may be loam or may, alternatively, be selected by a user from various options, including clay, clay loam, loam, sandy loam and sandy |
| (4) | Root Zone Depth 410 | 6 | Inches | The default value may be 6 inches or may alternatively be specified through user input |
| (5) | Days in ETo Reference Period | 31 | Days | Obtained from a calendar and indicates the number of days in a current month |
| (6) | Reference ETo | 8.39 | Inches/month | Reference Evapotranspiration from, for example, the International Water Management Institute (IWMI) tables and may be based on ZIP Code and calendar/time |
| (7) | Landscape Coefficient ($K_L$) | 70% | Percent | This value may employ, for example, a default value of 70 percent and take into account and may be adjusted, for example, based on plant species, microclimate (the climate in a particular area), and plant density. This value may be calculated by the irrigation controller based on user inputs related, for example, to plant type, plant density and/or ZIP Code, or may be received/obtained from another system (such as the server 300b, 1200b, 1500b) or entity. |
| (8) | Landscape ET | 5.87 | Inches | [Reference ETo] * [Landscape Coefficient ($K_L$)] This can also be referred to as $ET_c$ (Crop ET) |
| (9) | Average Daily ETo | 0.19 | Inches/day | [Landscape ETc]/[ETo Reference Period] |
| (10) | Irrigation Rate | 1.42 | Inches per Hour | This value may be a default value or may be specified by user input; alternatively, catch cup measurement values 1314 may be used to generate this number using the following equation: ([Irrigation Rate in Inches per Hour] = [Average Catch Cup Reading for All Catch Cups 710 in Milliliters] * 3.66/ ([Testing Run Time in minutes] * [Entrance Area to Catch Cup 710 in Square inches]) Alternatively, the irrigation rate may be calculated using the following equation: ([Irrigation Rate in Inches per Hour] = [Average Catch Cup Reading for All Catch Cups 710 in Tenths of Inches])/ ([Testing Run Time in minutes]/[16 minutes] |
| (11) | Average of Lowest Quartile of Catch Cup Values | 13.63 | Milliliters | [Sum of all the moisture values within the lowest quartile of values 1312 of the catch cup measurement values 1314 (i.e., the quartile of the catch cups 710 that received the smallest amount of moisture during the test run)]/number of catch cups 710 within the lowest quartile] (see Table 6) |
| (12) | Average of All Catch Cup Values | 25.27 | Milliliters | [Sum of all the values reflecting moisture captured by the catch cups during the test run]/[total number of catch cups 710 used in the test period] (See Table 6) |
| (13) | Distribution Uniformity | 54% | Percent | A default value may be applied, may be specified by user or, alternatively, catch cup measurement values 1314 may be used to generate this number using the following equation: [Average of the Lowest Quartile of Catch Cup Values]/[Average of All Catch Cup Values] |
| (14) | Scheduling Multiplier | 1.38 | Numeric | This number is calculated using the following formula: 1/(.4 + (.6 * [Distribution Uniformity]) |

TABLE 5-continued

| No. | Name | Sample Value | Units | Explanation |
|---|---|---|---|---|
| (15) | Available Water Value | 0.14 | Inches/Inches | Available Water may be ascertained, for example, with reference to Table 7 based on soil type |
| (16) | Plant Available Water Depth | 0.84 | Inches | [Available Water Value (from Table 7)] * [Root Zone Depth 410] |
| (17) | Replenishment Point Level 425 [Maximum Allowable Depletion 424] (FIG. 4 of application | 0.42 | Inches | [Available Water Depth 415] * ([Maximum Allowable Depletion Value from Table 7 based, for example, on soil type]/100) |
| (18) | Irrigation Interval | 2 | Days | Round Down to the Nearest Whole Number of ([Replenishment point level]/[Average Daily ETo]) |
| (19) | Water to Apply | 0.38 | Inches | [Average daily ETo] * [Irrigation Interval] |
| (20) | Total Ideal Run Time per Day | 16 | Minutes/Day | ([Water to Apply]/[Irrigation Rate]) * 60 |
| (21) | Total Adjusted Run Time per Day | 22 | Minutes/Days | [Total Ideal Run Time per Day] * [Scheduling Multiplier] |
| (22) | Maximum Run Time per Cycle | 8 | Minutes/Cycle | ([Basic Infiltration Rate per the Soil Type take from, for example, Table 7]/[Irrigation Rate]) * 60 |
| (23) | Cycles per Day | 3 | Cycle/Day | Round up to the Nearest Whole Number of ([Total Adjusted Run Time per Day]/[Maximum Run Time per Cycle]) |
| (24) | Run Time per Cycle | 7 | Minute/Cycle | Adjusted Run Time per Day]/[Maximum Run Time per Cycle] |

Table 6 below provides one example of measurement values 1314 of catch cups 710 which may be used to carry out one or more steps of the method 2000.

Table 6 is as follows:

TABLE 6

| Cup No. | Volume in Milliliters |
|---|---|
| 1 | 50 |
| 2 | 42 |
| 3 | 41 |
| 4 | 40 |
| 5 | 40 |
| 6 | 36 |
| 7 | 35 |
| 8 | 35 |
| 9 | 34 |
| 10 | 34 |
| 11 | 34 |
| 12 | 34 |
| 13 | 32 |
| 14 | 30 |
| 15 | 29 |
| 16 | 29 |
| 17 | 28 |
| 18 | 28 |
| 19 | 27 |
| 20 | 27 |
| 21 | 27 |
| 22 | 26 |
| 23 | 26 |
| 24 | 26 |

TABLE 6-continued

| Cup No. | Volume in Milliliters |
|---|---|
| 25 | 25 |
| 26 | 25 |
| 27 | 25 |
| 28 | 25 |
| 29 | 21 |
| 30 | 21 |
| 31 | 21 |
| 32 | 21 |
| 33 | 20 |
| 34 | 19 |
| 35 | 19 |
| 36 | 18 |
| 37 | 16 |
| 38 | 16 |
| 39 | 16 |
| 40 | 15 |
| 41 | 14 |
| 42 | 14 |
| 43 | 12 |
| 44 | 12 |
| 45 | 12 |
| 46 | 12 |
| 47 | 12 |
| 48 | 12 |
| Average Cup Volume of Lowest Quartile of Cup Values | 13.63 |
| Average Cup Volume of All Cups | 25.27 |
| Distribution Uniformity (Average Cup Volume of Lowest Quartile of Cup Values/Average Cup Volume of All Cup Values) | 0.54 |

Table 7 below illustrates example soil types and their associated characteristics with typical or potential values. Values in Table 7 are also employed in various locations in Table 5. These values may be used to carry out one or more steps of the method 2000. The symbols, descriptions, and calculations identified in Table 7 are only exemplary and are not limiting of the manner in which the method 2000 may be implemented.

Table 7 is as follows:

TABLE 7

| Soil Type | Available Water Percentage of Root Zone Depth | Basic Infiltration Rate Acre Inches Per Hour of Water That May Be Absorbed by the Soil | Maximum Allowable Depletion Percentage of Root Zone Depth When Divided by a 100 |
|---|---|---|---|
| Clay | 0.14 | 0.20 | 50 |
| Clay Loam | 0.16 | 0.25 | 50 |
| Loam | 0.12 | 0.35 | 50 |
| Sandy Loam | 0.09 | 0.45 | 50 |
| Sand | 0.07 | 0.60 | 50 |

Continuing with FIG. 20, the method 2000 may begin with step 2010 in which one or more measurement values 1314 representing a quantity of water captured by each catch cup 710 positioned within one of the watering zones during a test watering period may be received by a catch cup component 1334.

In various embodiments, one or more measurement values 1314 may be received representing a quantity of water captured by each catch cup 710 positioned within one of the one or more watering zones during a test watering period, and the watering schedule may be automatically adjusted, without additional human intervention beyond inputting the one or more measurement values 1314, based on the one or more measurement values 1314.

In step 2012, an average of the measurement values 1314 may be calculated by an average component 1332.

In step 2014, one or more measurement values 1314 falling within the lowest quartile of the values 1312 may be identified by a lowest quartile component 1366.

In step 2016, a lowest quartile average comprising an average of the measurement values 1314 within the lowest quartile of the values 1312 may be calculated by a lowest quartile average component 1364.

In step 2018, an estimated irrigation rate may be calculated based on the lowest quartile average by an estimated irrigation rate component 1336.

In step 2020, a first estimated in-soil water level 408 for the at least one of the watering zones on the property at a first point in time may be calculated by an in-soil water level component 1362.

In step 2022, forecast evapotranspiration data 1316 for the at least one of the watering zones for an intermediate period of time extending between the first point in time and a subsequent, second point in time may be calculated or received by a forecast evapotranspiration component 1338 based on received forecast weather data 1320.

In step 2024, forecast precipitation data 1322 for the at least one of the watering zones for the intermediate period of time may be received by a forecast weather component 1344.

In step 2026, a second estimated in-soil water level 408 at the second point in time may be calculated based on the first estimated in-soil water level 408, the forecast precipitation data 1322 and the forecast evapotranspiration data 1316 by an in-soil water level component 1362.

In step 2028, a scheduled watering time (e.g., the scheduled watering time for the pertinent zone or zones for the intermediate period of time) for the at least one of the watering zones may be calculated without human intervention by a total scheduled watering time component 1382 based at least in part on a ratio between an average of the lowest quartile of values 1312 and the average of the measurement values 1314.

In step 2030, an irrigation schedule for the at least one of the watering zones may be formulated without human intervention by a watering schedule component 1390 based at least in part on the calculated scheduled watering time.

In various embodiments, each of the steps of the method 2000 of FIG. 20 may be performed entirely without human intervention with the exception of entering or specifying measurement values 1314 for the catch cups 710. In various alternative embodiments, the method 2000 of FIG. 20 may be performed entirely without human intervention when automated sensor(s) 1238 are utilized to determine irrigation water to areas within a particular watering zone. The term "without human intervention" signifies that the steps are performed by a computing device without the need for direction or input from a human being. Programming code prepared by at least one human to perform the pertinent steps, as used in this application, does not comprise human intervention.

Figure 21:
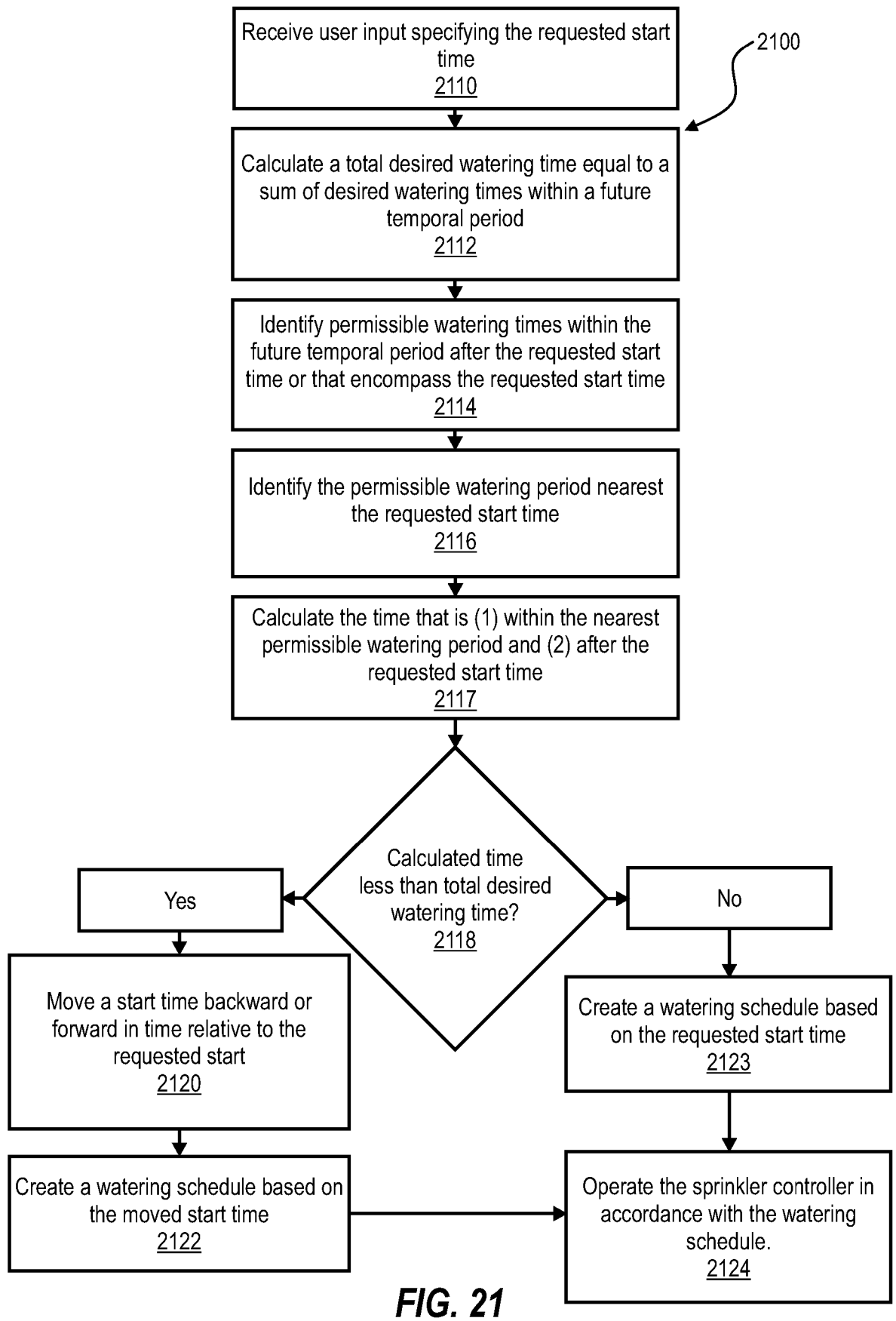
FIG. 21 is a flowchart illustrating one embodiment of a method for formulating a watering schedule in view of a requested start time.

Referring now to FIG. 21, a flowchart is shown of a method 2100 for formulating a watering schedule based on a requested start time. The method 2100 may begin with step 2110 in which user input specifying the requested start time for one of the watering zones is received by a requested start time component 1374 and stored as start time data 1324.

In step 2112, a total desired watering time equal to a sum of desired watering times for each of the watering zones within a future temporal period may be calculated by a total desired watering time component 1380.

In step 2114, permissible watering time periods within the future temporal period after the requested start time may be identified by a future permissible watering time periods component 1340.

In step 2116, the permissible watering period nearest the requested start time employing the nearest identification component 1350 may be identified. The nearest permissible watering period, in various embodiments, may encompass the requested start time or may be the nearest permissible watering period after (or, alternatively, before) the requested start time.

In step 2117, the time that is (1) within the nearest permissible watering period and (2) after the requested start time is calculated using the time computation component 1352.

In step 2118, it may be determined whether the calculated time (1) after the requested start time and (2) within the nearest permissible watering time is less than the total desired watering time (or cumulative watering or run time) by a start watering time adjustment component 1376. If the calculated time is less than the total desired watering time, the method 2100 may proceed to step 2122. Alternatively, if the calculated time is not less than the total desired watering time, the method 2100 may proceed to step 2123.

In step 2120, the start time may be moved backward or forward in time, by a start watering time adjustment component 1376, relative to the requested start time. In various embodiments, the start time may be moved forward in time so that watering may begin in a subsequent permissible watering period, which may be greater in length than the total desired watering time. By way of example, if a permissible watering period in the morning and after the requested start time is not greater than the total desired watering time, the start time may be moved forward in time to begin watering during an evening permissible watering period. Alternatively, the start time may be moved backward in time relative to the requested start time to increase the watering time during a morning permissible watering period. In one such embodiment, after moving the start time backward in time within the morning permissible watering time, the permissible watering time in the morning permissible watering period and after the start time is greater than the total desired watering time.

In step 2122, a watering schedule may be formulated by the watering schedule component 1390 based on the moved start time in accordance with the moved start time.

In step 2123, a watering schedule may be formulated by the watering schedule component 1390 based on the requested start time in accordance with the requested start time.

In step 2124, a sprinkler controller may be operated by an operating component 1370 in accordance with the watering schedule.

Figure 22:
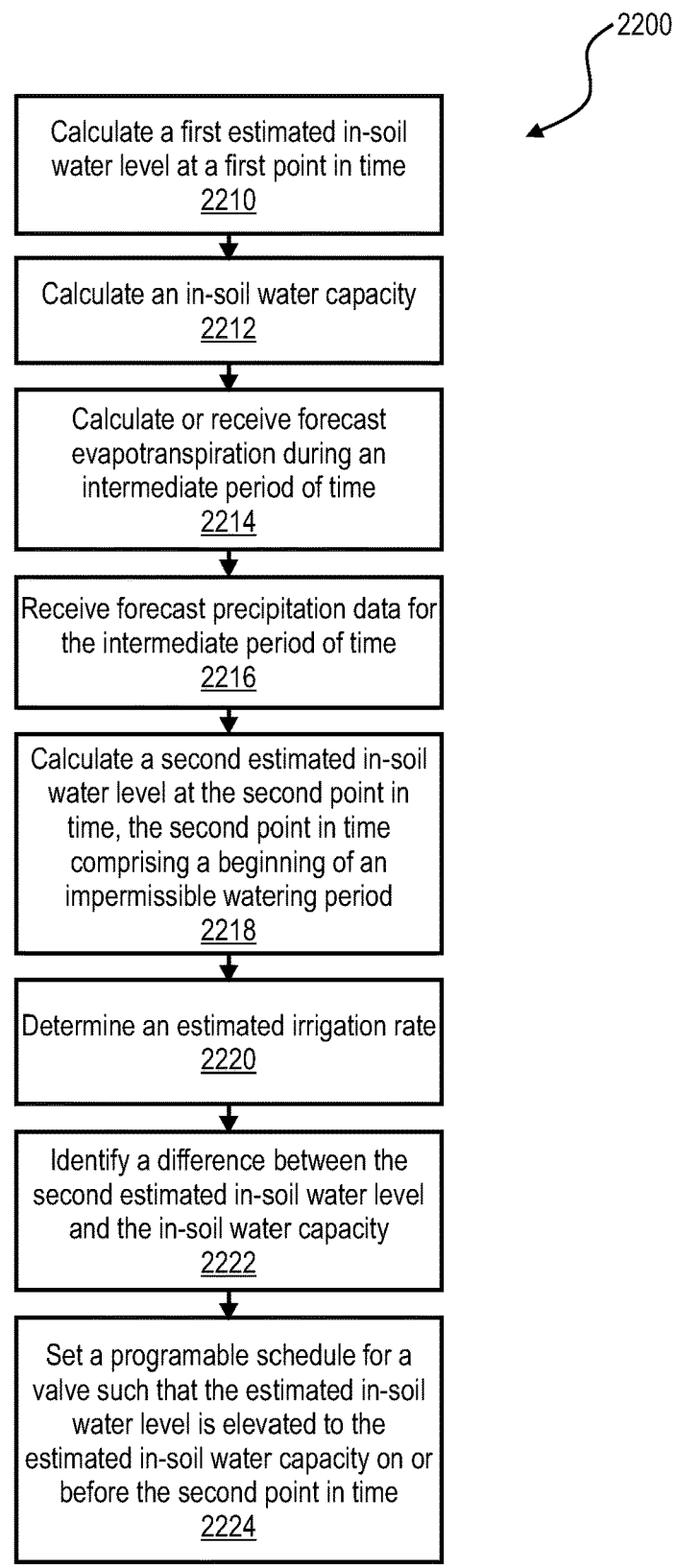
FIG. 22 is a flowchart illustrating one embodiment of a method for formulating a watering schedule based on one or more impermissible periods of time.

Referring now to FIG. 22, a flowchart is shown of a method 2200 for formulating a watering schedule based on one or more impermissible periods of time. The method 2200 may begin with step 2210, in which a first estimated in-soil water level 408 for one of the watering zones on the property at a first point in time may be calculated by an in-soil water level component 1362.

In step 2212, an in-soil water capacity 420 of the at least one of the watering zones may be calculated by an in-soil water capacity component 1360.

In step 2214, forecast evapotranspiration data 1316 for the at least one of the watering zones may be calculated (based on received forecast weather data 1320) by a forecast evapotranspiration component 1338 or received for an intermediate period of time extending between the first point in time and a subsequent, second point in time, the second point in time being later than the first point in time, and the second point in time comprising a beginning of an impermissible watering period for the at least one of the watering zones.

In step 2216, forecast precipitation data 1322 for the at least one of the watering zones for the intermediate period of time may be received by a forecast precipitation component 1342 for the intermediate period of time.

In step 2218, a second estimated in-soil water level 408 for the at least one of the watering zones at the second point in time may be calculated by the in-soil water level component 1362 based on the forecast precipitation data 1322 and the forecast evapotranspiration data 1316.

In step 2220, an estimated irrigation rate imparted by operation of the valve associated with the at least one of the watering zones may be determined by an estimated irrigation rate component 1336.

In step 2222, a difference between the second estimated in-soil water level 408 and the in-soil water capacity 420 for the at least one of the watering zones may be identified by a water level difference component 1388.

In step 2224, a programming schedule may be set by a watering schedule component 1390 for the valve associated with the at least one of the watering zones such that the estimated in-soil water level 408 is elevated to the estimated in-soil water capacity 420 on or before the second point in time based on the estimated irrigation rate during one or more permissible watering periods preceding the impermissible watering period.

Figure 23:
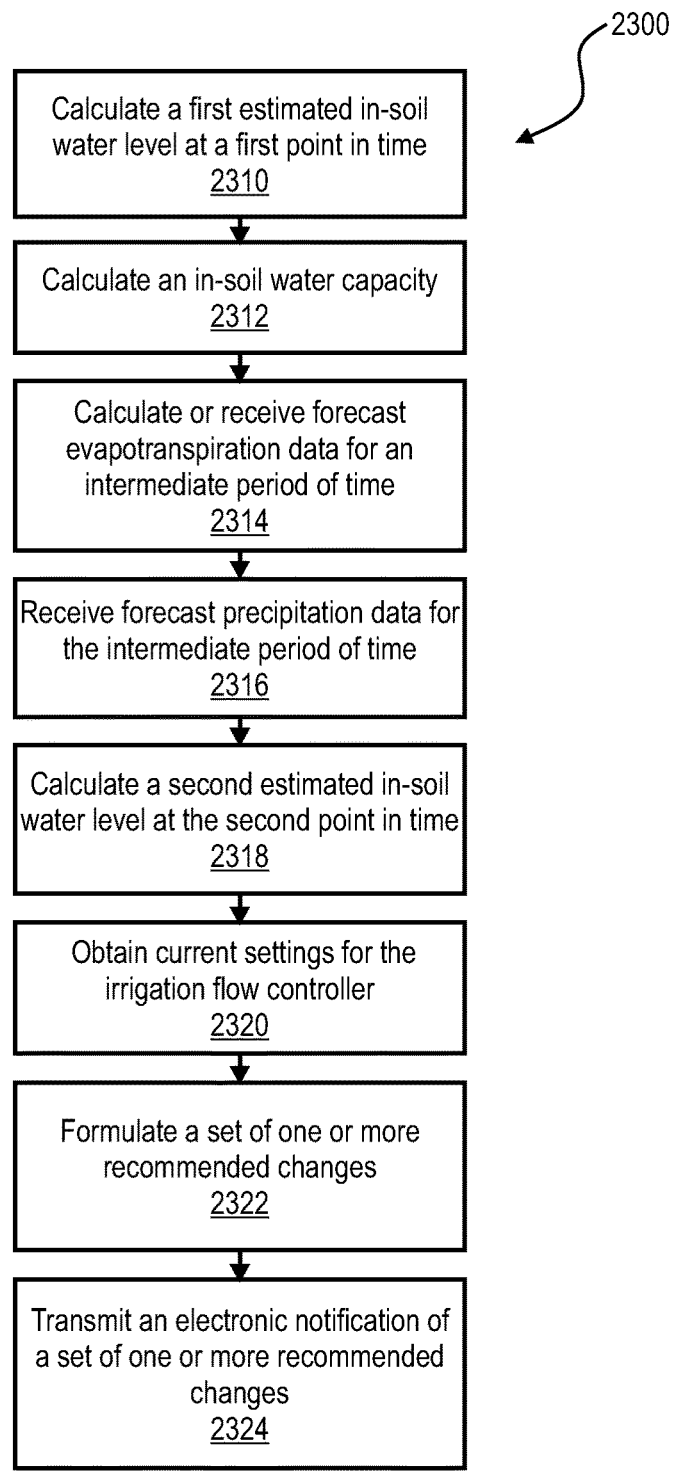
FIG. 23 is a flowchart illustrating one embodiment of a method for formulating a watering schedule and transmitting notification including a set of one or more recommended changes.

Referring now to FIG. 23, a flowchart is shown of a method 2300 for formulating a watering schedule and transmitting a set of one or more recommended changes. The method 2300 may begin with step 2310 in which a first estimated in-soil water level 408 for one of the watering zones on the property at a first point in time may be calculated by an in-soil water level component 1362.

In step 2312, an estimated in-soil water capacity 420 of the at least one of the watering zones may be calculated by an in-soil water capacity component 1360.

In step 2314, forecast evapotranspiration data 1316 may be calculated based on received forecast weather data 1320 or received by a forecast evapotranspiration component 1338 for the at least one of the watering zones for an intermediate period of time extending between the first point in time and a subsequent, second point in time, the second point in time being later than the first point in time, and the second point in time comprising a beginning of an impermissible watering period for the at least one of the watering zones.

In step 2316, forecast precipitation data 1322 for the at least one of the watering zones for the intermediate period of time may be received by a forecast precipitation component 1342.

In step 2318, a second estimated in-soil water level 408 for the at least one of the watering zones at the second point in time may be calculated by the in-soil water level component 1362 based on the forecast precipitation data 1322 and the forecast evapotranspiration data 1316.

In step 2320, current settings for the irrigation timer may be obtained by a current settings component 1394.

In step 2322, a set of one or more recommended changes to the watering schedule component 1390 of the irrigation timer may be formulated by a recommended changes component 1396.

In step 2324, an electronic notification of a set of one or more recommended changes to the watering schedule may be transmitted by a notification component 1398.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified, or various steps may be combined within the scope of the present disclosure.

Table 8 below illustrates a summary of some of the key words and concepts discussed in the present disclosure, as well as some associated example values, units, and explanations. The items in Table 8 are only exemplary and are not intended to be limiting.

Table 8 is as follows:

TABLE 8

| No. | Name | Example Value | Units | Explanation |
|---|---|---|---|---|
| (1) | Replenishment Point Level 425 | 0.6 | In-Soil Water Level 408 at Which All of the Readily Available Water 432 Has Been Depleted | [Maximum Allowable Depletion 424 (taken from, for example, Table 7)] * [Plant Available Water Depth] |
| (2) | Plant Available Water Depth | | | [In-soil water capacity depth 412] − [Permanent Wilting Point Depth 428] |
| (3) | Estimated Time for the In-Soil Water Level 408 to Reach or Extend Below the Replenishment Point Level 425 Considering, for Example, Evapotranspiration and Precipitation | 1.36 Days | Days/Hours /Minutes | ([Estimated In-Soil Water Level 408] − [Replenishment Point Level 425] + ([Precipitation Received or Forecast] * [Application Efficiency]))/[Daily/Hourly/ Minutely ETo] (Note: This equation applies when the estimated in-soil water level 408 is above or greater than the replenishment point level 425. In various embodiments, if the estimated in-soil water level 408 is at or below the replenishment point level 425, watering should be initiated as soon as possible. Also, the portion of the equation "[Estimated In-Soil Water Level 408] − |

TABLE 8-continued

| No. | Name | Example Value | Units | Explanation |
|---|---|---|---|---|
| | | | | [Replenishment Point Level 425]" yields the condition-specific readily available water 422 within the pertinent soil 418 referenced in FIG. 4.) |
| (4) | Replenishment Point Level Time | July 15 at 3:47 PM or Number of Day, Hours or Minutes from Here | Date/Time/ | [Current Time] + [Estimated Time for the In-Soil Water Level 408 to Reach or Extend Below the Replenishment Point Level 425 Considering, for Example, Evapotranspiration and Precipitation] |
| (5) | Estimated In-Soil Water Level 408 | 0.24 | Inches for Surface of Soil | [Previous or Initial In-Soil Water Level 408] + ([Water Added by Precipitation over the Period] + [Water Added by Irrigation in Inches] * [Application Efficiency]) - [Water Dissipated through Evapotranspiration in Inches] |
| (6) | Adjustment of Estimated In-Soil Water Level 408 | -0.23 | Inches | [Estimated In-Soil Water Level 408] + [Forecast Evapotranspiration - Historic Evapotranspiration] + ([Historic Precipitation - Forecast Precipitation] * [Application Efficiency]) |
| (7) | Total Open Valve Time | 45 Minutes | Time in Minutes | Sum of [Run time for Each Zone] |
| (8) | Total Desired Watering Time for All of The Watering Zones | 45 Minutes | Time in Zone] | Sum of [Desired Watering Time for Each (Note: The desired watering time is the watering time that would be implemented if there were no time restrictions or impermissible period watering restrictions.) |
| (9) | Estimated In-Soil Water Level Difference | 1.2 | Inches | [In-soil water capacity 420] - [Estimated In-Soil Water Level 408 at the Beginning of an Impermissible Period] |
| (10) | Total there Permissible Watering Time | 140 minutes | Days, Hours Minutes | [Time in Temporal Period] - [Total Impermissible Watering Time Within the Temporal Period] |

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented. In addition, with respect to the methods disclosed, alternative variations of the disclosed subject matter may involve not only rearranging of certain steps but omitting certain steps within the scope of the disclosed subject matter. In addition, the omission of one or more blocks or elements within the functional or schematic block diagrams and the rearranging of the order of one or more blocks or elements is also within the scope of the disclosed subject matter. It should be noted that an "irrigation flow controller" in the various embodiments disclosed herein may also be referred to as an "irrigation controller."

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

The invention claimed is:

1. An irrigation controller comprising:
a valve communications component, wherein the valve communications component is configured to generate electrical signals to control one or more irrigation valves, each of the one or more irrigation valves controlling a flow of irrigation water to a watering zone of one or more watering zones of a property;
a catch cup component for receiving measurement values, each of the measurement values representing a quantity of water captured by one of a plurality of catch cups positioned within the watering zone during a test watering period, wherein the catch cup component is configured to cause a graphical user interface to display a visual representation of a particular catch cup of the plurality of catch cups and a visual representation of a water level within the particular catch cup, is further configured to alter the visual representation of the water level in response to upward or downward touch input provided to the graphical user interface such that a user may specify a measurement value corresponding to the particular catch cup, the measurement value corresponding to the particular catch cup comprising one of the measurement values, and is further configured to cause the graphical user interface to display a numeric value corresponding to the visual representation of the water level;
an average component for calculating an average of the measurement values;
a lowest quartile component for identifying one or more of the measurement values falling within a lowest quartile of the measurement values;

a lowest quartile average component for calculating a lowest quartile average, the lowest quartile average comprising an average of the measurement values within the lowest quartile of the measurement values;

an estimated irrigation rate component for calculating an estimated irrigation rate based on the lowest quartile average;

an in-soil water level component for calculating a first estimated in-soil water level for the watering zone at a first point in time;

a forecast evapotranspiration component for calculating or receiving forecast evapotranspiration data for the watering zone for an intermediate period of time extending between the first point in time and a subsequent, second point in time;

a forecast weather component for receiving forecast precipitation data for the watering zone for the intermediate period of time, wherein the in-soil water level component is further configured to calculate a second estimated in-soil water level at the second point in time based on the first estimated in-soil water level, the forecast precipitation data and the forecast evapotranspiration data;

a total scheduled watering time component for calculating a scheduled watering time for the watering zone based at least in part on a ratio between the lowest quartile average and the average of the measurement values using at least one of a group of one or more processors disposed within or in electronic communication with the irrigation controller; and a watering schedule component for formulating a watering schedule for the watering zone based at least in part on the calculated scheduled watering time using at least one of the group of one or more processors.

2. The irrigation controller of claim 1, further comprising a watering time compression component configured to proportionally reduce an actual watering time for each of the one or more watering zones of the property if a total desired watering time for all of the one or more watering zones exceeds a total permissible watering time within a future temporal period.

3. The irrigation controller of claim 1, further comprising:
a water level difference component for identifying a difference between a calculated in-soil water capacity for the watering zone and an estimated in-soil water level for a point in time at a beginning of an impermissible watering period for the watering zone,
wherein the watering schedule component is configured to formulate the watering schedule such that the estimated in-soil water level is elevated to the calculated in-soil water capacity based on the estimated irrigation rate during a permissible watering period immediately preceding the impermissible watering period.

4. The irrigation controller of claim 1, wherein the in-soil water level component is configured to adjust an estimated in-soil water level in response to determining that historical weather data is inconsistent with forecast weather data.

5. The irrigation controller of claim 1, wherein the in-soil water level component is configured to alter an estimated in-soil water level for a point in time based at least in part on forecast evapotranspiration data for a period of time preceding the point in time to an altered estimated in-soil water level for the point in time based at least in part on differences between the forecast evapotranspiration data for the period of time preceding the point in time and historical evapotranspiration data for the period of time preceding the point in time.

6. The irrigation controller of claim 1, a start watering time adjustment component for moving a start time backward in time relative to a requested start time to increase a total watering time in response to determining that a total permissible watering time is less than a total desired watering time.

7. The irrigation controller of claim 1, wherein an in-soil water capacity component is configured to calculate an estimated in-soil water capacity for the watering zone, based at least in part on user input specifying a soil type for the watering zone.

8. A method for irrigating one or more watering zones of a property, the method comprising:
receiving measurement values, each of the measurement values representing a quantity of water captured by one of a plurality of catch cups positioned within a watering zone of the one or more watering zones of the property during a test watering period using at least one of a group of one or more processors disposed within or in electronic communication with an irrigation controller for irrigating the watering zone, wherein the receiving of the measurement values comprises:
causing a graphical user interface to display a visual representation of a particular catch cup of the plurality of catch cups and a visual representation of a water level within the particular catch cup;
causing the visual representation of the water level to be altered in response to upward or downward touch input provided to the graphical user interface such that a user may specify a measurement value corresponding to the particular catch cup, the measurement value corresponding to the particular catch cup comprising one of the measurement values;
causing the graphical user interface to display a numeric value corresponding to the visual representation of the water level;
using at least one of the group of one or more processors, calculating an average of the measurement values;
using at least one of the group of one or more processors, identifying one or more of the measurement values falling within a lowest quartile of the measurement values;
using at least one of the group of one or more processors, calculating a lowest quartile average, the lowest quartile average comprising an average of the measurement values within the lowest quartile of the measurement values;
using at least one of the group of one or more processors, calculating an estimated irrigation rate based on the lowest quartile average;
using at least one of the group of one or more processors, calculating a first estimated in-soil water level for the watering zone at a first point in time;
using at least one of the group of one or more processors, calculating or receiving forecast evapotranspiration data for the watering zone for an intermediate period of time extending between the first point in time and a subsequent, second point in time;
using at least one of the group of one or more processors, receiving forecast precipitation data for the watering zone for the intermediate period of time;
using at least one of the group of one or more processors, calculating a second estimated in-soil water level at the second point in time based on the first estimated in-soil water level, the forecast precipitation data and the forecast evapotranspiration data;

using at least one of the group of one or more processors, calculating a scheduled watering time for the watering zone based at least in part on a ratio between the lowest quartile average and the average of the measurement values; and using at least one of the group of one or more processors, formulating a watering schedule for the watering zone based at least in part on the calculated scheduled watering time.

9. The method of claim 8, further comprising, using at least one of the group of one or more processors, operating a sprinkling system for the property in accordance with the watering schedule.

10. The method of claim 8, further comprising, using at least one of the group of one or more processors, proportionally reducing an actual watering time for each of the one or more watering zones of the property if a total desired watering time for all of the one or more watering zones exceeds a total permissible watering time within a future temporal period.

11. The method of claim 8, further comprising:
using at least one of the group of one or more processors, identifying a difference between a calculated in-soil water capacity for the watering zone and an estimated in-soil water level for a point in time at a beginning of an impermissible watering period for the watering zone,
wherein the watering schedule is formulated such that the estimated in-soil water level is elevated to the calculated in-soil water capacity based on the estimated irrigation rate during a permissible watering period immediately preceding the impermissible watering period.

12. The method of claim 8, further comprising, using at least one of the group of one or more processors, adjusting an estimated in-soil water level in response to determining that historical weather data is inconsistent with forecast weather data.

13. The method of claim 8, further comprising, using at least one of the group of one or more processors, altering an estimated in-soil water level for a point in time based at least in part on forecast evapotranspiration data for a period of time preceding the point in time to an altered estimated in-soil water level for the point in time based at least in part on differences between the forecast evapotranspiration data for the period of time preceding the point in time and historical evapotranspiration data for the period of time preceding the point in time.

14. The method of claim 8, moving a start time backward in time relative to a requested start time to increase a total watering time in response to determining that a total permissible watering time is less than a total desired watering time.

15. A computer program product for irrigating one or more watering zones of a property, the computer program product comprising:
a non-transitory computer readable medium; and
computer program code, encoded on the non-transitory computer readable medium, configured to cause at least one of a group of one or more processors to perform the steps of:
receiving measurement values, each of the measurement values representing a quantity of water captured by one of a plurality of catch cups positioned within a watering zone of the one or more watering zones of the property during a test watering period, wherein the receiving of the measurement values comprises:
causing a graphical user interface to display a visual representation of a particular catch cup of the plurality of catch cups and a visual representation of a water level within the particular catch cup;
causing the visual representation of the water level to be altered in response to upward or downward touch input provided to the graphical user interface such that a user may specify a measurement value corresponding to the particular catch cup, the measurement value corresponding to the particular catch cup comprising one of the measurement values;
causing the graphical user interface to display a numeric value corresponding to the visual representation of the water level;
calculating an average of the measurement values;
identifying one or more of the measurement values falling within a lowest quartile of the measurement values;
calculating a lowest quartile average, the lowest quartile average comprising an average of the measurement values within the lowest quartile of the measurement values;
calculating an estimated irrigation rate based on the lowest quartile average;
calculating a first estimated in-soil water level for the watering zone at a first point in time;
calculating or receiving forecast evapotranspiration data for the watering zone for an intermediate period of time extending between the first point in time and a subsequent, second point in time;
receiving forecast precipitation data for the watering zone for the intermediate period of time;
calculating a second estimated in-soil water level at the second point in time based on the first estimated in-soil water level, the forecast precipitation data and the forecast evapotranspiration data;
calculating a scheduled watering time for the watering zone based at least in part on a ratio between the lowest quartile average and the average of the measurement values; and
formulating a watering schedule for the watering zone based at least in part on the calculated scheduled watering time.

16. The computer program product of claim 15, further comprising a step of, using at least one of the group of one or more processors, operating a sprinkling system for the property in accordance with the watering schedule.

17. The computer program product of claim 15, further comprising a step of, using at least one of the group of one or more processors, proportionally reducing an actual watering time for each of the one or more watering zones of the property if a total desired watering time for all of the one or more watering zones exceeds a total permissible watering time within a future temporal period.

18. The computer program product of claim 15, further comprising a step of, using at least one of the group of one or more processors, identifying a difference between a calculated in-soil water capacity for the watering zone and an estimated in-soil water level for a point in time at a beginning of an impermissible watering period for the watering zone, wherein the watering schedule is formulated such that the estimated in-soil water level is elevated to the calculated in-soil water capacity based on the estimated irrigation rate during a permissible watering period immediately preceding the impermissible watering period.

19. The computer program product of claim 15, further comprising a step of, using at least one of the group of one or more processors, adjusting an estimated in-soil water level in response to determining that historical weather data is inconsistent with forecast weather data.

20. The computer program product of claim 15, further comprising a step of, using at least one of the group of one or more processors, altering an estimated in-soil water level for a point in time based at least in part on forecast evapotranspiration data for a period of time preceding the point in time to an altered estimated in-soil water level for the point in time based at least in part on differences between the forecast evapotranspiration data for the period of time preceding the point in time and historical evapotranspiration data for the period of time preceding the point in time.

\* \* \* \* \*